United States Patent [19]
Richards

[11] Patent Number: 4,991,168
[45] Date of Patent: Feb. 5, 1991

[54] CONCURRENT MULTI-STAGE NETWORK CONTROL ARRANGEMENT

[75] Inventor: Gaylord W. Richards, Naperville, Ill.

[73] Assignee: AT&T Bell Laboratories, Murray Hill, N.J.

[21] Appl. No.: 349,011

[22] Filed: May 8, 1989

[51] Int. Cl.$^5$ .............................................. H04Q 11/00
[52] U.S. Cl. .................................. 370/054; 370/58.1; 370/65.5; 340/826; 340/825.8
[58] Field of Search ....................... 370/54, 65.5, 58.1, 370/58.2, 58.3, 60, 60.1, 16; 340/825.8, 826, 827, 825.79; 379/271, 272, 273, 274, 275

[56] References Cited

U.S. PATENT DOCUMENTS

| | | | |
|---|---|---|---|
| 4,038,497 | 7/1977 | Collins et al. | 370/54 |
| 4,621,357 | 11/1986 | Naiman et al. | 370/65.5 |
| 4,686,669 | 8/1987 | Chang | 370/54 |
| 4,833,599 | 5/1989 | Colwell et al. | 364/200 |
| 4,849,964 | 7/1989 | Van Baardewijk | 370/58.1 |

OTHER PUBLICATIONS

A. Feiner et al., "No. 1 ESS Switching Network Plan", *The Bell System Technical Journal*, vol. XLIII, Sep. 1964, No. 5, Part 2, pp. 2193-2220.
W. Ulrich, "No. 1 ESS Network Sequences and Program", Electronic Switching Symposium, 1963, pp. 14-1-14-13.

*Primary Examiner*—Douglas W. Olms
*Assistant Examiner*—Alpus H. Hsu
*Attorney, Agent, or Firm*—R. T. Watland

[57] ABSTRACT

A network control arrangement where stage-specific busy/idle information is stored using individual memories for each stage, and path hunting is effected by combining the busy/idle information for all stages concurrently rather than sequentially. A single binary number, comprising a concatenation of an inlet number, a path number and an outlet number, uniquely identifies a particular network path between a given inlet and outlet. The stage busy/idle information for the path components, e.g., network nodes or links, for all network path between the given inlet and outlet is stored at a single address of a stage memory. The memory address for a particular stage is a specified subset of the bits of the inlet and outlet numbers. The memories for all stages are read concurrently to simultaneously determine all idle paths and, after a path is selected, all stage memories are concurrently updated. Stage-specific subsets of the bits of the binary number comprising the concatenation of the inlet and outlet numbers with the path number associated with the selected path are used to access all components of that path to enable communication.

42 Claims, 41 Drawing Sheets

FULL CAPACITY
NODE

CAPACITY ONE
NODE
WITH SELECTIVITY

CAPACITY ONE
NODE
WITHOUT SELECTIVITY

16 X 16 CROSSOVER NETWORK

| FIG. 34 | FIG. 35 | FIG. 36 |

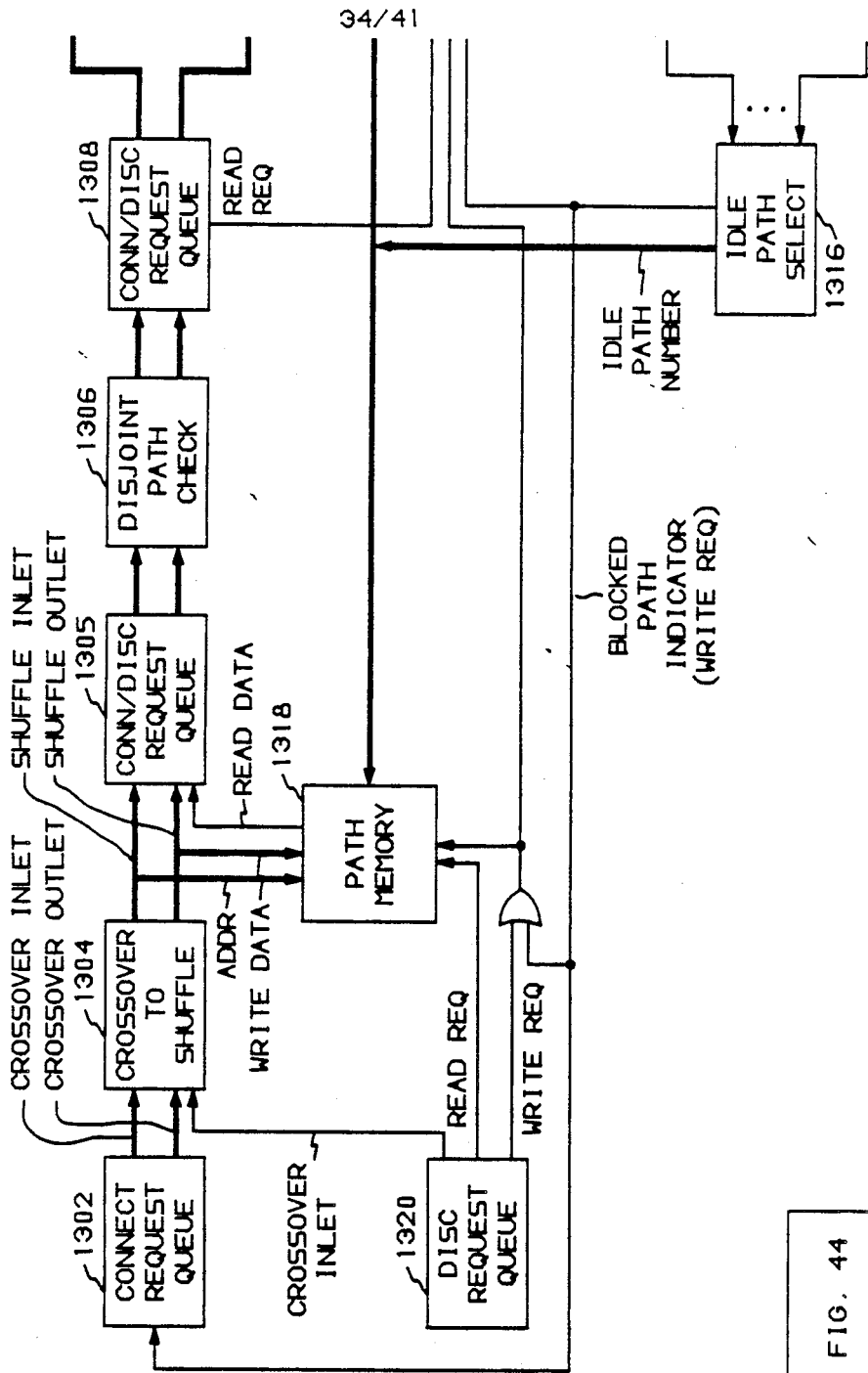

CONCURRENT MULTI-STAGE NETWORK CONTROL ARRANGEMENT

CROSS-REFERENCE TO RELATED APPLICATIONS

This application is related to the following applications, which are assigned to the same assignee and concurrently filed herewith:

T. J. Cloonan et al., "Network Topology for Reduced Blocking and Photonic System Implementation Thereof", Ser. No. 07/349,281, filed May 8, 1989.

T. J. Cloonan et al., "Space-Division Switching Network Having reduced Functionality Nodes", Ser. No. 07/349,280, filed May 8, 1989.

T. J. Cloonan et al., "Optical Apparatus for Combining Light Beam Arrays Having Different Wavelengths", Ser. No. 07/349,275, filed May 8, 1989.

T. J. Cloonan et al., "Crossover Network Utilizing Two-Dimensional Arrays of Nodes", Ser. No. 07/349,008, filed May 8, 1989.

G. W. Richards, "Network Control Arrangement for Processing a Plurality of Connection Requests", Ser. No. 07/349,027, filed May 8, 1989.

G. W. Richards, "Network Control Arrangement Based on Topological Equivalence" Ser. No. 07/349,007, filed May 8, 1989.

TECHNICAL FIELD

This invention relates to communication network control and, more specifically to arrangements, applicable to both circuit-switched and packet-switched networks, for rapidly determining available network paths and enabling communication via such paths.

BACKGROUND AND PROBLEM

The time required to perform a path hunt through a multi-stage switching network effectively limits the rate at which circuit-switched or packet-switched communications can be established through that network. The path hunt process involves three basic determinations: (1) identifying one or more paths between a given network inlet and a given network outlet, (2) determining whether any of the identified paths are idle through all the network stages and (3) if more than one of the identified paths are idle, selecting one for use for a particular communication. Once an idle path is selected, further control actions must be taken to enable communication through that path. As disclosed in an article by A. Feiner et al., Bell System Technical Journal, September 1964, pages 2208-2214, a basic decision in the design of the 1 ESS TM switch was that of isolating the path hunt function from the switching network itself. A central processor makes all path searches and keeps a continuous record of all pertinent switching information in its memory. Although a number of paths are searched at one time, the search is sequential in that it involves combining busy/idle information for two network stages to obtain a result, then combining the result with busy/idle information for a third stage and so on. As network designs evolve for use in communicating wider variety of voice, image and data information, and specifically for networks designed for implementation in the photonics domain, the transaction rate at which circuit-switched or packet-switched communications can be established using stage-sequential path hunting may seriously limit network performance, particularly in large networks including many stages.

SOLUTION

The aforementioned problem is solved and a technical advance is achieved in accordance with the principles of the invention in an exemplary network control arrangement, implemented using hardware rather than with a single, software-controlled processor, where stage-specific busy/idle information is stored using individual memories for each stage, and path hunting is effected by combining the busy/idle information for all stages concurrently rather than sequentially. For the illustrative networks described herein, a single binary number, comprising a concatenation of an inlet number, a path number and an outlet number, uniquely identifies a particular network path between a given inlet and outlet. The stage busy/idle information for the path components, e.g., network nodes or links, for all network paths between the given inlet and outlet is stored at a single address of a stage memory. The memory address for a particular stage is a specified subset of the bits of the inlet and outlet numbers. The memories for all stages are read concurrently to simultaneously determine all idle paths and, after a path is selected, all stage memories are concurrently updated. Stage-specific subsets of the bits of the binary number comprising the concatenation of the inlet and outlet numbers with the path number associated with the selected path are used to access all components of that path to enable communication.

A method in accordance with the invention is used in a multi-stage network arrangement having a plurality of memories each storing stage busy/idle information for one of the network stages. Stage busy/idle information is combined concurrently from at least three of the memories to hunt for an idle path from a specified network inlet through the network to a specified network outlet.

An illustrative network controller (FIG. 1) is used to control a 512×512 multi-stage crossover network (FIG. 38). The network has a plurality of paths from a specified inlet to a specified outlet. Each stage memory stores the stage busy/idle bits for all of the paths at one location addressable based on the specified inlet and outlet. The stage busy/idle bits are read concurrently for all paths and all stages. Based on the read bits, one idle path is determined and the stage busy/idle information is updated concurrently for all stages. Network control actions are taken to enable the determined path for communication and information defining the path is written into a path memory. When a disconnection request is received, the stage busy/idle information is updated concurrently for all stages to define a return to idle status. The controller disables communication over the path and deletes the path information from the path memory.

Since each switching node of the network is capable of carrying simultaneous communications received on two or more of its input links, the stage busy/idle information used to effect network path hunts defines the busy/idle status of the individual links. Each stage memory has a plurality of addressable locations each having a number of bit positions. Each bit position stores the stage busy/idle information for one of the links of the associated stage. A plurality of inlet signals are coded to represent any one of the network inlets and a plurality of outlet signals are coded to represent any one of the network outlets. An address is generated for each stage memory from predetermined ones of the inlet and outlet signals. Stage busy/idle information is read concurrently from all the bit positions of all of the addressed locations to hunt for a path. Once an idle path is determined, the stage busy/idle information is concurrently updated in all stage memories. A plurality of path signals are coded to represent any one of the plurality of paths between the network inlet and the network outlet. Predetermined ones of the inlet, outlet, and paths signals are used to enable communications over the the particular link of a given stage.

Alternatively, when each switching node of the network is used to convey only one communication at a time, the stage busy/idle information used to effect network path hunts defines the busy/idle status of the nodes, rather than the links.

One specific illustrative embodiment of the invention is used in the network controller 1300 (FIG. 1) which controls a 512×512 multi-stage crossover network 1200 (FIG. 38). To get a better understanding of the size of network 1200 and the potential complexity of performing path hunts in a network of that size, first refer to the 16×16 crossover network 1170 (FIGS. 34–36) and note the pattern of crossover connections from stage to stage. FIG. 37 is a representation of the relative sizes of the 16×16 network 1170 and the 512×512 network 1200. Also shown is an intermediate size 128×128 network. Crossover network 1200 (FIG. 38) includes 15 stages; however stages 1, 2, 3, 13, 14, and 15 do not perform a switching function but are used only to implement the fanout/fanin F=8. Network controller 1300 is used to effect path hunt, connect, and disconnect functions for network 1200 via a plurality of stage controllers 1201 through 1209, individual to the stages 4 through 12. For the present example, the nodes of the switching stages 4 through 12 are full capacity switching nodes such as the node of FIG. 6.

Network controller 1300 (FIG. 1) includes a plurality of memories 1312 each storing stage busy/idle information for one of the link stages of network 1200. Stage busy/idle information is combined concurrently from all of the memories 1312 to hunt for an idle path from a specified network 1200 inlet to a specified network 1200 outlet. Network 1200 has eight paths from a specified inlet to a specified outlet. Each stage memory 1312 stores the stage busy/idle bits for all eight paths at one location addressable based on the specified inlet and outlet. The stage busy/idle bits are read concurrently for all paths and all stages. Eight busy/idle check units 1314 concurrently determine the overall busy/idle status of all eight paths. An idle path select unit 1316 selects one of the idle paths for use for a particular communication. All of the stage memories 1312 are concurrently updated to redefine the selected path as busy. Signals are transmitted to the node stage controllers 1201 through 1209 to enable the selected path for communication and information defining the path is written into path memory 1318. When a disconnection request is received, the stage busy/idle information is changed concurrently in all stage memories 1312 to again reflect an idle status. Signals are transmitted to the node stage controllers 1201 through 1209 (FIG. 38) to disable communication over the path and the path information is deleted from path memory 1318 (FIG. 1).

DRAWING DESCRIPTION

Figure 1:
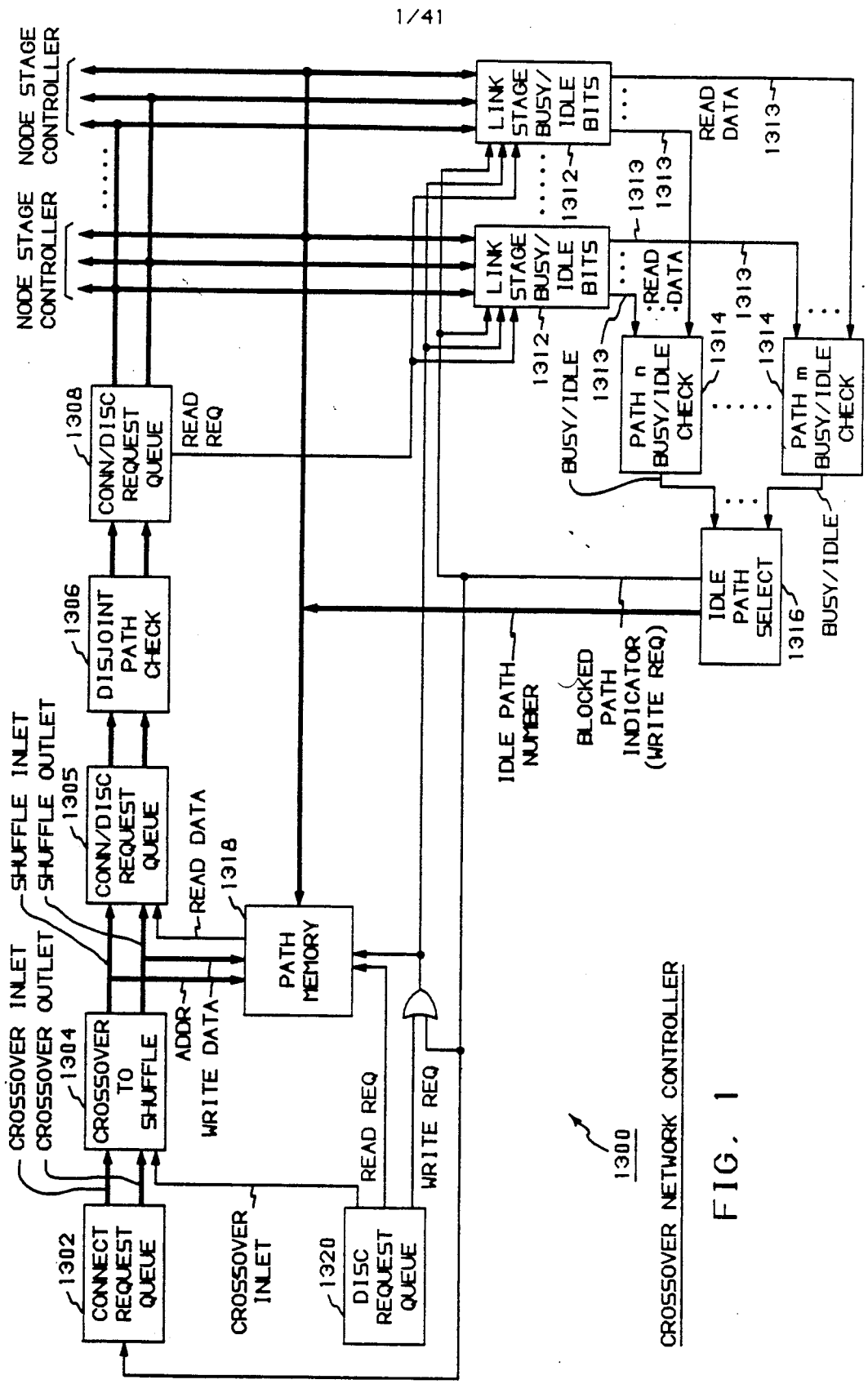
FIG. 1 is a diagram of an illustrative network controller for controlling the 512×512 multi-stage crossover network of FIG. 38.
Figure 2:
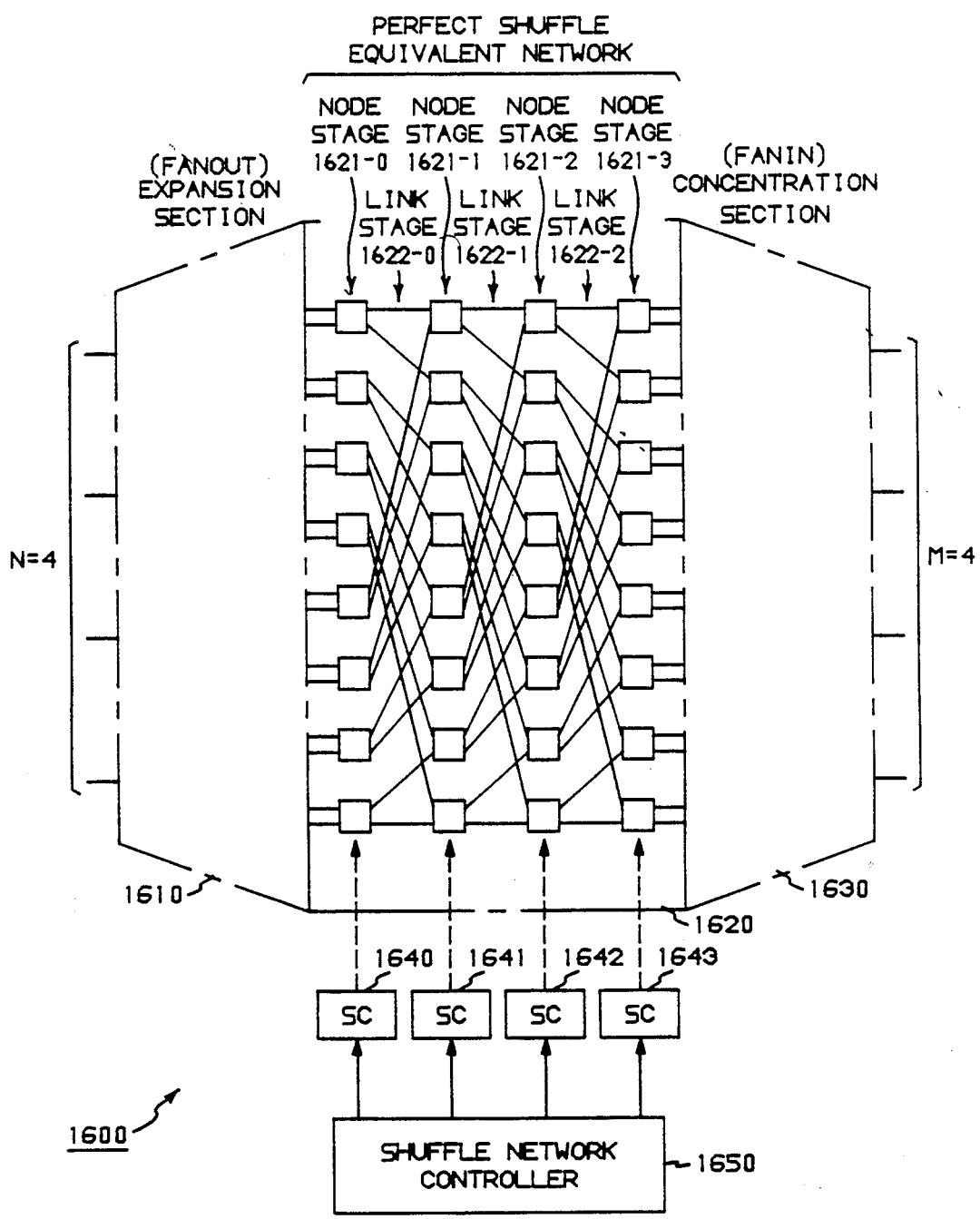
FIG. 2 is a diagram of an illustrative network topology for a system comprising expansion, a perfect shuffle equivalent network, and concentration.
Figure 3:
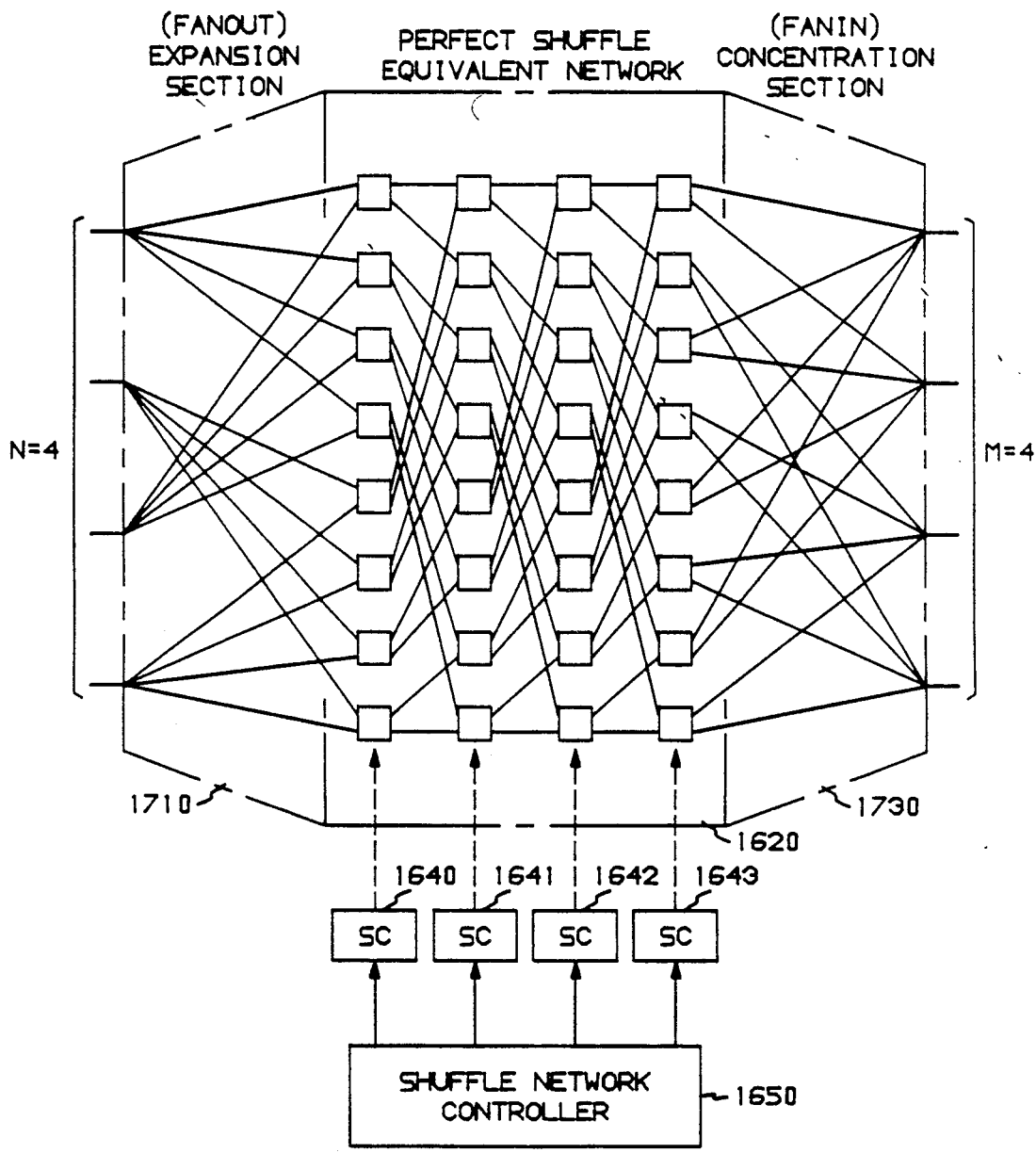
Figure 4:
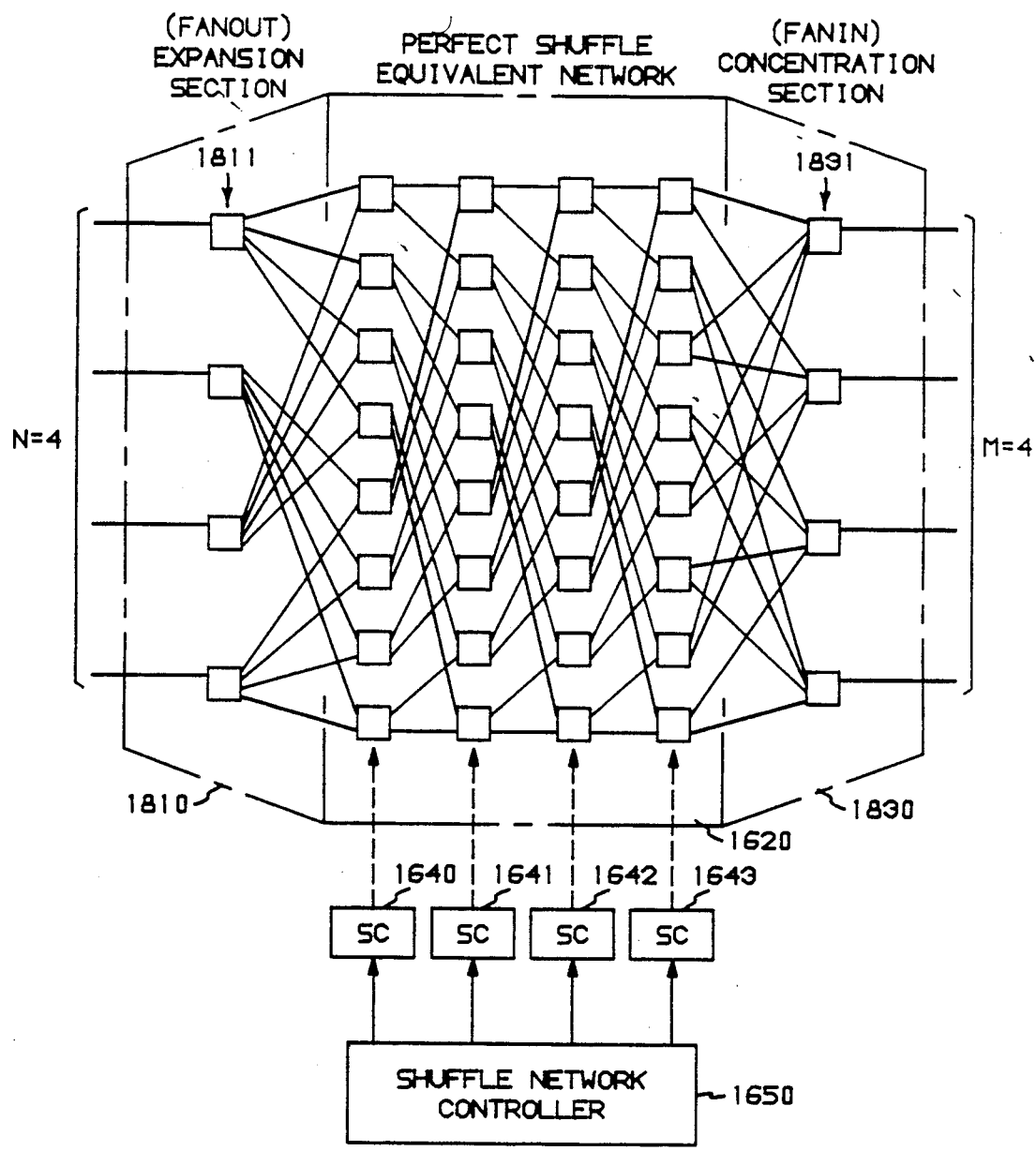
Figure 5:
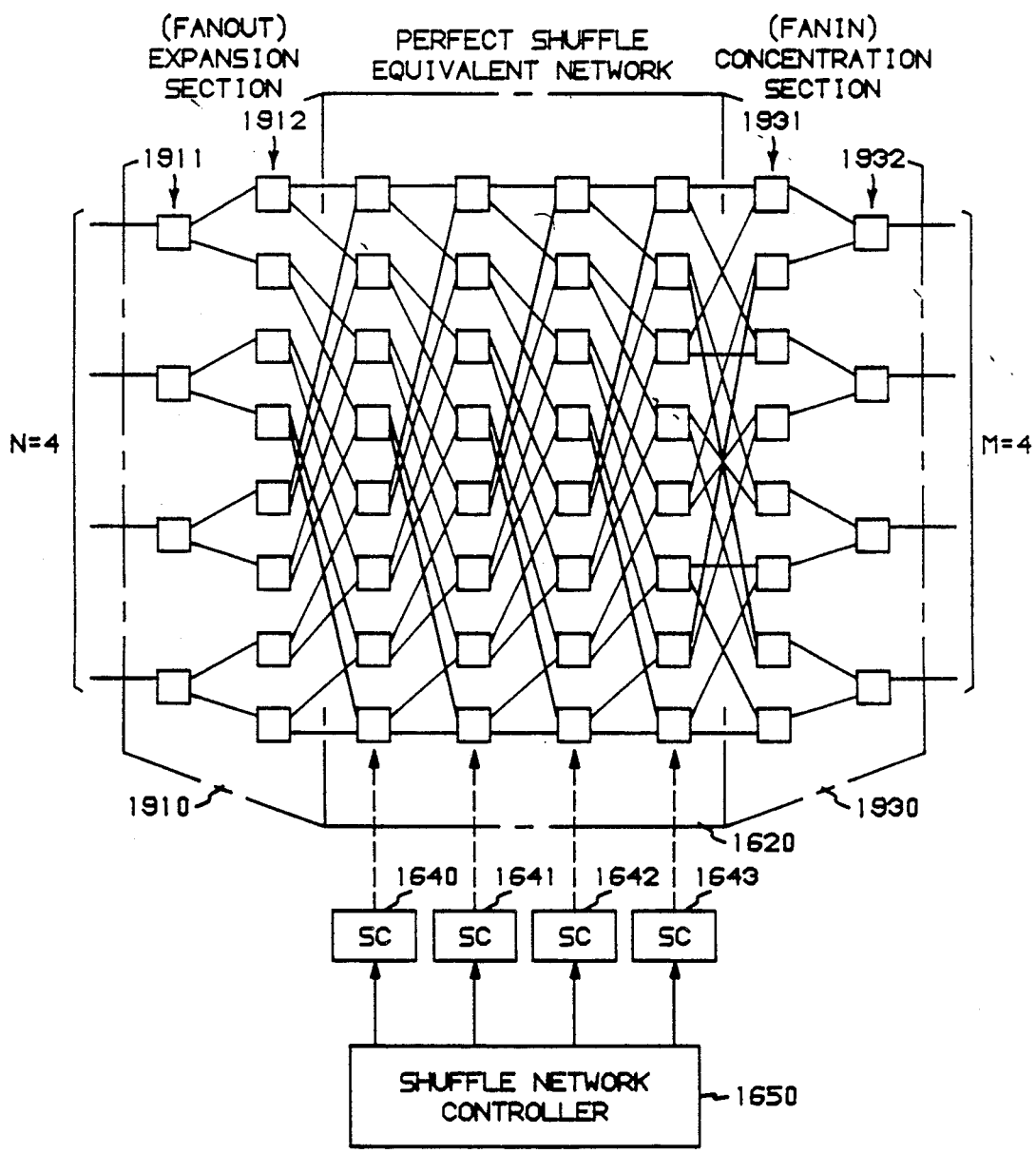
Figure 6:
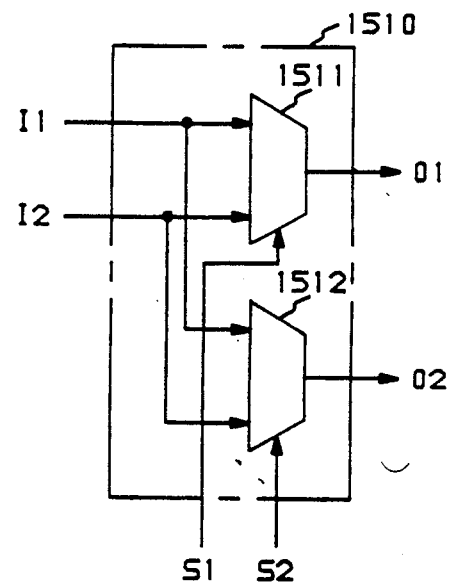
Figure 7:
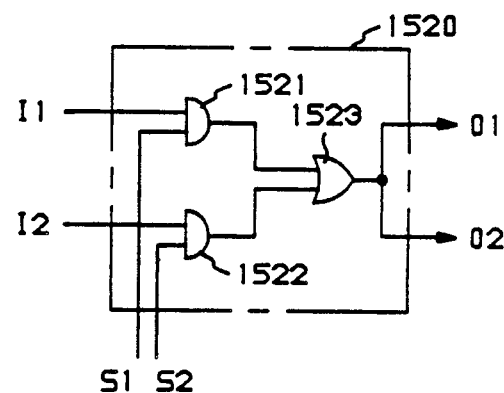
Figure 8:
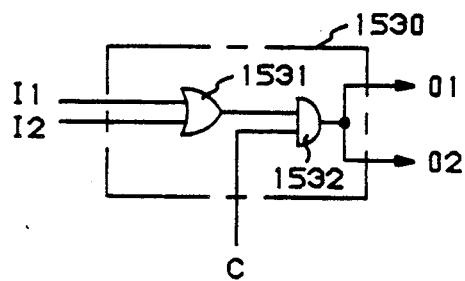
Figure 9:
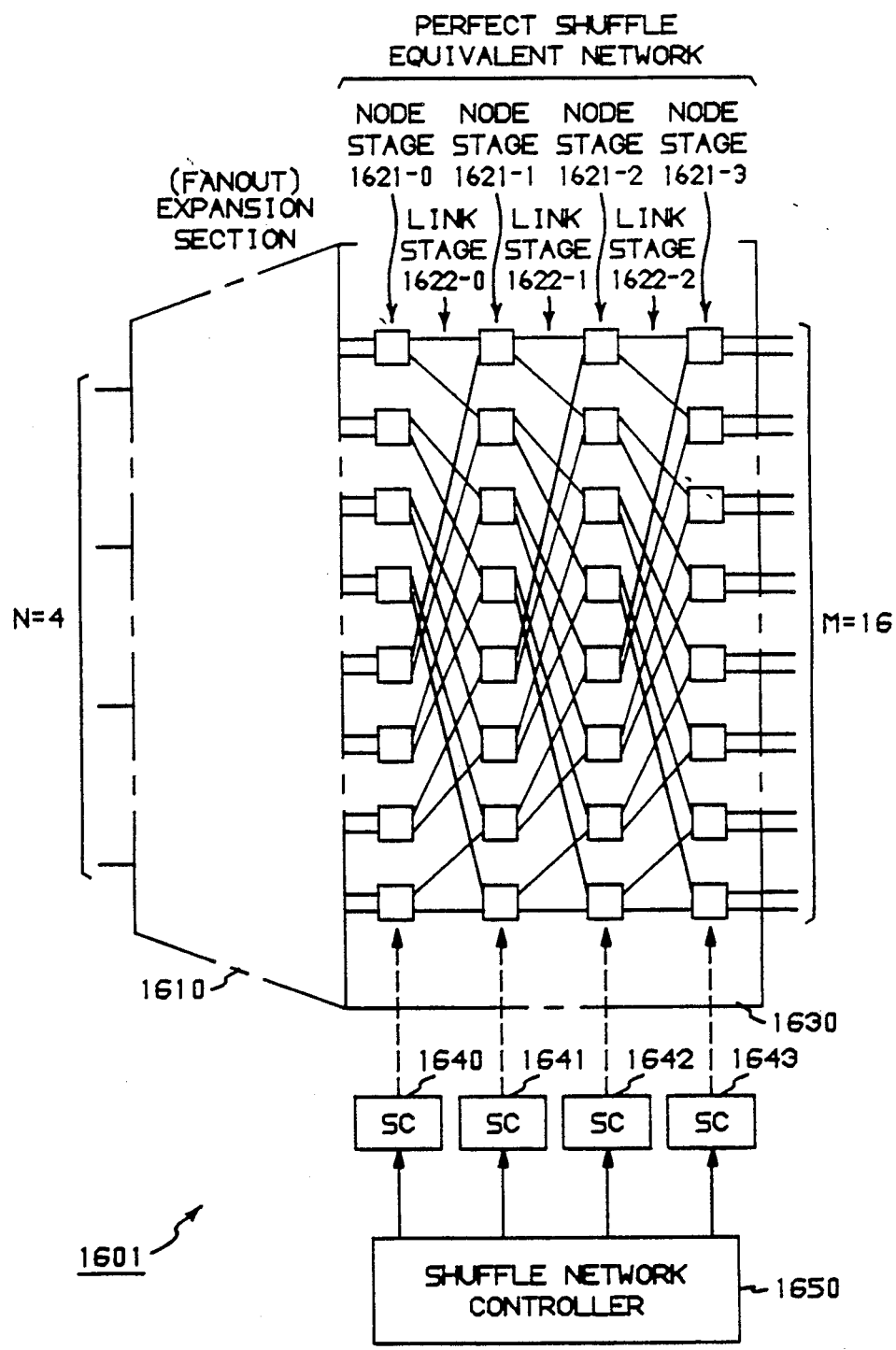
Figure 10:
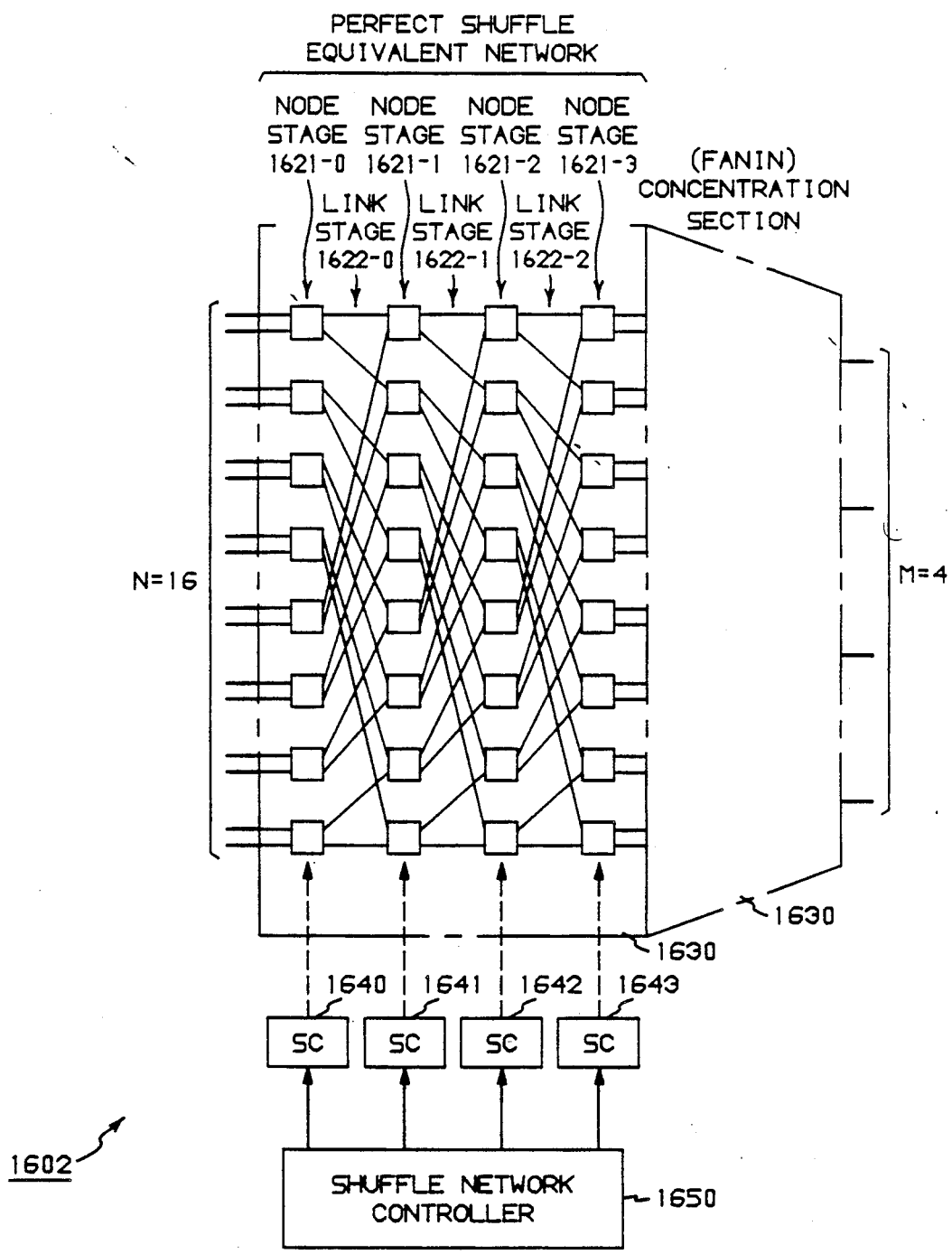
Figure 11:
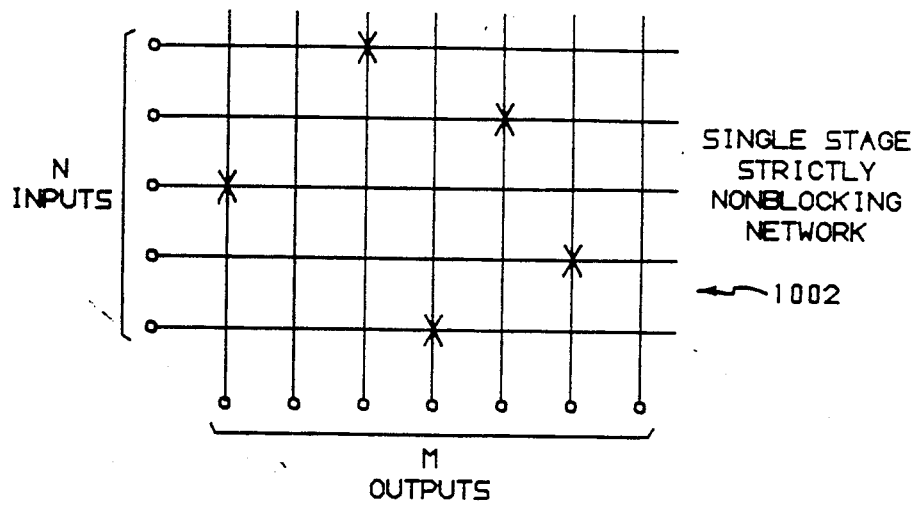
Figure 12:
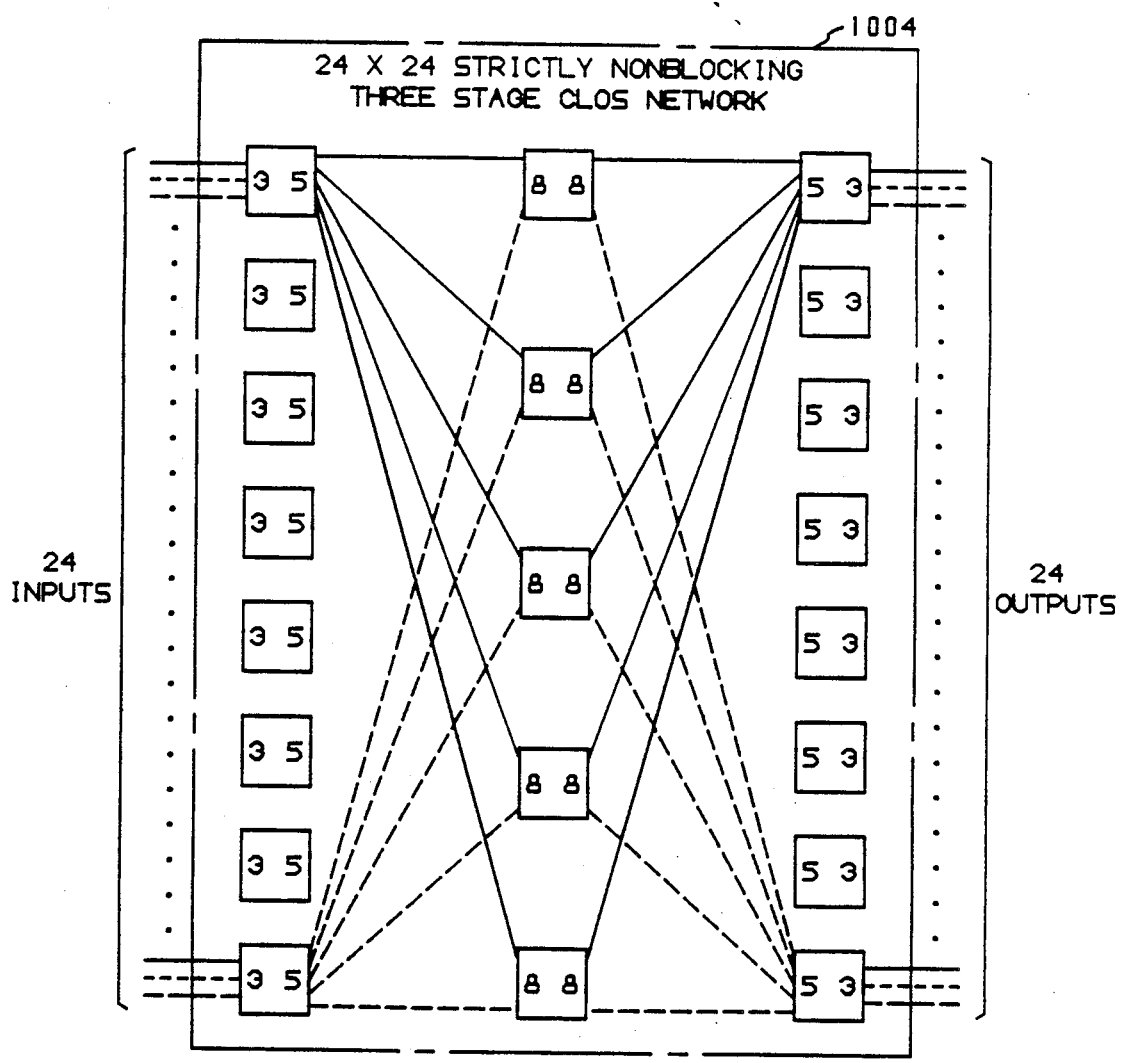
Figure 13:
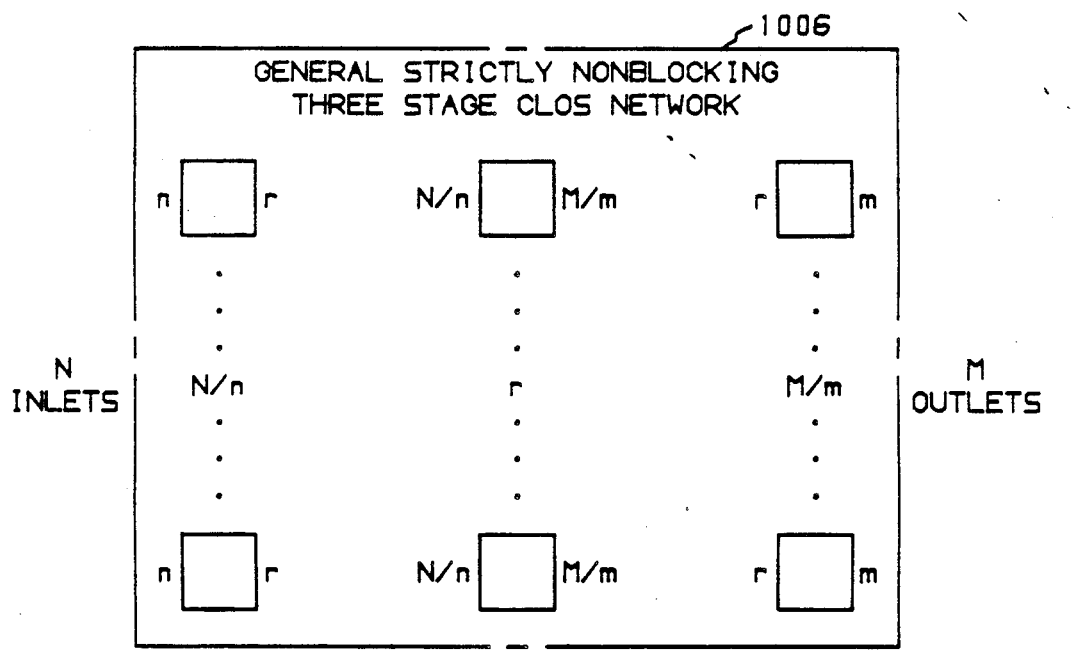
Figure 14:
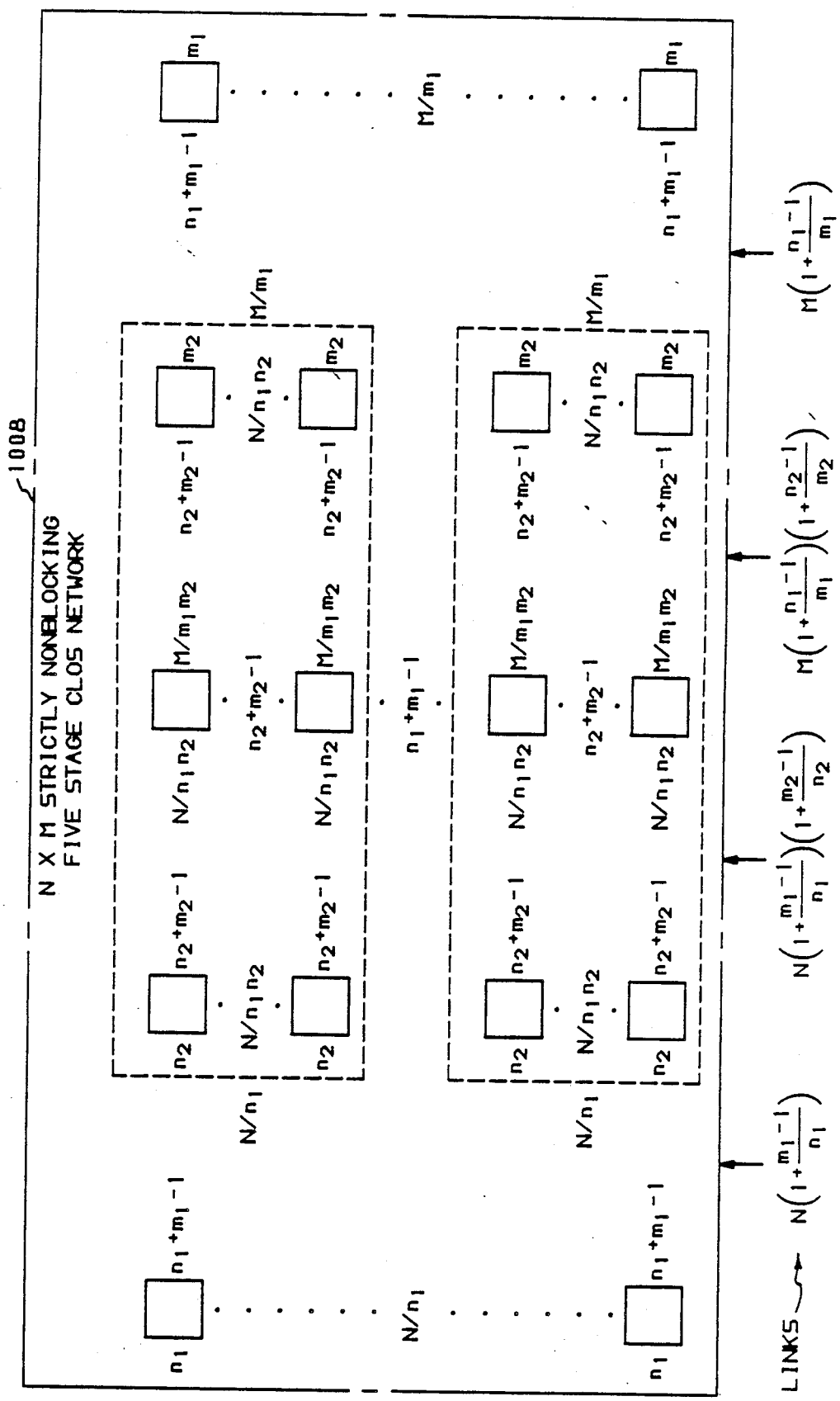
Figure 15:
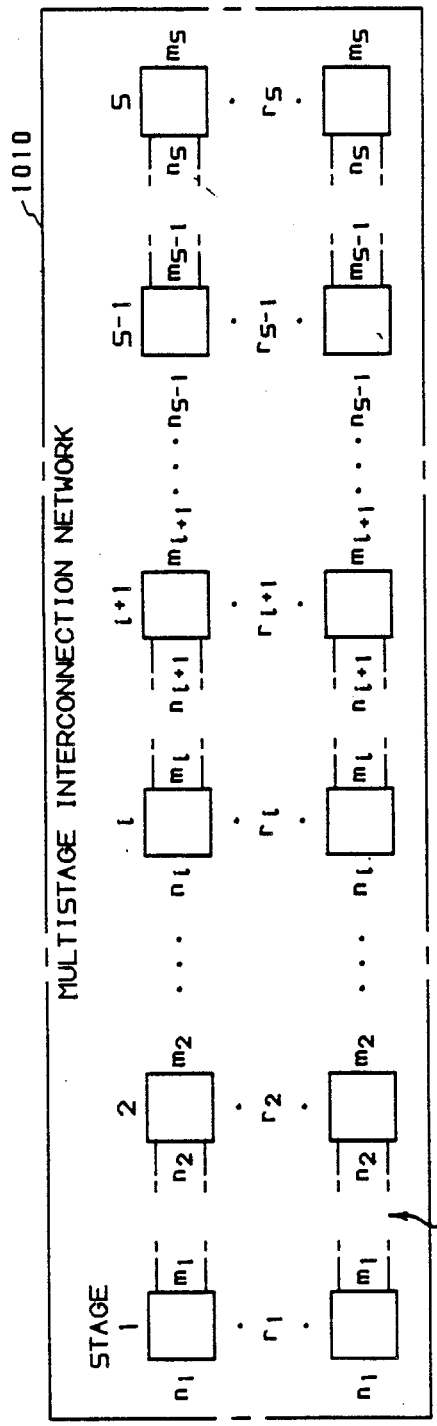
Figure 16:
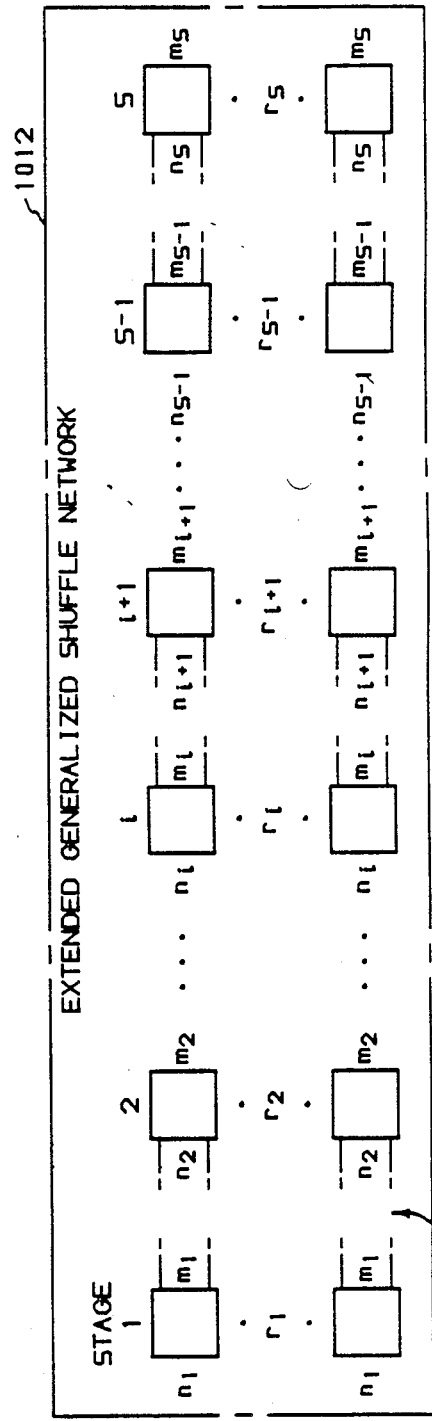
Figure 17:
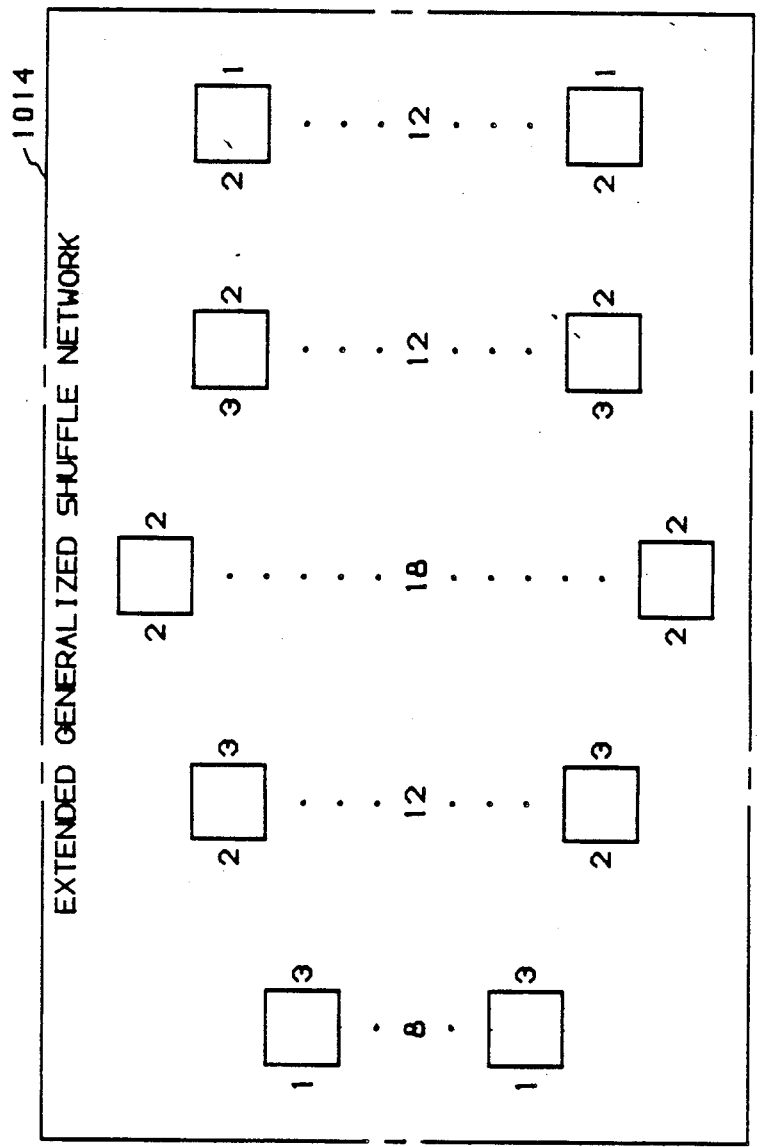
Figure 18:
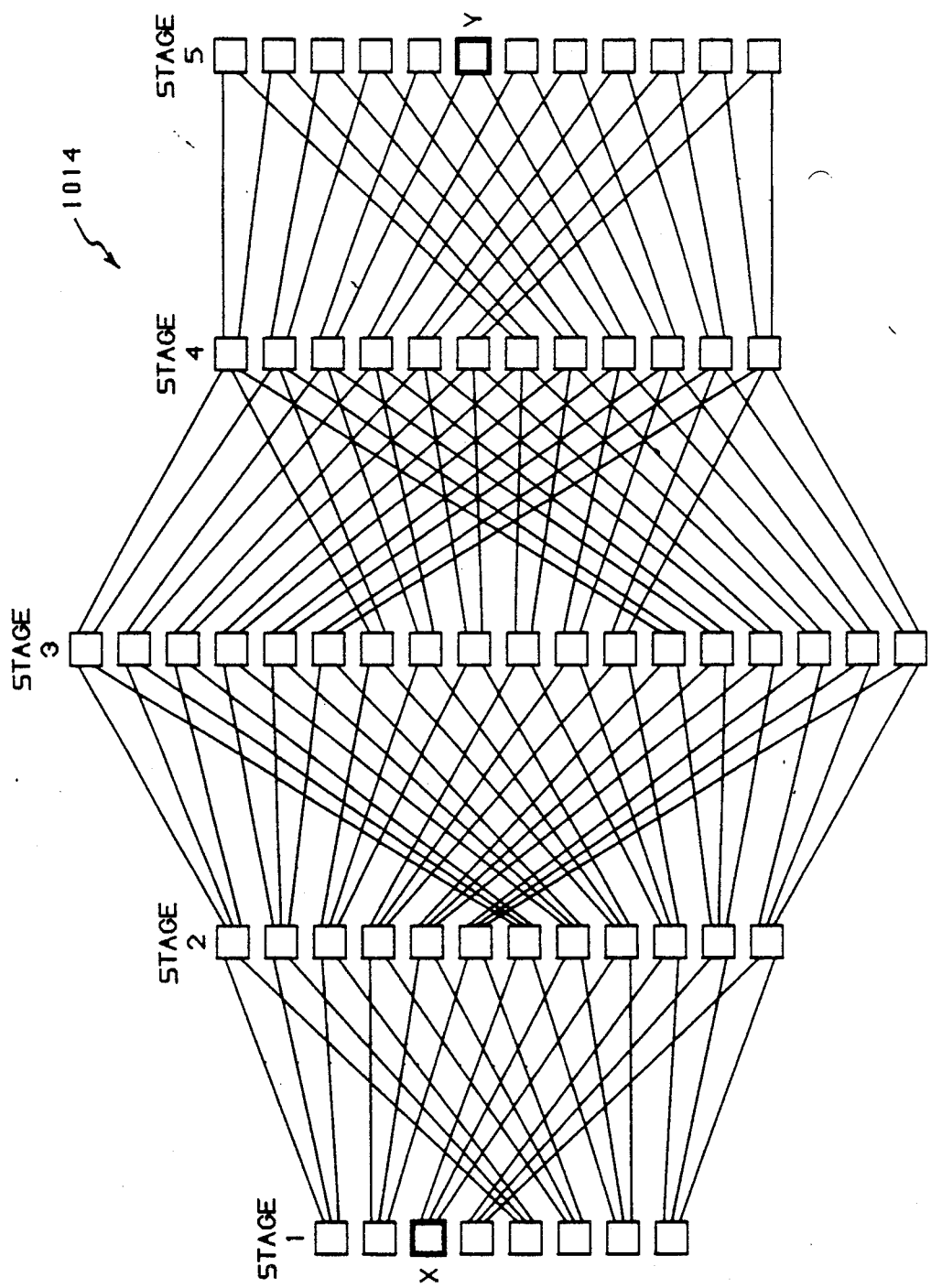
Figure 19:
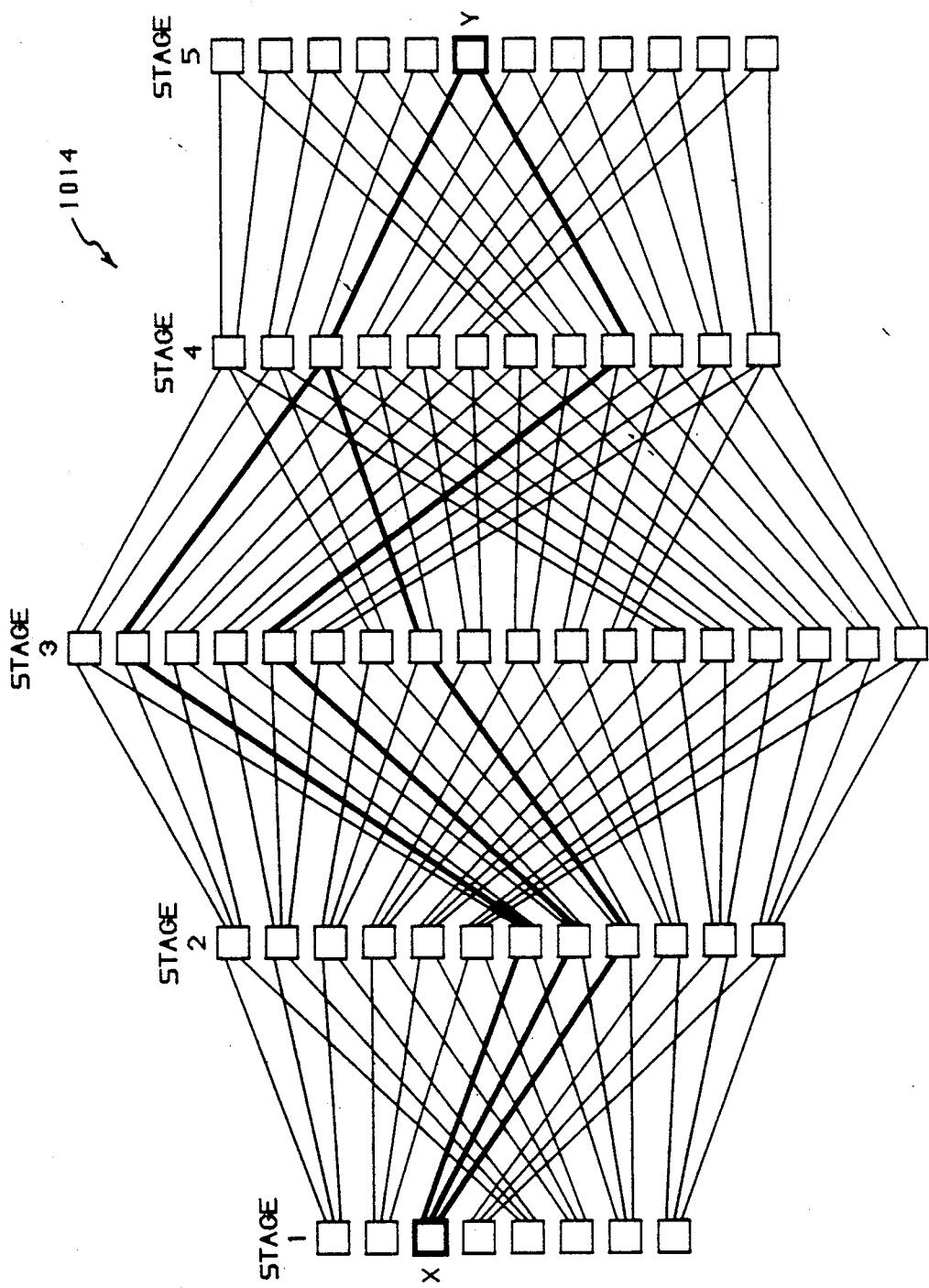
Figure 20:
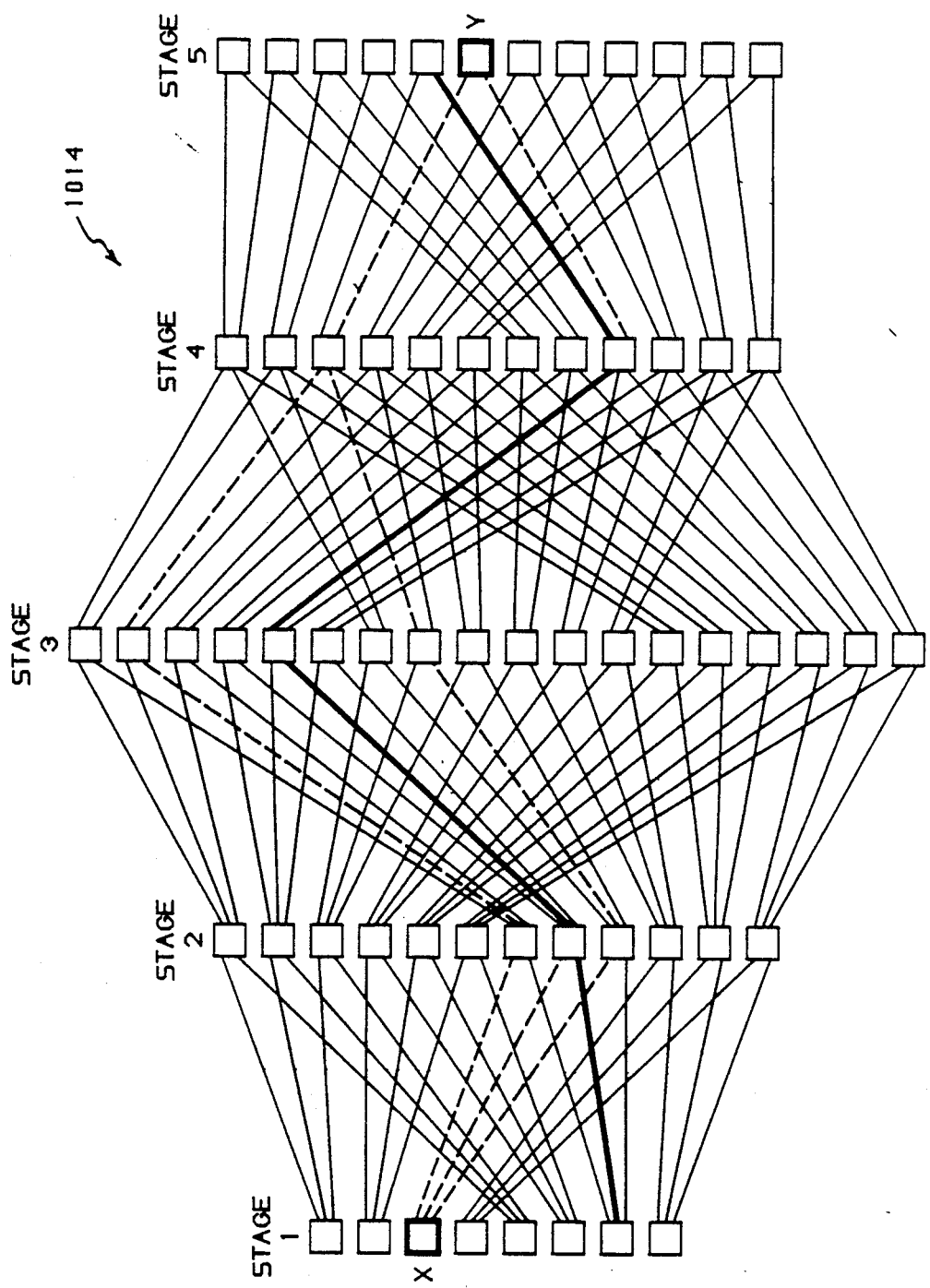
Figure 21:
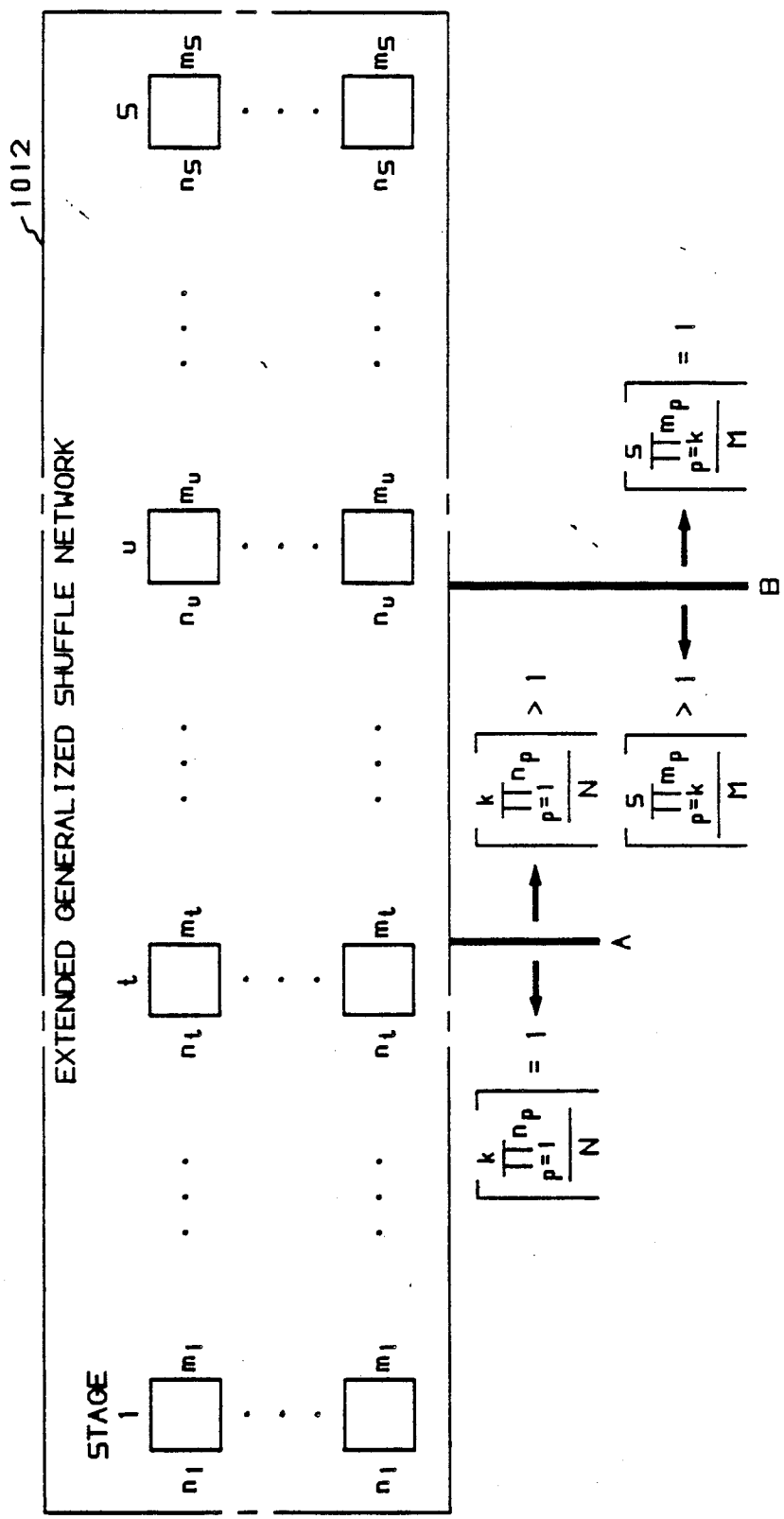
Figure 22:
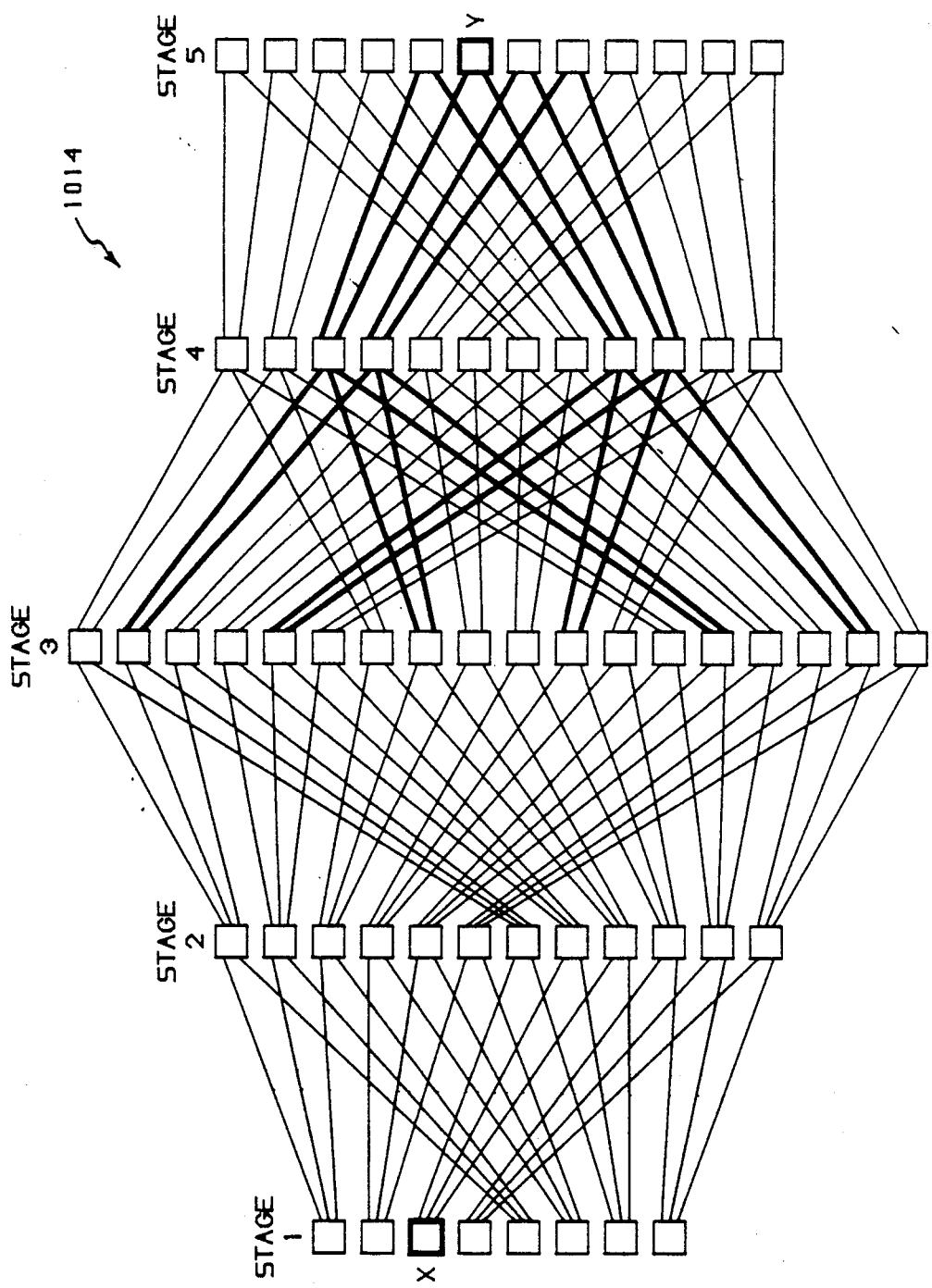
Figure 23:
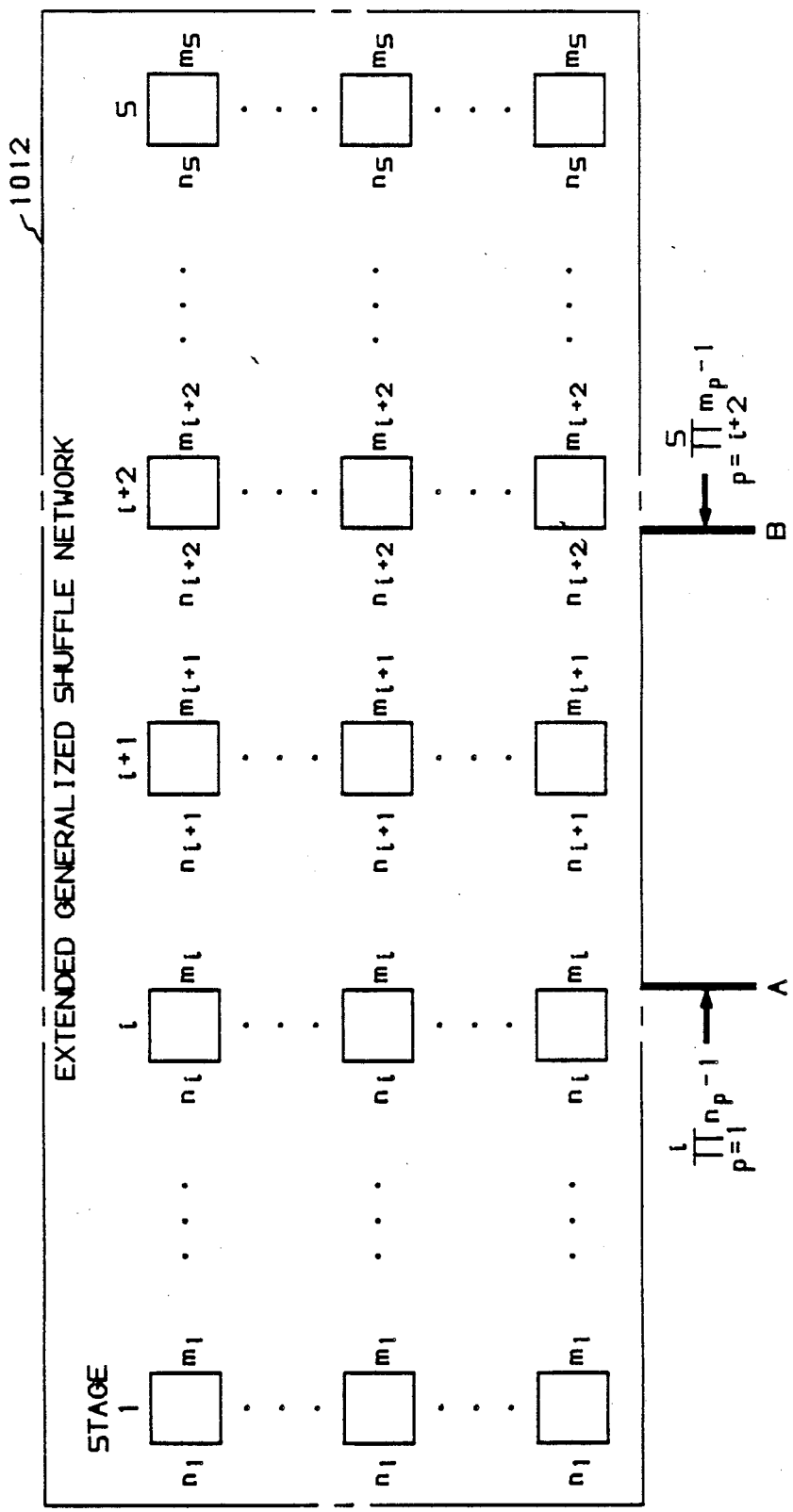
Figure 24:
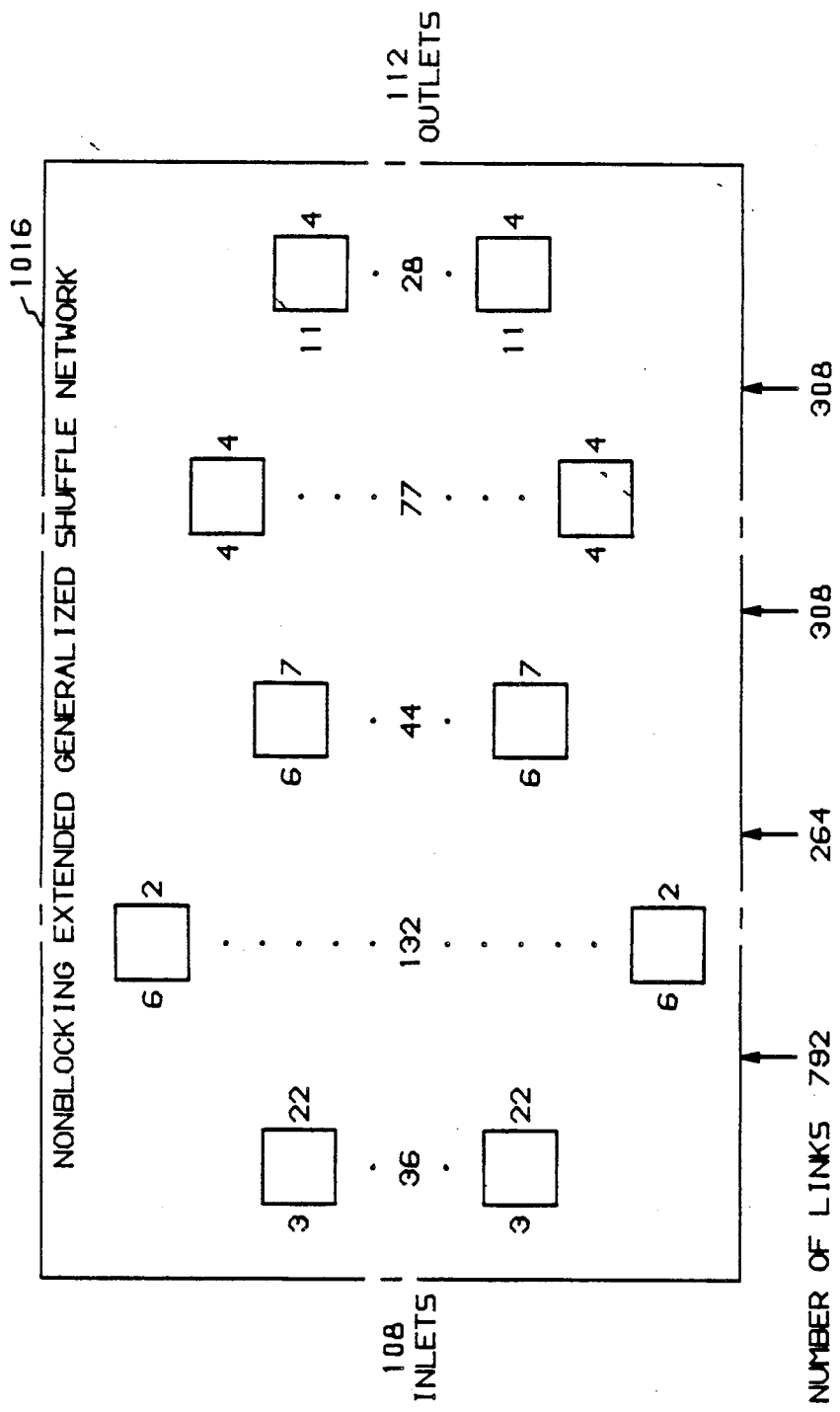
Figure 25:
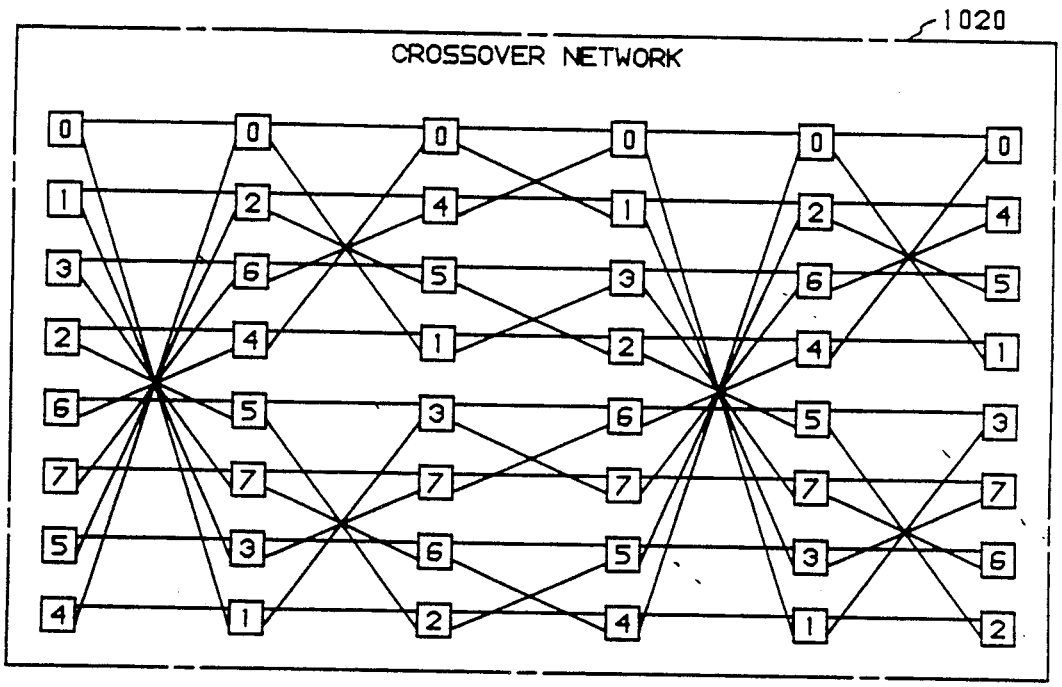
Figure 26:
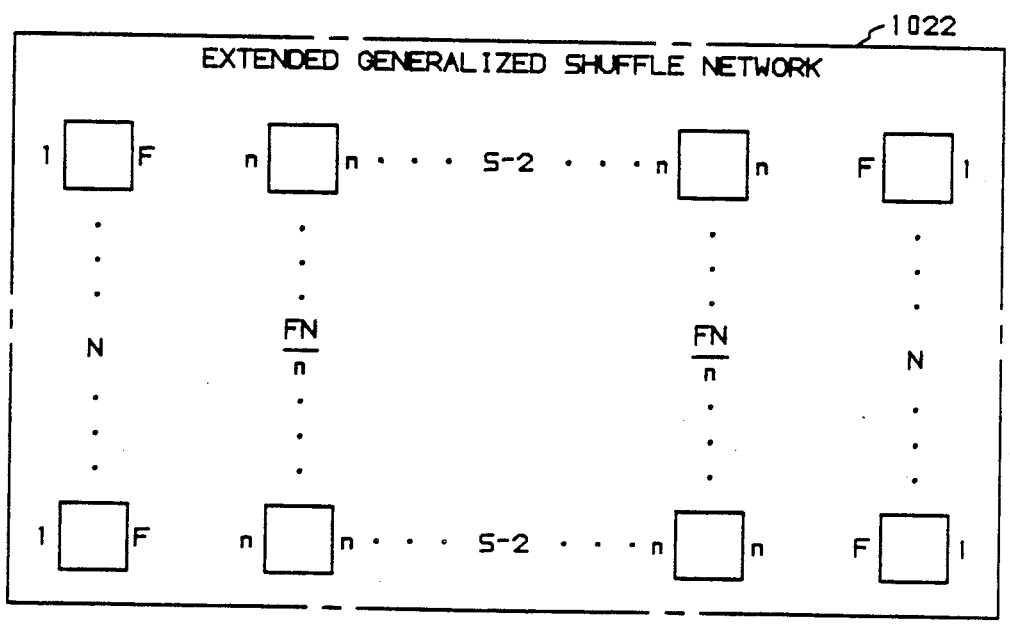
Figure 27:
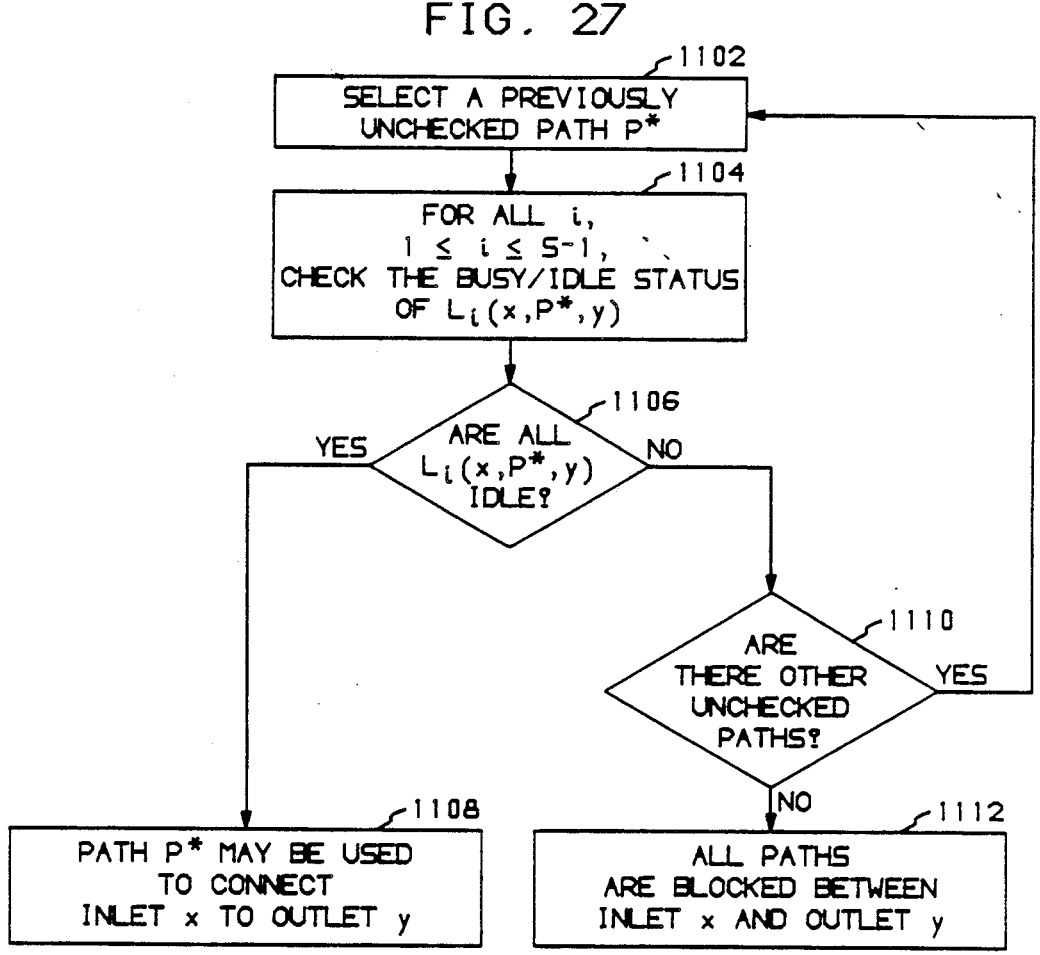
Figure 28:
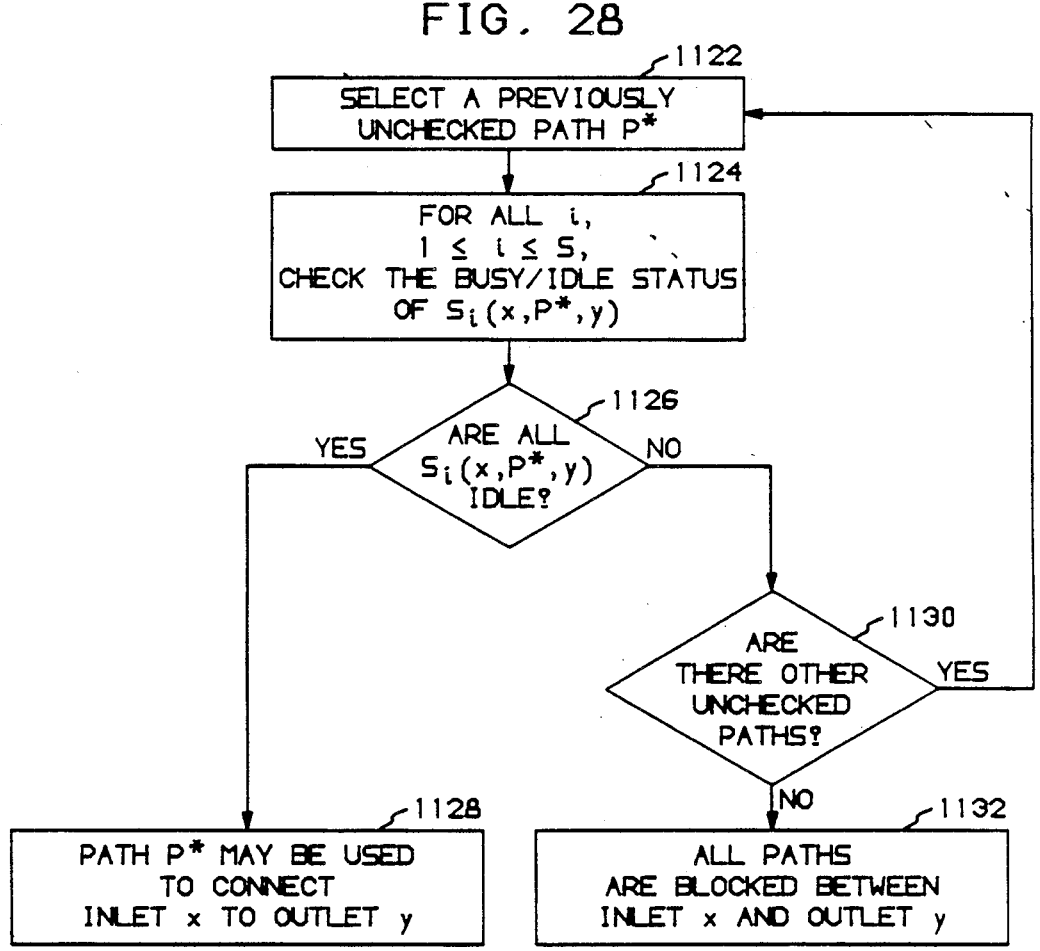
Figure 29:
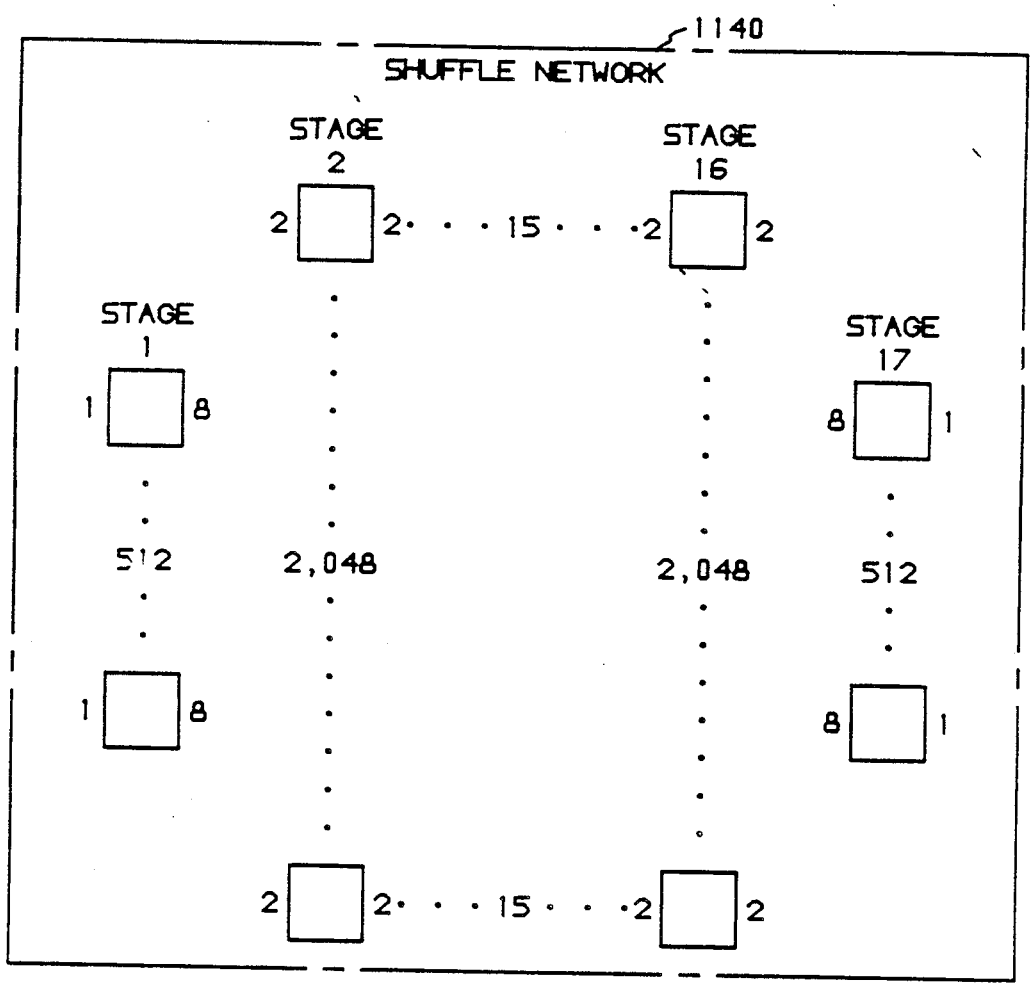
Figure 30:
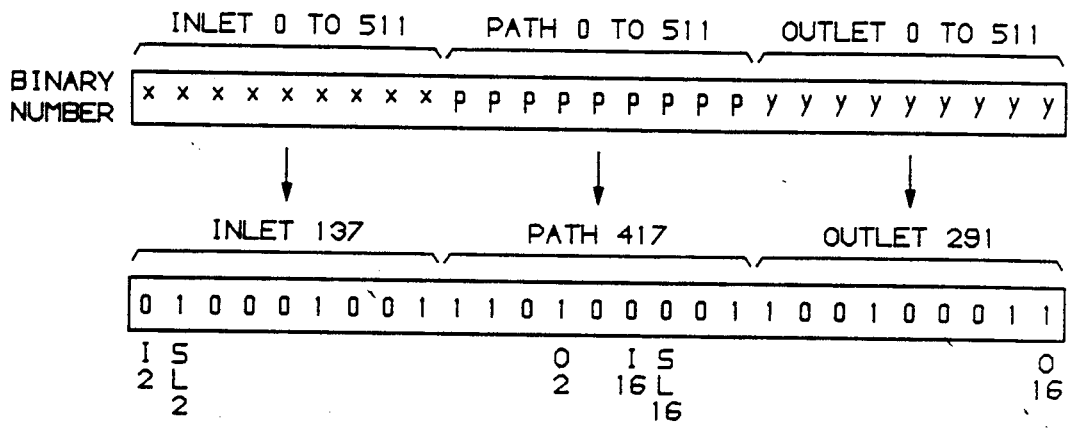
Figure 31:
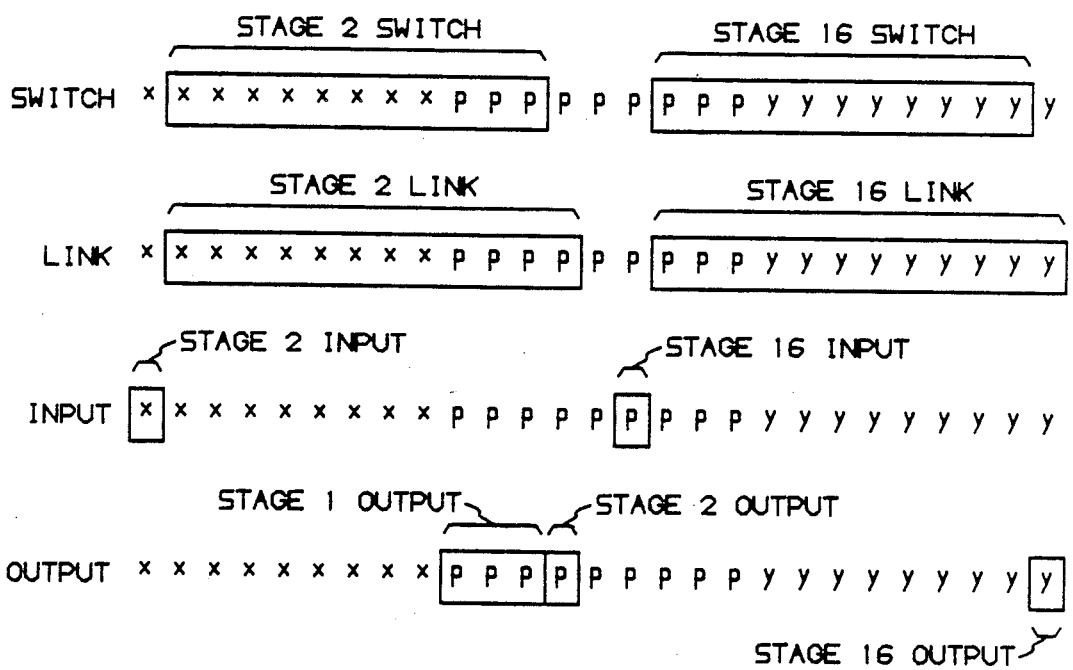
Figure 32:
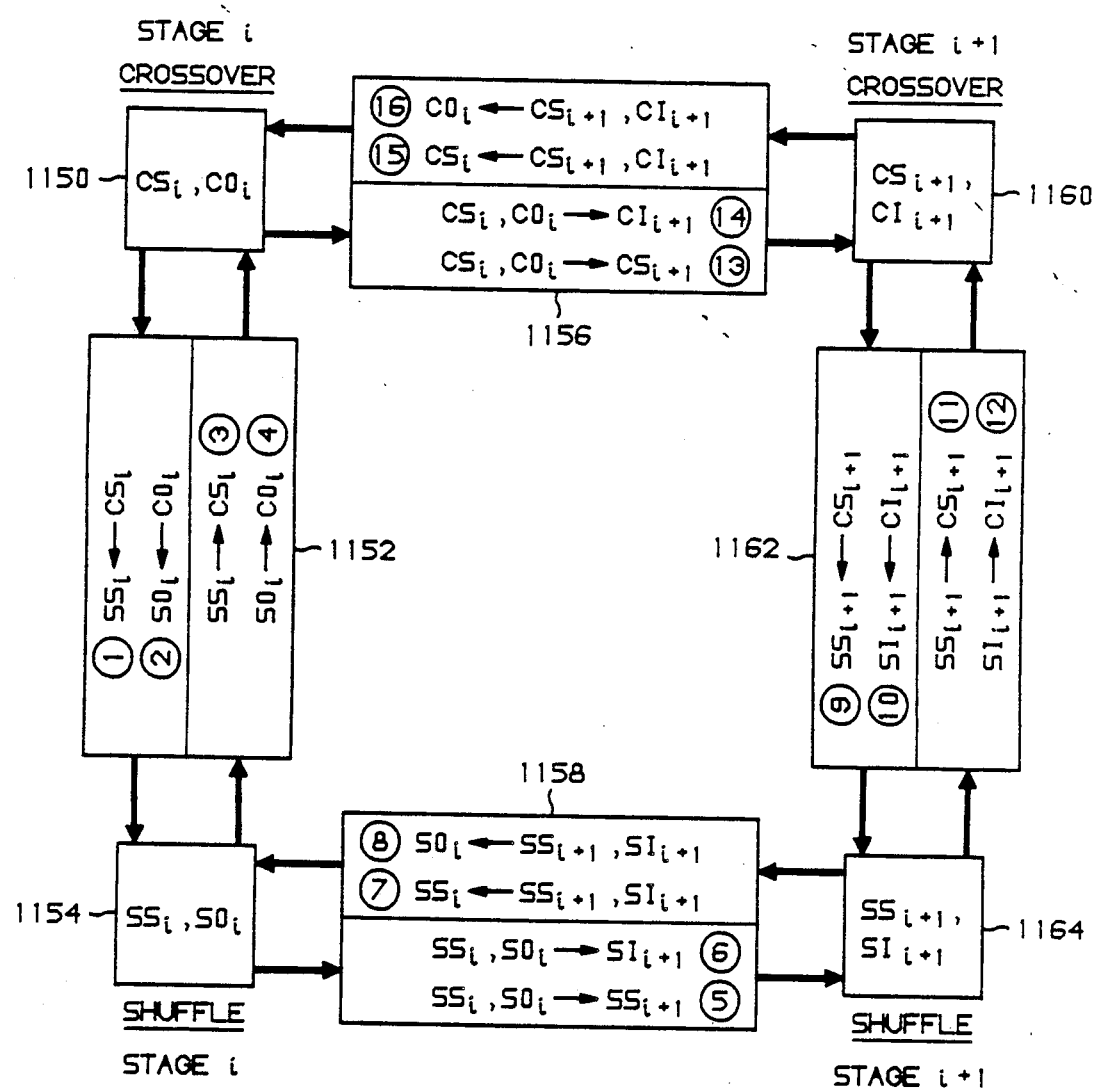
Figures 33, 34:
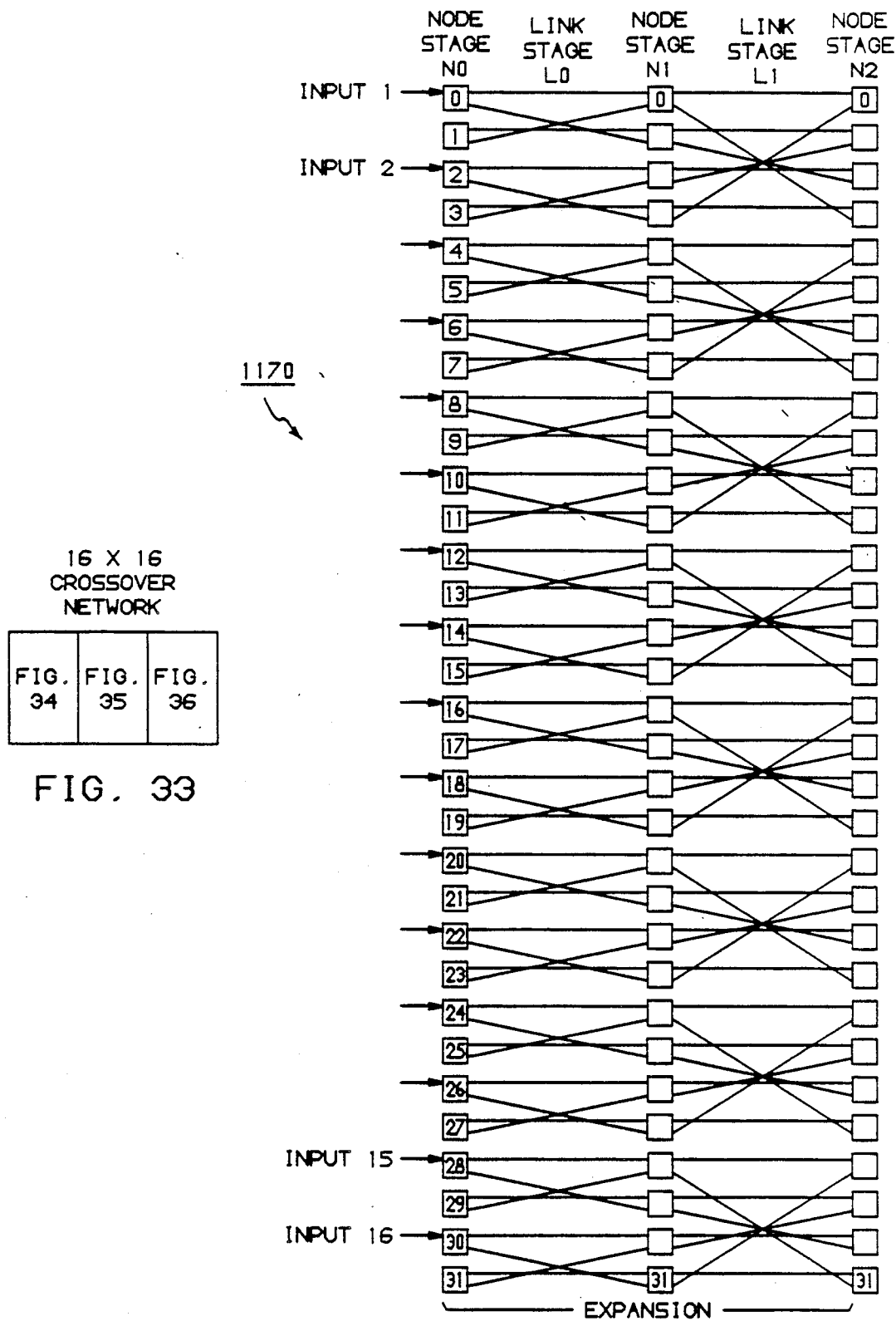
Figure 35:
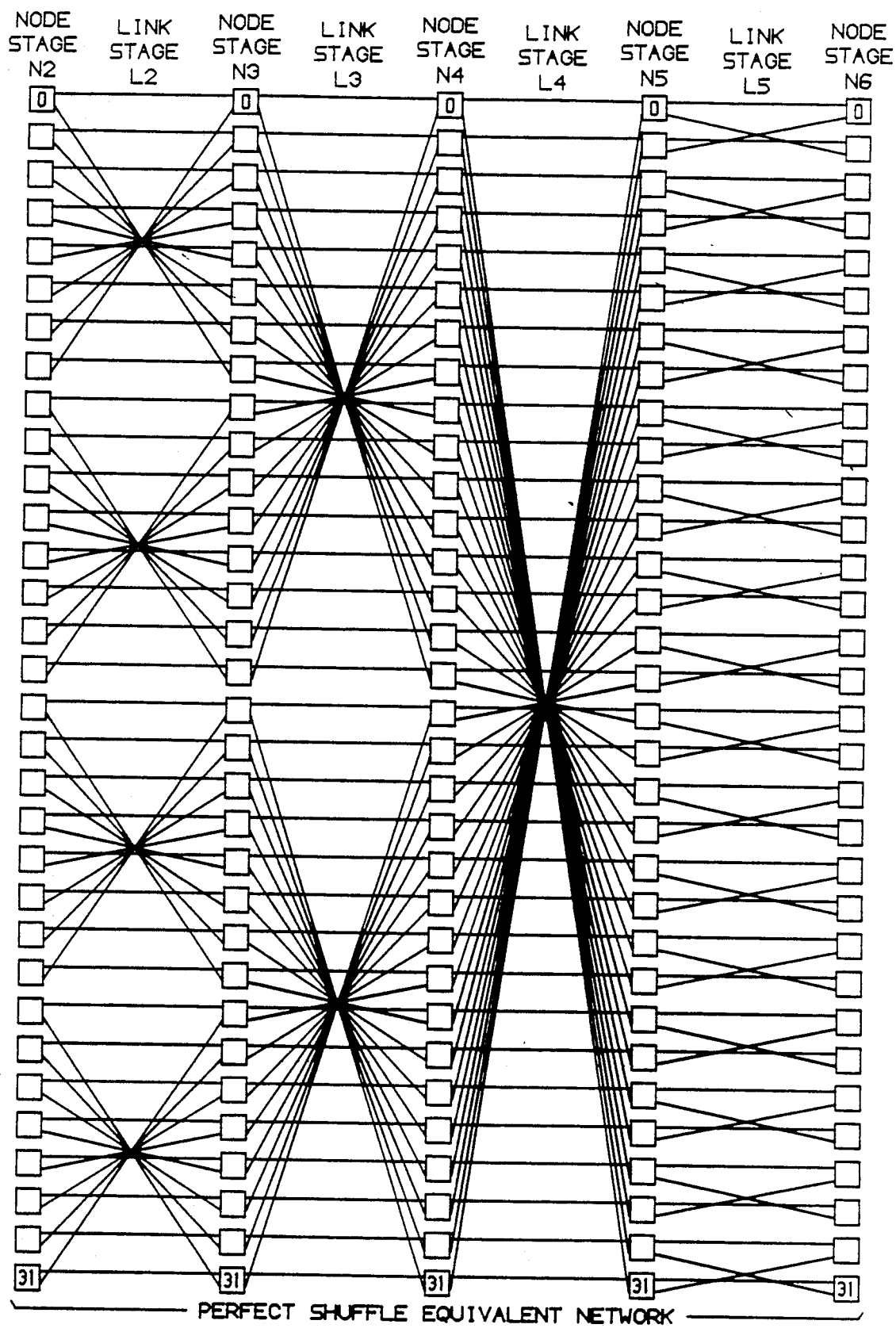
Figure 36:
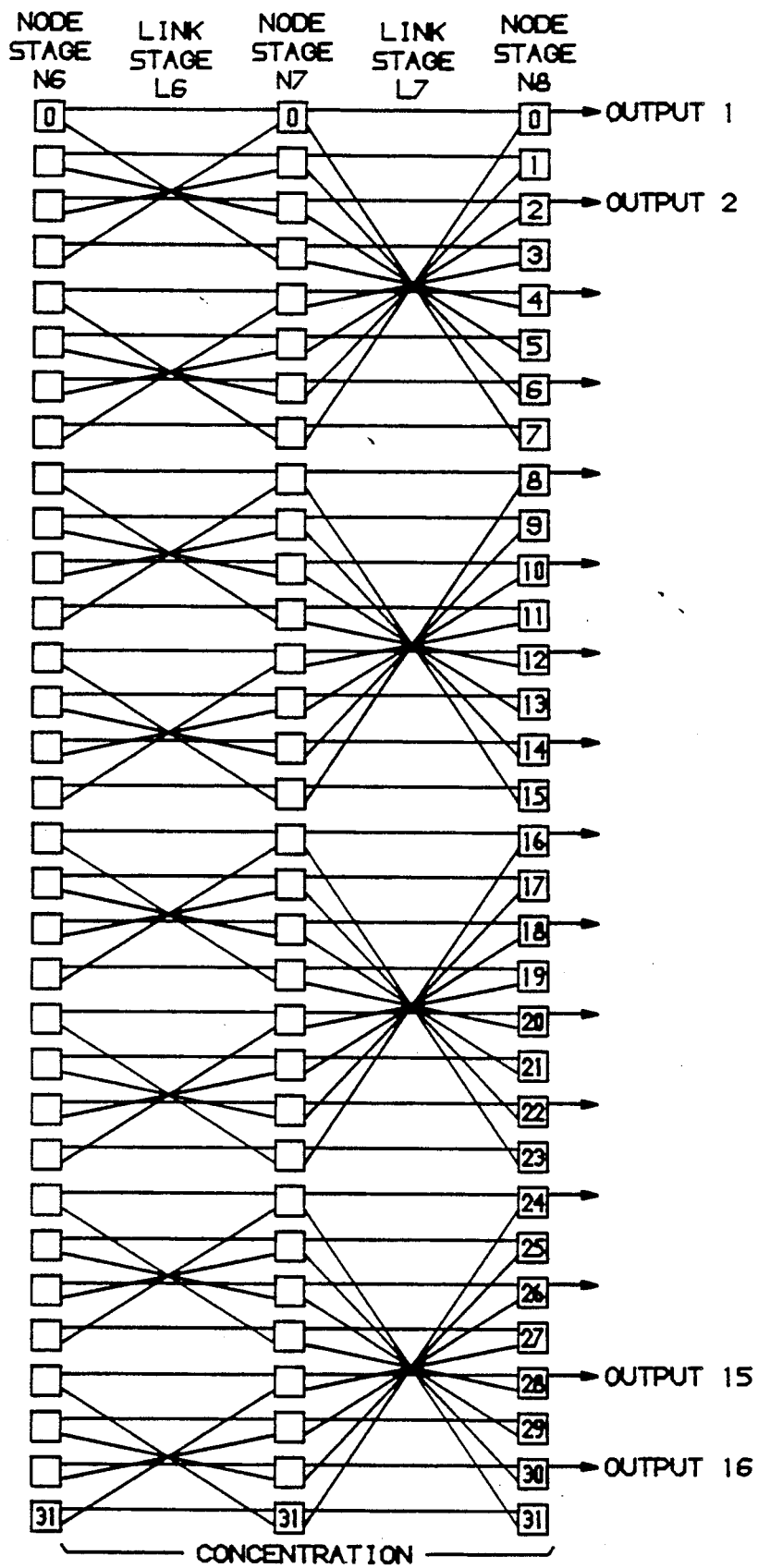
Figure 37:
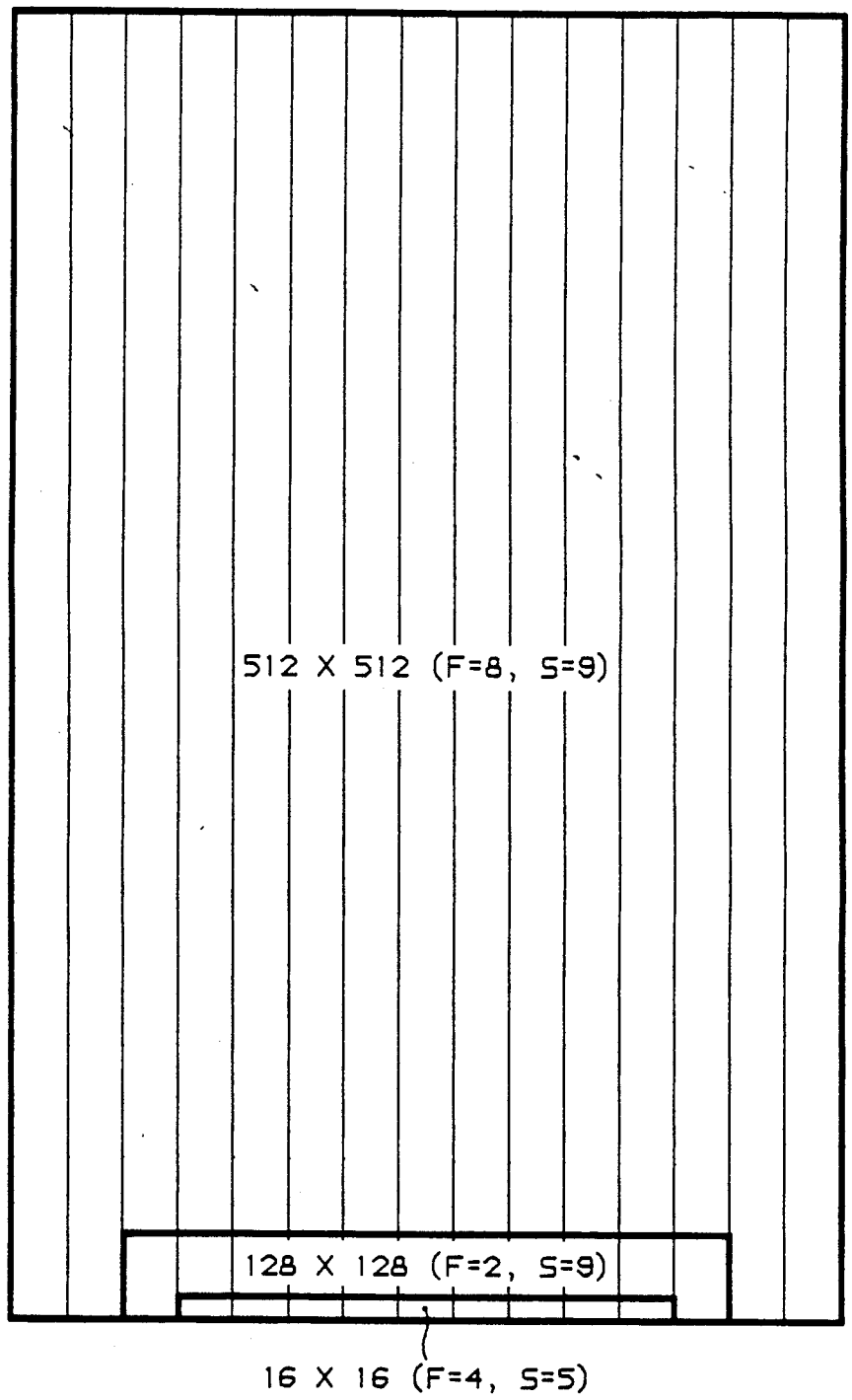
Figure 38:
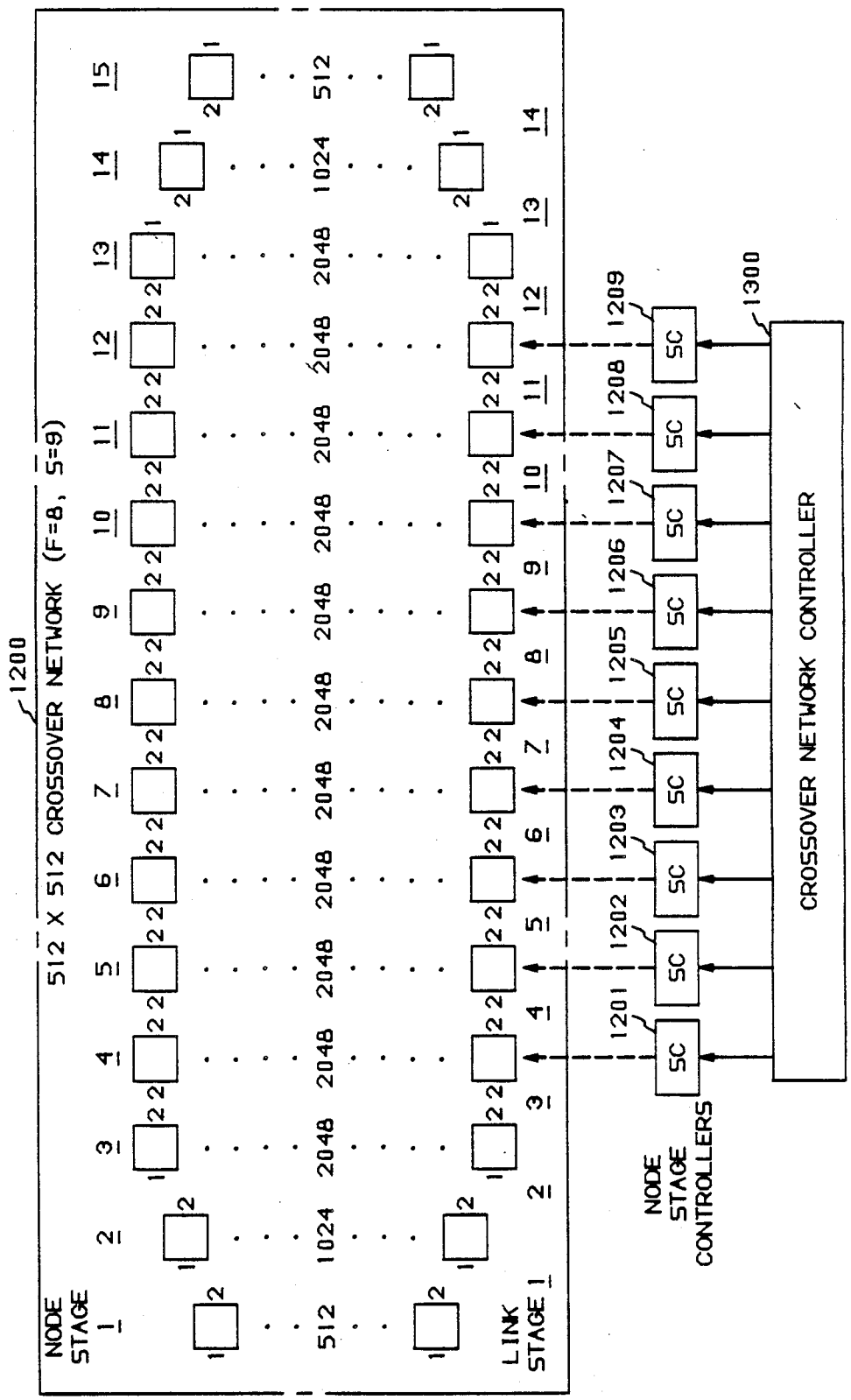
Figure 39:
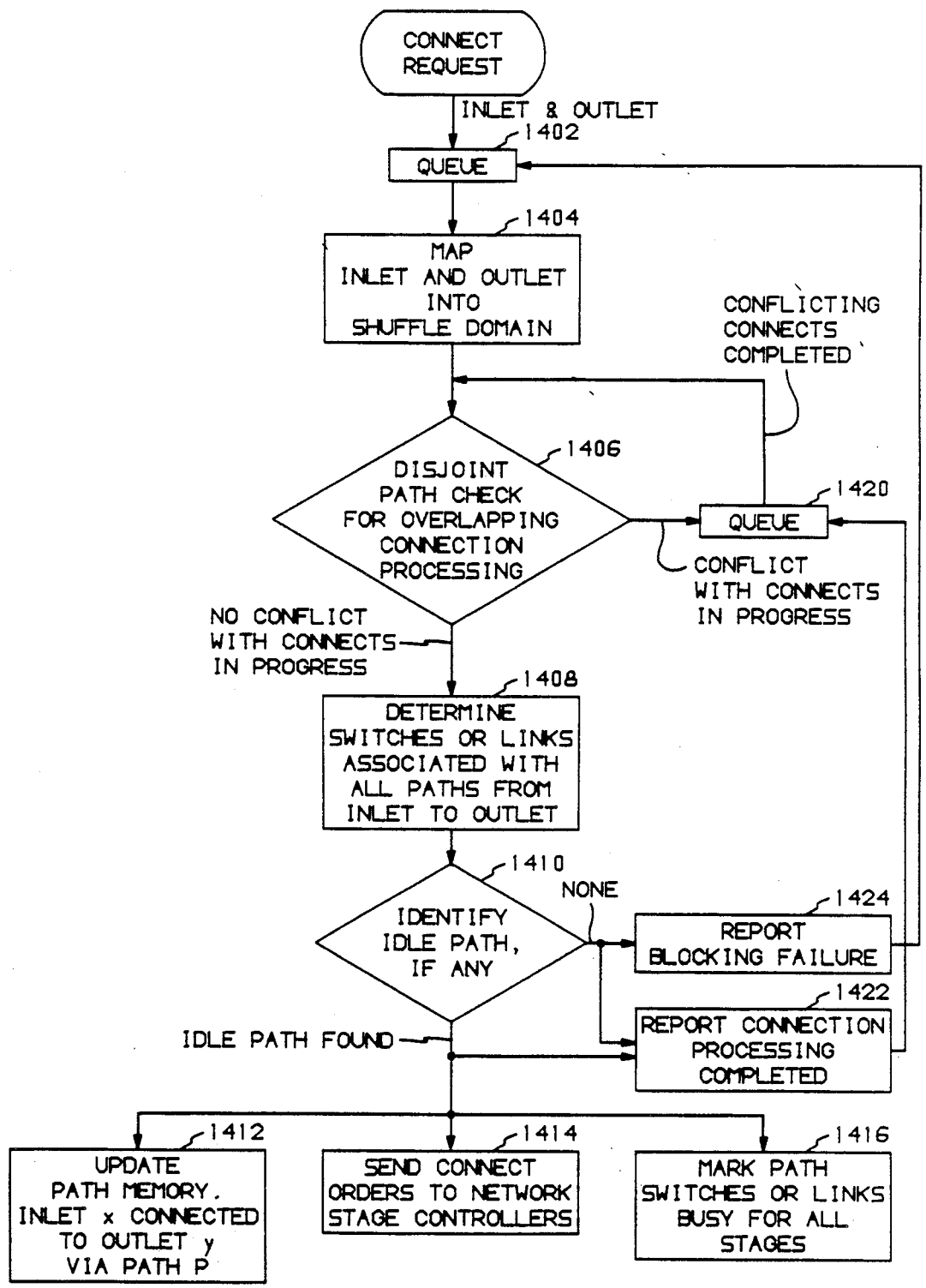
Figure 40:
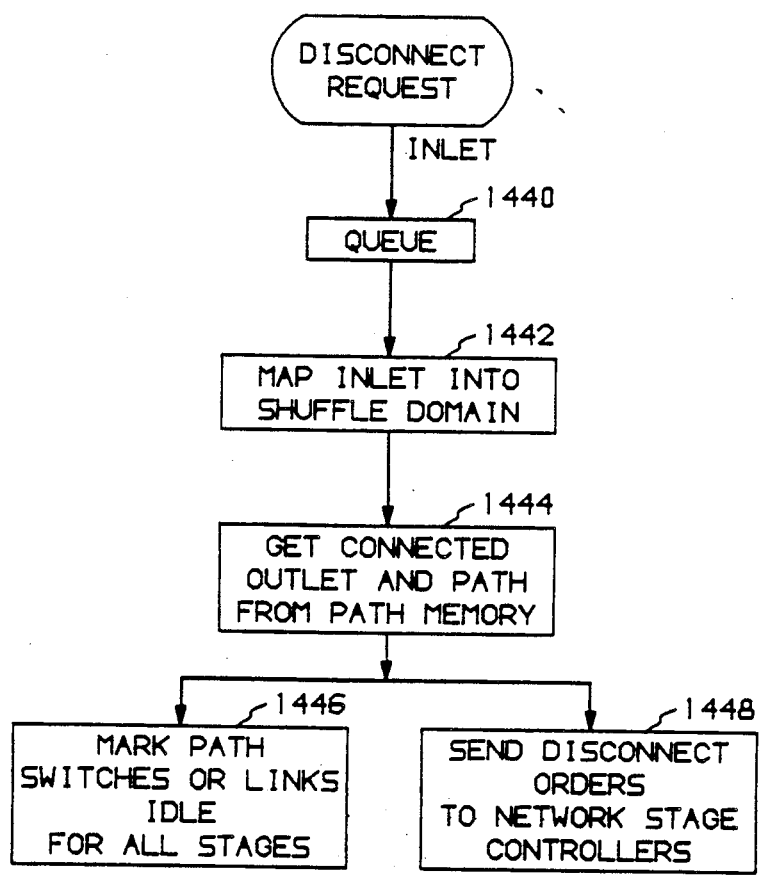
Figure 43:
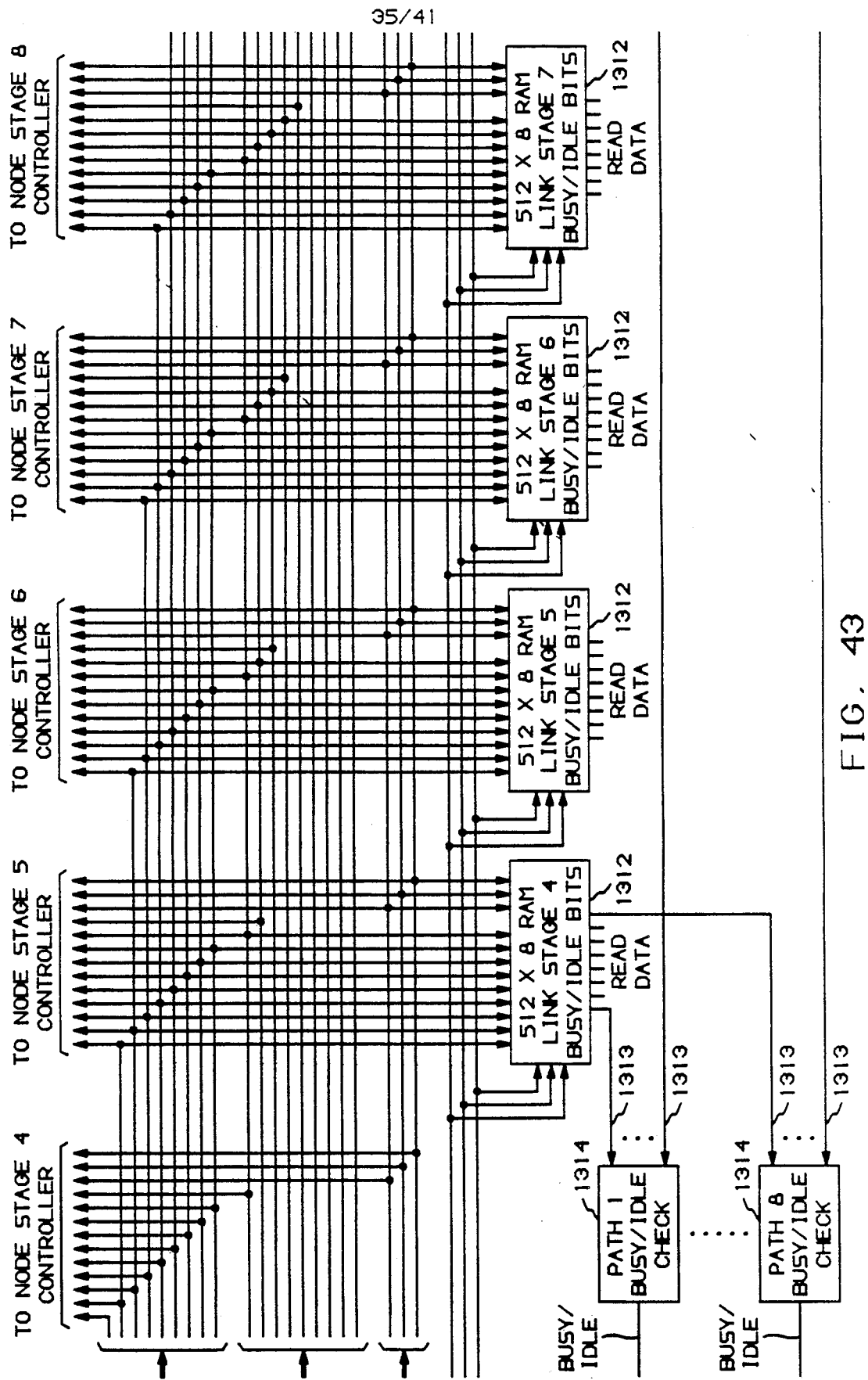
Figure 44:
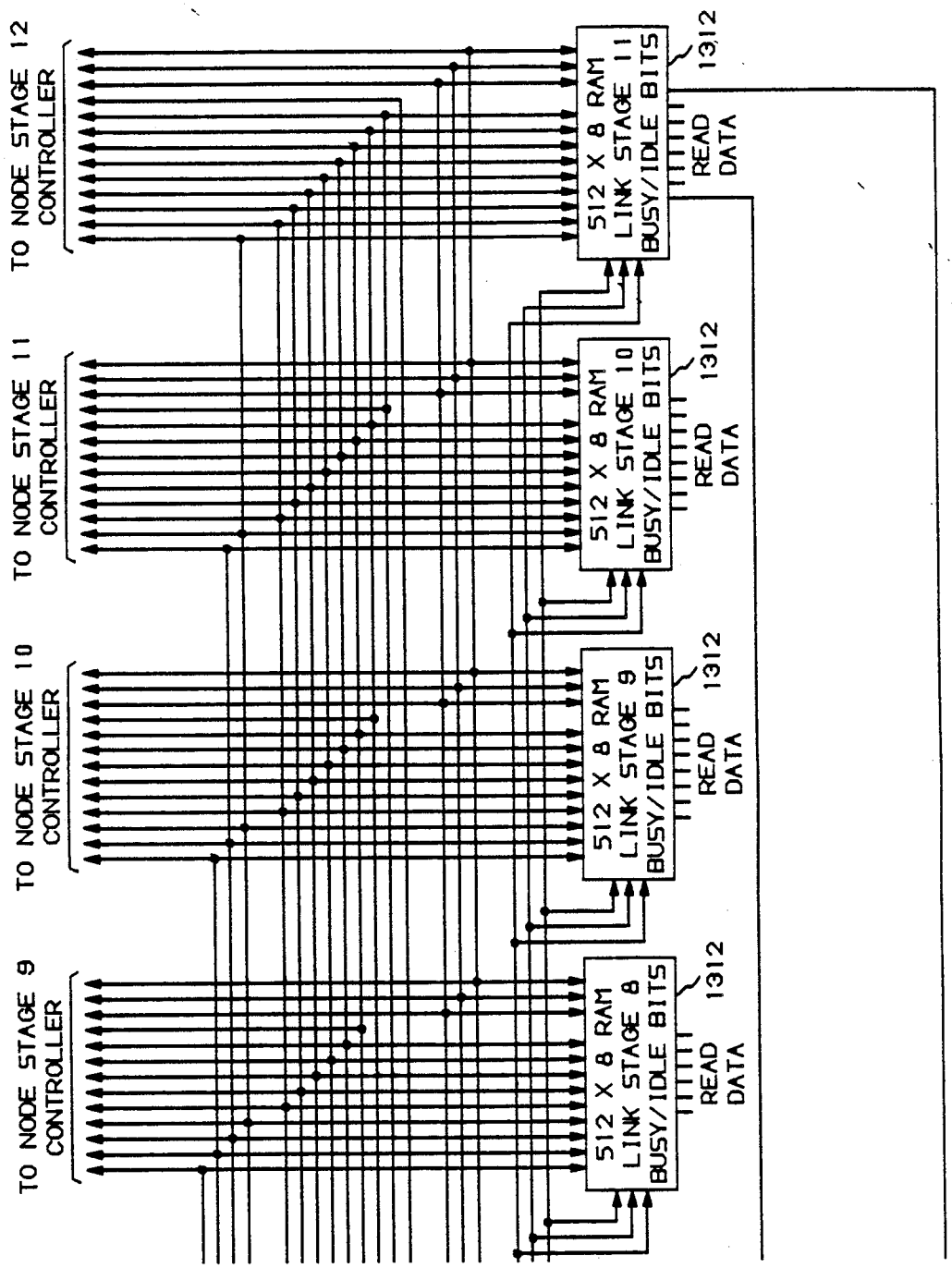
Figure 45:
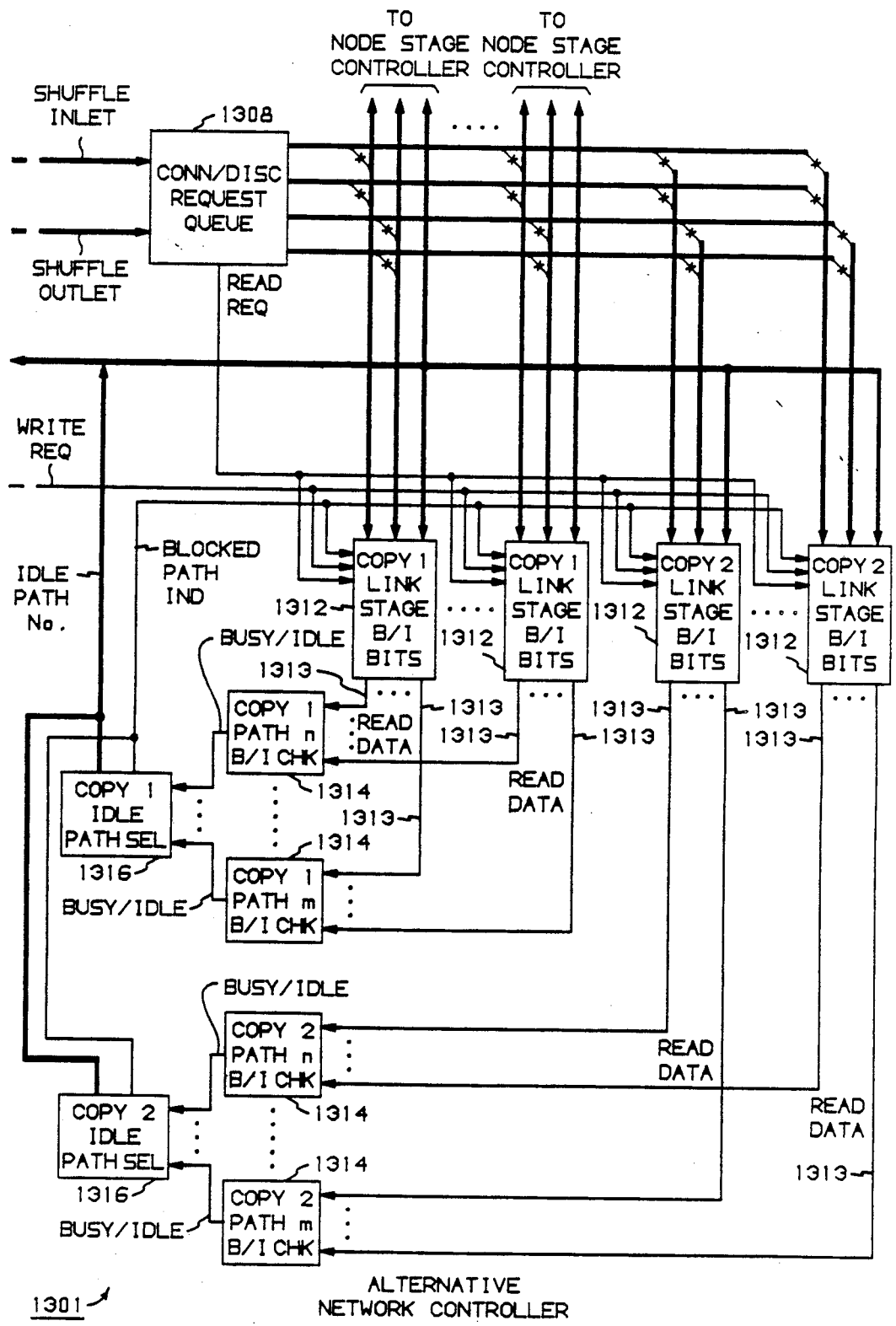
Figure 46:
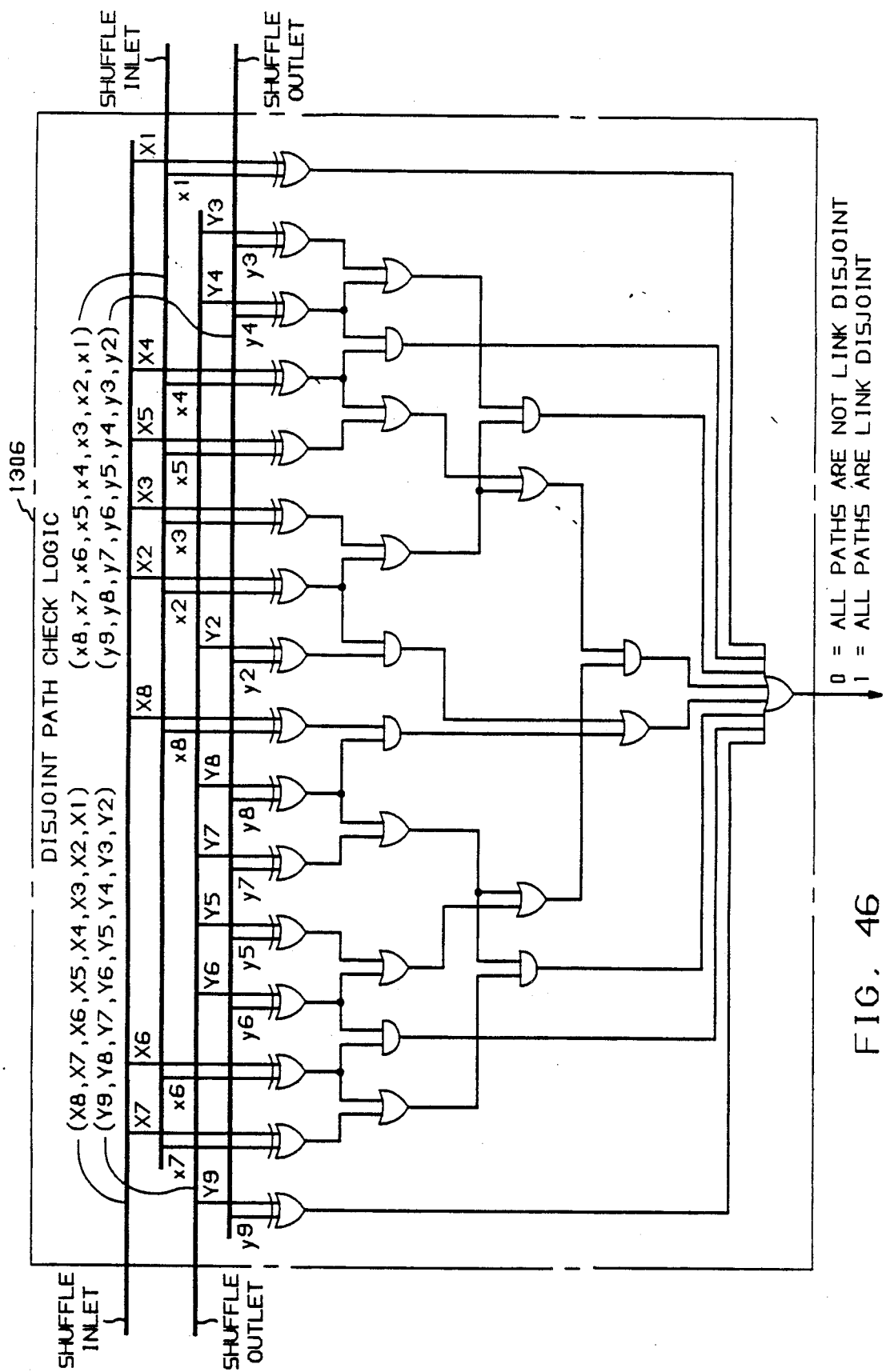
Figures 47, 48, 49:
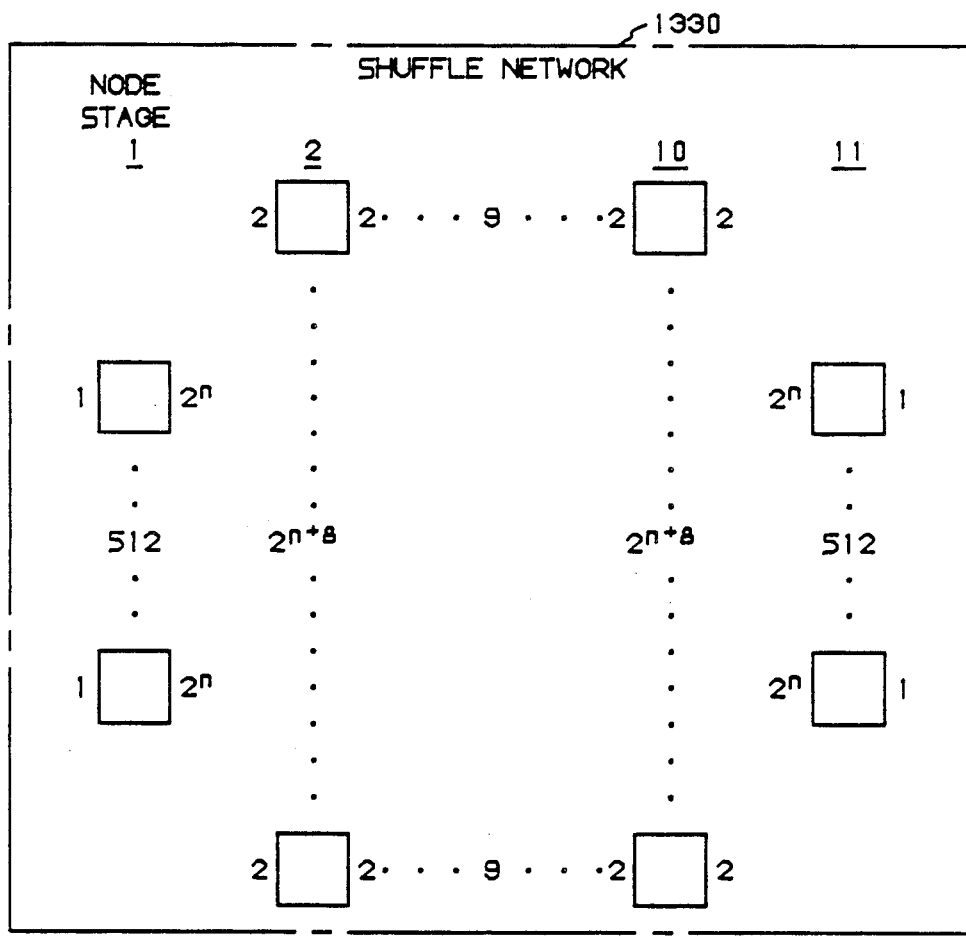
Figure 50:
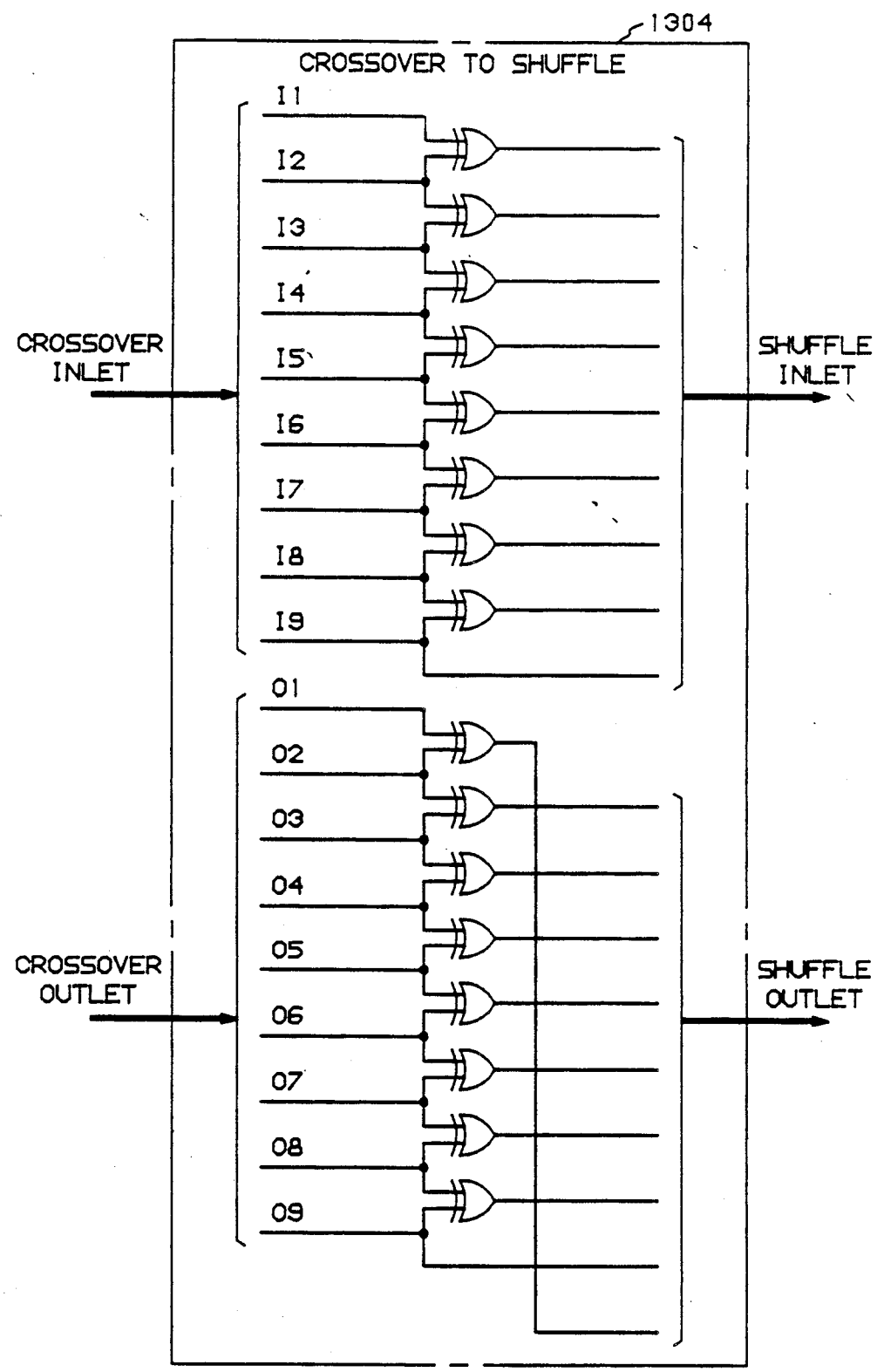
Figure 51:
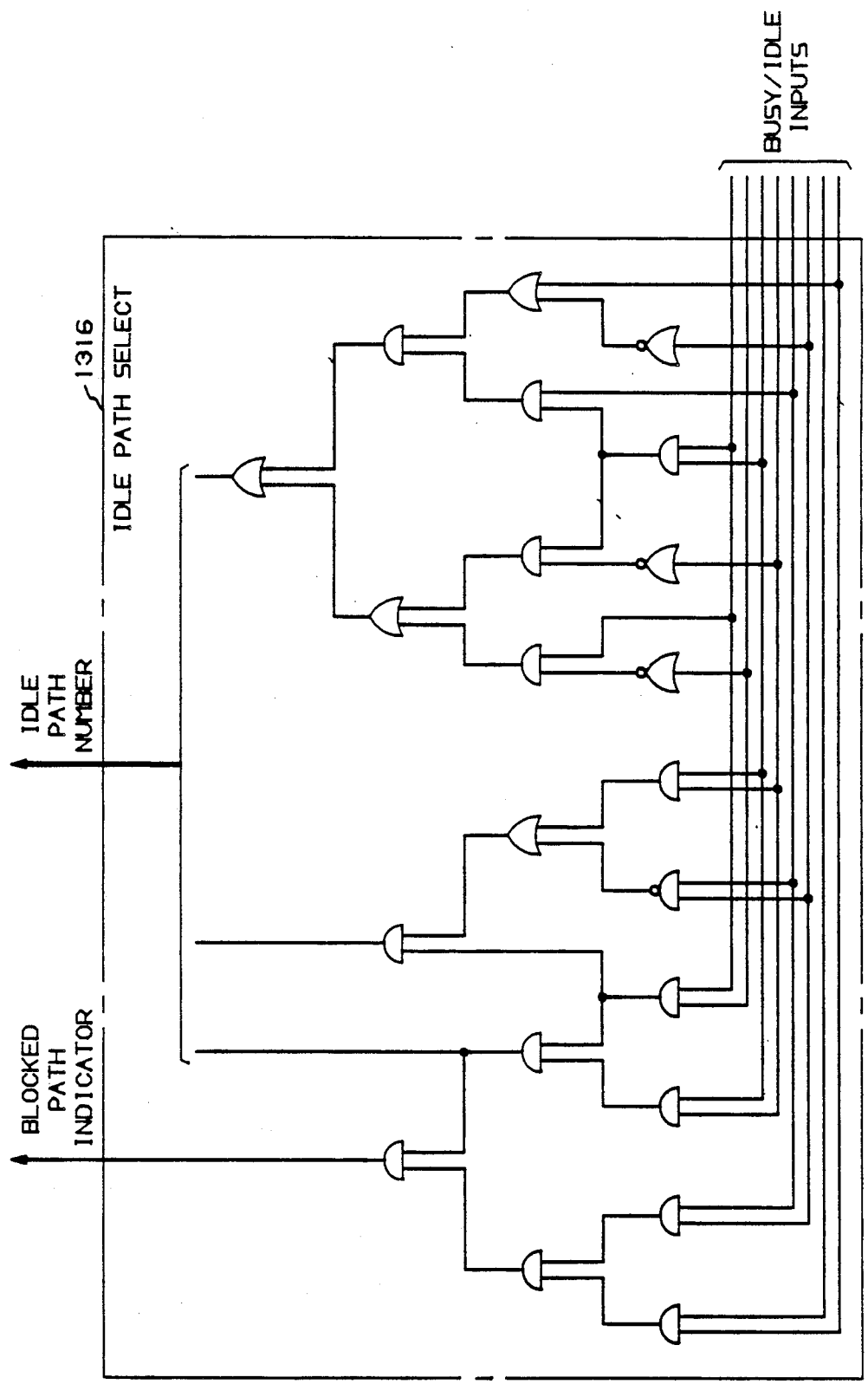

FIGS. 3, 4, and 5 are diagrams of the network topology of FIG. 2 but with different expansion and concentration implementations;

FIGS. 6, 7, and 8 are diagrams of a full capacity node, a capacity one node with selectivity, and a capacity one node without selectivity, respectively, for use in the system of FIG. 2;

FIG. 9 is a diagram of a network topology similar to that of FIG. 2 but without concentration;

FIG. 10 is a diagram of a network topology similar to that of FIG. 2 but without expansion;

FIG. 11 is a diagram of a single stage strictly nonblocking network;

FIG. 12 is a diagram of a strictly nonblocking three stage Clos network;

FIG. 13 is a diagram of a general strictly nonblocking three stage Clos network;

FIG. 14 is a diagram of a strictly nonblocking five stage Clos network;

FIG. 15 is a diagram of a multistage interconnection network (MIN);

FIG. 16 is a diagram of a particular type of MIN, referred to herein as an extended generalized shuffle (EGS) network;

FIGS. 17 and 18 are diagrams of an example EGS network;

FIG. 19 is a diagram illustrating a channel graph L(x,y) from inlet x to outlet y of the network of FIGS. 17 and 18;

FIG. 20 is a diagram showing a single intersecting call in addition to the channel graph L(x,y) of FIG. 19;

FIGS. 21 and 23 are diagrams of the network of FIG. 16 that are used in deriving nonblocking criteria for the network;

FIG. 22 is a diagram of the network of FIG. 18 that is used in describing a network property referred to herein as the forward-backward invariance property (FBIP);

FIG. 24 is a diagram of an example nonblocking EGS network;

FIG. 25 is a diagram of a particular perfect shuffle equivalent network—the crossover (or half crossover) network;

FIG. 26 is a diagram of an EGS network representing an important special case of perfect shuffle equivalent networks;

FIG. 27 is a path hunt processing flow chart used to effect the path hunt function in an EGS network of FIG. 16 with fully capacity nodes;

FIG. 28 is a path hunt processing flow chart used to effect the path hunt function in an EGS network of FIG. 16 with capacity one nodes;

FIG. 29 is a diagram of an exemplary shuffle network used in explaining the relationship of the switches and links of a shuffle network to the inlet, path and outlet numbers;

FIG. 30 is a diagram illustrating the concatenation of binary representations of inlet, path, and outlet numbers for the network of FIG. 29 to form a single binary number;

FIG. 31 is a diagram illustrating the determination of switches, links, inputs and outputs for the network of FIG. 29 from a single binary number;

FIG. 32 is a schematic illustration of the transformations between various stages of two isomorphic network types—crossover networks and shuffle networks—where the transformations are specified herein in Tables 1-3;

FIGS. 34-36, when arranged in accordance with FIG. 33, comprise a diagram of a 16×16 two-dimensional crossover network using one-dimensional arrays of nodes;

FIG. 37 is a diagram illustrating the relative sizes of the 16×16 crossover network of FIGS. 34-36, a 128×128 crossover network, and a 512×512 crossover network of FIG. 38;

FIG. 38 is a diagram of a 512×512 crossover network and a corresponding crossover network controller;

FIG. 39 is a connection request processing flow chart for the crossover network controller of FIG. 38;

FIG. 40 is a disconnect request processing flow chart for the crossover network controller of FIG. 38;

FIGS. 42-44, when arranged in accordance with FIG. 41, comprise a diagram of a hardware logic circuit implementation of the crossover network controller of FIG. 38;

FIG. 45 is a diagram of an alternative network controller embodiment that has duplicate copies of the network controller memories;

FIG. 46 is a diagram of a disjoint path check unit of the controller of FIGS. 42-44;

FIG. 47 is a timing diagram illustrating overlap path hunt processing by the controller of FIGS. 42-44;

FIG. 48 is a timing diagram illustrating overlap path hunt processing by the alternative controller of FIG. 45;

FIG. 49 is a diagram of a network having a first stage of $1 \times 2^n$ elements, a last stage of $2^n \times 1$ elements, and for which the disjoint path check unit of FIG. 46 is applicable;

FIG. 50 is a diagram of a crossover to shuffle mapping unit of the controller of FIGS. 42-44; and FIG. 51 is a diagram of an idle path select unit of the controller of FIGS. 42-44.

DETAILED DESCRIPTION

The description which follows is arranged in two parts. First, a reduced blocking network topology is described. Advantageously, the topology is implementable in the photonics domain. Network control arrangements are then described for rapidly finding paths and establishing communications through such reduced blocking networks.

NETWORK TOPOLOGY

FIG. 2 is a diagram of a system 1600 comprising an expansion (fanout) section 1610, a perfect shuffle equivalent network 1620, and a concentration (fanin) section 1630. System 1600 has N=4 inlets and M=4 outlets. Perfect shuffle equivalent network 1620 has four node stages 1621-0, 1621-1, 1621-2 and 1621-3 comprising 2×2 nodes, and three link stages 1622-0, 1622-1 and 1622-2 each effecting the same perfect shuffle interconnection of successive node stages. Expansion section 1610 expands the N=4 inlets to 16 (more than N) inputs of the first node stage 1621-0. Concentration section 1630 concentrates 16 (more than M) outputs of the last node stage 1621-3 to the M=4 outlets. System 1600 has at least two paths between each of the N inlets and each output of the last node stage. Individual nodes of the node stages 1621-0, 1621-1, 1621-2 and 1621-3 are controlled by corresponding stage controllers 1640, 1641, 1642, 1643 in response to instructions from a shuffle network controller 1650.

Three alternative implementations for the expansion section 1610 and concentration section 1630 are shown in FIGS. 3, 4 and 5. In expansion section 1710 (FIG. 3), each of the N=4 inlets is directly connected to four of the inputs of node stage 1621-0. In concentration section 1730, four outputs of node stage 1621-3 are directly connected to each of the M=4 outlets. Expansion section 1810 (FIG. 4) has a single stage 1811 of 1×4 nodes and concentration section 1830 has a single stage 1831 of 4×1 nodes. Expansion section 1910 (FIG. 5) has two stages 1911 and 1912 of 1×2 nodes and concentration section 1930 has two stages 1931 and 1932 of 2×1 nodes. Each of the expansion section 1710, 1810, 1910 connects each of the N inlets to multiple inputs of node stage 1621-0 in a perfect shuffle sustaining pattern as defined herein. Each of the concentration sections 1730, 1830, 1930 connects multiple outputs of node stage 1621-3 to each of the M outlets in a perfect shuffle sustaining pattern as defined herein.

Three alternative 2×2 switching nodes 1510, 1520, and 1530 for use in system 1600 are shown in FIGS. 6, 7 and 8. A node with n inputs and m outputs is said to be a full capacity node if it is able to convey min {n,m} signals at the same time. A node is said to be a capacity one node if it is able to convey only one signal at a time. A capacity one node may have selectivity of either inputs or outputs or may have no selectivity.

Node 1510 (FIG. 6), a full capacity node, comprises two selectors 1511 and 1512. Selector 1511 connects either of the node inputs I1 and I2 to node output O1 in response to a selection signal S1. Selector 1512 connects either of the node inputs I1 and I2 to node output O2 in response to a selection signals S2.

Node 1520 (FIG. 7), a capacity one node with input selectivity, comprises two AND-gates 1521 and 1522, and an OR-gate 1523. AND-gate 1521 transmits a signal from input I1, via OR-gate 1523, to both outputs O1 and O2 in response to a selection signal S1. AND-gate 1522 transmits a signal from input I2, via OR-gate 1523, to both outputs O1 and O2 in response to a selection signal S2. Only one of the selection signals S1 and S2 is a logic one at any time.

Node 1530 (FIG. 8), a capacity one node without selectivity, comprises an OR-gate 1531 and an AND-gate 1532. When a control signal C is a logic one, AND-gate 1532 transmits the logic union of the signals at the inputs I1 and I2, to both outputs O1 and O2. When the control signal C is a logic zero, AND-gate 1532 transmits a logic zero to both outputs O1 and O2. Only one of the inputs I1 and I2 receives an active signal at any time.

Node 1530 represents a special case of a more general switching node referred to herein as an nxm-module. An nxm-module, which has n inputs and m outputs, either routes the logical union of the signals at the n inputs to all of the m outputs, or routes none of the signals at the n inputs to any of the m outputs. If a network of nxm-modules is controlled such that at most one input of an nxm-module has an active signal, the nxm-module functions to either route the signal to all of the m outputs or to leave the m outputs idle. Node 1530 is a 2×2-module, also referred to herein as a 2-module.

When system 1600 (FIG. 5) is implemented using 2-modules, such as node 1530, as the switching nodes of perfect shuffle equivalent network 1620 as well as in expansion section 1910 and concentration section 1930, the 2-modules of perfect shuffle equivalent network 1620 rae individually disabled or enabled as necessary such that none of the 2-modules has more than one active input signal. The 2-modules of the last expansion node stage 1912 are also individually disabled or enabled (not shown in FIG. 5) such that a signal received at a given one of the N inlets is transmitted to only two 2-modules of node stage 1621-0. To improve the tolerance of system 1600 to faults, such as a particular 2-module output becoming locked at one logic value, all the expansion and concentration 2-modules may be controllable.

FIG. 9 is a diagram of a system 1601 having N=4 inlets and M=16 outlets. Systems 1601 is identical to system 1600 (FIG. 2) except that concentration section 1630 is not required.

FIG. 10 is a diagram of a system 1602 having N=16 inlets and M=4 outlets. System 1602 is identical to system 1600 (FIG. 2) except that expansion section 1610 is not required.

Before describing the blocking characteristics of systems such as system 1600, the fundamental principles of strictly nonblocking networks are discussed. The condition for a network to be strictly nonblocking is that the minimum number of paths between any input-output pair must exceed the maximum number of paths which can be blocked between that pair. However, a sufficient (but not necessary) condition for a network to be strictly nonblocking is that the minimum number of paths between any input-output pair exceeds the maximum number of paths which can be blocked between any input-output pair. In equation form, this sufficient condition is expressed as:

PATHS ≧ BLOCKED PATHS + 1.

A helpful network attribute is that the number of paths and blocked paths varies only slightly (or not at all) for any input-output pair selection.

A single stage strictly nonblocking network 1002 is shown in FIG. 11. In network 1002, the minimum number of paths between any input-output pair is equal to one. There are not blocked paths because each horizontal rail is uniquely associated with an input and each vertical rail is uniquely associated with an output. Therefore, we have

PATHS = 1 ≧ BLOCKED PATHS + 1 = 0 + 1.

Accordingly, network 1002 is a strictly nonblocking network. In network 1002, there are N×M crosspoints but only min {N,M} are ever used at one time. To make a more efficient network, multiple stages are employed so as to create more paths than possible blocked paths while simultaneously decreasing the number of crosspoints.

A 24×24 strictly nonblocking three stage Clos network 1004 is shown in FIG. 12. There are five paths between each inlet and outlet, one through each middle stage switch. Any inlet (outlet) may have two paths blocked by the other two inlets (outlets) on its switch. If these two pairs of blocked paths are disjoint, a total of four paths are blocked. Thus, applying the strictly nonblocking condition, we have 5 ≧ (2+2)+1. The number of crosspoints in network 1004 is 3×5×5+5×3×8=560. For comparison, a 24×24 crossbar network has 576 crosspoints.

A general strictly nonblocking three stage Clos network 1006 is shown in FIG. 13. (The inter-stage links are omitted in FIG. 13.) Applying the strictly nonblocking condition to network 1006, the minimum number of paths between any input-output pair is equal to r. The maximum number of blocked paths is equal to (n−1)+(m−1) and therefore whenever r ≧ n+m−1, network 1006 is strictly nonblocking. Note that an S+2 stage Clos network can be recursively produced from an S stage Clos network by simply replacing each switch in a given stage with a three stage Clos network. A strictly nonblocking five stage Clos network 1008 as shown in FIG. 14 with the number of links between stages indicated thereon. Two problems in implementing Clos networks in the photonic domain are: (1) non-square, non-small switching elements, and (2) different numbers of links between stages (increasing geometrically toward the center).

A multistage interconnection network (MIN) 1010 is shown in FIG. 15 and is defined by the following five conditions:

(1) a MIN has some arbitrary number S stages of nodes, (2) there are $r_i$ nodes in stage i, each having $n_i$ inputs and $m_i$ outputs, (3) nodes in different stages may have different values of $n_i$ and $m_i$, (4) for $1 \leq i \leq S-1$, the outputs of nodes in stage i are connected (via links) to the inputs of nodes in stage i+1, and (5) $r_i m_i = r_{i+1} n_{i+1}$ for $1 \leq i \leq S-1$.

An extended generalized shuffle (EGS) network 1012 is shown in FIG. 16. An EGS network is a MIN with a particular specified link interconnection pattern. In any stage i the nodes are numbered consecutively from 0 to $r_i - 1$ and the outputs on a particular node are numbered consecutively from 0 to $m_i - 1$. The outputs of the stage i nodes are then numbered consecutively from 0 to $r_i m_i - 1$; output $o_i$ on node $x_i$ is numbered $x_i m_i + o_i$. The EGS interconnection pattern is staged as follows: stage i output $x_i m_i + o_i$ is connected to node $(x_i m_i + o_i) \bmod r_{i+1}$ in stage i+1. This interconnection pattern assigns links consecutively to nodes in the next stage (the so called perfect shuffle). An important implication of the EGS interconnection pattern is that the number of paths between any two nodes in two given stages never differs by more than one. For i<j, the number of paths between a node in stage i and a node in stage j is either $$\left\lceil \prod_{k=i}^{j-1} m_k / r_j \right\rceil = \left\lceil \prod_{k=i+1}^{j} n_k / r_i \right\rceil \text{ or}$$

$$\left\lfloor \prod_{k=i}^{j-1} m_k / r_j \right\rfloor = \left\lfloor \prod_{k=i+1}^{j} n_k / r_i \right\rfloor.$$

where ⌈x⌉ denotes the smallest integer ≧x and ⌊x⌋ denotes the largest integer ≦x. Consider an EGS network with $N = n_1 r_1$ inlets and $m = m_s r_s$ outlets. The minimum number of paths between any inlet-outlet pair is given by $$\left\lfloor \prod_{k=1}^{S-1} m_k/r_S \right\rfloor = \left\lfloor \prod_{k=1}^{S} m_k/M \right\rfloor =$$

$$\left\lfloor \prod_{k=2}^{S} n_k/r_1 \right\rfloor = \left\lfloor \prod_{k=1}^{S} n_k/N \right\rfloor.$$

An example EGS network 1014 is shown in FIGS. 17 and 18. To determine the number of paths between input x and output y, we calculate $$\text{Paths} = \left\lfloor \prod_{k=1}^{S} m_k/M \right\rfloor = \lfloor 3 \times 3 \times 2 \times 2 \times 1 / 12 \rfloor =$$

$$\lfloor 36 / 12 \rfloor = 3.$$

The channel graph $L(x,y)$ of input x and output y is the union of all paths between x and y. To ascertain an upperbound on the number of blocked paths, we must determined the number of calls which can intersect any channel graph and also the number of paths that each call can block. The channel graph $L(x,y)$ is shown by dark lines in FIG. 19.

The channel graph $L(x,y)$ is shown by dashed lines in FIG. 20. A single intersecting call (shown by dark lines in FIG. 20) blocks one of the three paths of $L(x,y)$. Consider a call that intersects $L(x,y)$ on j-i links from node stage i to node stage j (j>i). Denote a link from node stage k to node stage k+1 as a stage k link. The number of paths between input x and output y blocked by link i of the intersection call C(i,j) is given by the product of the number of paths from x to the stage i node of C(i,j) and the number of paths from the stage i+1 node of C(i,j) to y. The maximum number of paths from any input (or stage 1 node) to any stage i node is $$\left\lceil \prod_{k=2}^{i} n_k/r_1 \right\rceil = \left\lceil \prod_{k=1}^{i} n_k/N \right\rceil$$

and the maximum number of paths from any stage i+1 node to any output (or stage S node) is $$\left\lceil \prod_{k=i+1}^{S-1} m_k/r_S \right\rceil = \left\lceil \prod_{k=i+1}^{S} m_k/M \right\rceil.$$

Thus, the maximum number of paths between x and y blocked by link i of C(i,j) is $$\left\lceil \prod_{k=1}^{i} n_k/N \right\rceil \times \left\lceil \prod_{k=i+1}^{S} m_k/M \right\rceil.$$

The additional number of paths blocked by link i+1 is given by $$\left\lceil \prod_{k=1}^{i+1} n_k/N \right\rceil \times \left\lceil \prod_{k=i+2}^{S} m_k/M \right\rceil - \left\lceil \prod_{k=1}^{i} n_k/N \right\rceil \times \left\lceil \prod_{k=i+2}^{S} m_k/M \right\rceil.$$

The second term subtraction corrects for the fact that the first term includes some paths blocked by link i; namely, all those paths reaching link i+1 via link i. Employing a similar correction for each remaining link of C(i,j) we have that the number of paths blocked by C(i,j) is given by $$\text{BLOCKED PATHS}(i,j) \leq \sum_{k=1}^{j-1} \left\lceil \frac{\prod_{p=1}^{k} n_p}{N} \right\rceil \left\lceil \frac{\prod_{p=k+1}^{s} m_p}{M} \right\rceil - \sum_{k=i}^{j-2} \left\lceil \frac{\prod_{p=1}^{k} n_p}{N} \right\rceil \left\lceil \frac{\prod_{p=k+2}^{s} m_p}{M} \right\rceil.$$

Referring to network 1012 (FIG. 21), consider the following. Since $n_1 \leq N$ and $$\prod_{p=1}^{k} n_p$$

is nondecreasing in k, there must exist some stage t such that for $1 \leq k \leq t$, $$\left\lceil \frac{\prod_{p=1}^{k} n_p}{N} \right\rceil = 1 \text{ and for } t+1 \leq k \leq S, \left\lceil \frac{\prod_{p=1}^{k} n_p}{N} \right\rceil > 1.$$

Similarly, there must exist a stage u such that for $u \leq k \leq S$, $$\left\lceil \frac{\prod_{p=k}^{S} m_p}{M} \right\rceil = 1 \text{ and for } 1 \leq k \leq u-1, \left\lceil \frac{\prod_{p=k}^{S} m_p}{M} \right\rceil > 1.$$

The relationship $$\left\lceil \frac{\prod_{p=1}^{t+1} n_p}{N} \right\rceil > 1$$

implies that all inlets have at least one path to every stage t+1 node and therefore that intersecting call C(i,j) must have $i \leq t+1$ and similarly, because $$\left\lceil \frac{\prod_{p=u-1}^{S} m_p}{M} \right\rceil > 1.$$

must have $j \leq u-1$. Using all of this information, we are able to establish that the expression for blocked paths becomes $$\text{BLOCKED PATHS}(i,j) \leq \left\lceil \frac{\prod_{p=i+1}^{S} m_p}{M} \right\rceil +$$

$$\left\lceil \frac{\prod_{p=1}^{j-1} n_p}{N} \right\rceil + \sum_{k=t+1}^{u-2} \left\lceil \frac{\prod_{p=1}^{k} n_p}{N} \right\rceil \times$$

$$\left( \left\lceil \frac{\prod_{p=k+1}^{S} m_p}{M} \right\rceil - \left\lceil \frac{\prod_{p=k+2}^{S} m_p}{M} \right\rceil \right) -$$

$$\left\lceil \frac{\prod_{p=t+2}^{S} m_p}{M} \right\rceil$$

where, conventionally, it is understood that the summation term $$\sum_{k=t+1}^{u-2}$$

equals zero if $t+1 > u-2$ and the product term $$\prod_{p=t+2}^{S}$$

equals one if $t+2 > S$. Note that $$\left\lceil \frac{\prod_{p=i+1}^{S} m_p}{M} \right\rceil$$

is a function of the entry point i and that $$\left\lceil \frac{\prod_{p=1}^{j-1} n_p}{N} \right\rceil$$

is a function of the departure point j. In addition, $$\sum_{k=t+1}^{u-2} \left\lceil \frac{\prod_{p=1}^{k} n_p}{N} \right\rceil \left( \left\lceil \frac{\prod_{p=k+1}^{S} m_p}{M} \right\rceil - \right.$$

$$\left. \left\lceil \frac{\prod_{p=k+2}^{S} m_p}{M} \right\rceil \right) - \left\lceil \frac{\prod_{p=t+2}^{S} m_p}{M} \right\rceil$$

is a constant for all intersecting calls. Therefore, the upperbound on paths blocked by a single intersecting call is a separable function of the entry point, departure point, plus a constant.

We are now left with determining the maximum number of calls that can intersect a channel graph. Since the number of paths blocked by a single intersecting call is a separable function of the entry point, departure point, plus a constant, we need only determine the maximum number of calls which can enter and depart at each stage. We do not have to associate the entry and departure points of a given call. We are now ready to consider an import property of EGS networks (called the forward-backward invariance property) which holds for any set of consecutive stages of the network meeting a particular condition. If the forward-backward invariance property holds for certain portions of the network, the maximum number of entering and departing calls at each stage can be drastically reduced.

The forward-backward invariance property (FBIP) can be stated as follows: every stage j node which can be reached by a given stage i node reaches exactly the same set of stage i nodes. The FBIP holds for stages i and j in an EGS network if $$\prod_{k=i}^{j-1} m_k$$

divides $r_j$. The paths between certain stage 3 and stage 5 nodes for network 1014 are shown by dark lines in FIG. 22. Note that every stage 5 node which can be reached by a given stage 3 node reaches exactly the same set of stage 3 nodes. The FBIP is important because it drastically reduces intersecting calls an e multistage modularity.

With reference to network 1012 shown in FIG. 23, assume that FBIP holds for stages 1 through i, i.e., $$\prod_{p=1}^{i-1} m_p$$

divides $r_i$. Thus, every stage i node which can be reached by some inlet x reaches exactly the same set of first stage nodes or inlets. Since any stage i node can reach at most $$\prod_{p=1}^{i} n_p$$

inlets (the product of the $n_p$ fanouts from stage i through stage (1), at most $$\prod_{p=1}^{i} n_p - 1$$

calls can enter the channel graph L(x,y) from stage 1 through stage i (point A in FIG. 23). Similarly, if FBIP holds for stages i+2 through S, then at most $$\prod_{p=i+2}^{S} m_p - 1$$

calls can depart from stage i+2 through stage S (point B in FIG. 23). For worst case considerations, we assume that all calls which enter at or before stage i depart at or before stage i+1 and all calls which depart at or after stage i+2 enter at or after stage i+1. Thus, for a given i, $1 \leq i \leq S-2$, the number of calls intersecting a channel graph is upperbounded by $$\prod_{p=1}^{i} n_p - 1 + \prod_{p=i+2}^{s} m_p - 1.$$

Minimizing for i and considering that at most min $\{N-1, M-1\}$ calls can intersect a channel graph, we have that the maximum number of calls $\omega$ intersecting a channel graph is given by:

$$\omega = \min_{1 \leq i \leq S-2} \left\{ \prod_{p=1}^{i} n_p + \prod_{p=i+2}^{S} m_p - 2, N-1, M-1 \right\}.$$

The arguments which are used to obtain this result are valid if FBIP holds for all stages 1 through i in which $$\prod_{p=1}^{i} n_p \leq \omega$$

and also for all stages j through S in which $$\prod_{p=j}^{S} m_p \leq \omega.$$

We have thus far determined that there are:

(1) at least $\left\lfloor \prod_{k=1}^{S} m_k / M \right\rfloor$ paths between any input-output pair, (2) at most $\left\lceil \dfrac{\prod_{p=i+1}^{S} m_p}{M} \right\rceil + \left\lceil \dfrac{\prod_{p=1}^{j-1} n_p}{N} \right\rceil +$ $$\sum_{k=i+1}^{u-2} \left\lceil \dfrac{\prod_{p=1}^{k} n_p}{N} \right\rceil \times$$

$$\left( \left( \left\lceil \dfrac{\prod_{p=k+1}^{S} m_p}{M} \right\rceil - \left\lceil \dfrac{\prod_{p=k+2}^{S} m_p}{M} \right\rceil \right) - \left\lceil \dfrac{\prod_{p=i+2}^{S} m_p}{M} \right\rceil \right)$$

paths blocked by a call entering a channel graph at stage i and departing at stage j, and (3) at most $\omega = \min_{1 \leq i \leq S-2} \left\{ \prod_{p=1}^{i} n_p + \prod_{p=i+2}^{S} m_p - 2, N-1, M-1 \right\}$ calls intersecting a channel graph if $\prod_{p=1}^{i} n_p$ divides $N$ for $\prod_{p=1}^{i} n_p \leq \omega$ and $\prod_{p=j}^{S} m_p$ divides $M$ for $\prod_{p=j}^{S} m_p \leq \omega$.

So, all we have left to determine are the maximum numbers of calls which can enter and depart at each stage of the channel graph.

Recall that at most $$\prod_{p=1}^{i} n_p - 1$$

calls can enter L(x,y) in network 1012 (FIG. 23) at point A from stage 1 through stage i. But also, at most $\omega$ calls can enter from stage 1 through stage i. Also recall that at most $$\prod_{p=i+2}^{S} m_p - 1$$

calls can depart L(x,y) from point B of network 1012 from stage i+2 through stage S. But also, at most $\omega$ calls can depart from stage i+2 through stage S. Thus, as many as $$\min \left\{ \prod_{p=1}^{i} n_p - 1, \omega \right\}$$

calls can enter from stage 1 through stage i, and as many as $$\min \left\{ \prod_{p=1}^{i-1} n_p - 1, \omega \right\}$$

calls can enter from stage 1 through stage i−1. Assuming a maximum number of calls entering through stage i−1, we have at most $$\min\left\{\pi_{p=1}^{i} n_p - 1, \omega\right\} - \min\left\{\pi_{p=1}^{i-1} n_p - 1, \omega\right\}$$

calls entering at stage i. And similarly, we have at most $$\min\left\{\pi_{p=i}^{S} m_p - 1, \omega\right\} - \min\left\{\pi_{p=i+1}^{S} m_p - 1, \omega\right\}$$

calls departing at stage i. We are now able to state the fundamental condition for strictly nonblocking EGS networks:

$$\left\lfloor \pi_{k=1}^{S} m_k/M \right\rfloor \geq \sum_{i=1}^{S} \left( \left( \min\left\{\pi_{p=1}^{i} n_p - 1, \omega\right\} - \min\left\{\pi_{p=1}^{i-1} n_p - 1, \omega\right\} \right) \times \left\lceil \frac{\pi_{p=i+1}^{S} m_p}{M} \right\rceil + \left( \min\left\{\pi_{p=1}^{S} m_p - 1, \omega\right\} - \min\left\{\pi_{p=i+1}^{S} m_p - 1, \omega\right\} \right) \times \left\lceil \frac{\pi_{p=1}^{i-1} n_p}{N} \right\rceil \right) + \omega \times \left( \sum_{k=i+1}^{u-2} \left\lceil \frac{\pi_{p=1}^{k} n_p}{N} \right\rceil \times \left( \left\lceil \frac{\pi_{p=k+1}^{S} m_p}{M} \right\rceil - \left\lceil \frac{\pi_{p=k+2}^{S} m_p}{M} \right\rceil \right) - \left\lceil \frac{\pi_{p=i+2}^{S} m_p}{M} \right\rceil \right) + 1, \text{ where } \left\lfloor \pi_{k=1}^{S} m_k/M \right\rfloor$$

is the minimum number of paths between any input-output pair, $$\min\left\{\pi_{p=1}^{i} n_p - 1, \omega\right\} - \min\left\{\pi_{p=1}^{i-1} n_p - 1, \omega\right\}$$

is the maximum number of entering calls at stage i, $$\left\lceil \frac{\pi_{p=i+1}^{S} m_p}{M} \right\rceil$$

is the number of paths blocked by calls entering at stage i, $$\min\left\{\pi_{p=1}^{S} m_p - 1, \omega\right\} - \min\left\{\pi_{p=i+1}^{S} m_p - 1, \omega\right\}$$

is the maximum number of departing calls at stage i, $$\left\lceil \frac{\pi_{p=1}^{i-1} n_p}{N} \right\rceil$$

is the number of paths blocked by the call departing at stage i, $\omega$ is the maximum number of intersecting calls, and $$\sum_{k=i+1}^{u-2} \left\lceil \frac{\pi_{p=1}^{k} n_p}{N} \right\rceil \left( \left\lceil \frac{\pi_{p=k+1}^{S} m_p}{M} \right\rceil - \left\lceil \frac{\pi_{p=k+2}^{S} m_p}{M} \right\rceil \right) - \left\lceil \frac{\pi_{p=i+2}^{S} m_p}{M} \right\rceil$$

is a constant component of blocked paths for all intersecting calls.

This can then be stated as a fundamental theorem for strictly nonblocking EGS networks: any EGS network which has $N = n_1 r_1$ inlets and $M = m_s r_s$ outlets and in which $$\pi_{p=1}^{i} n_p \text{ divides } N \text{ for } \pi_{p=1}^{i} n_p \leq \omega \text{ and}$$

$$\pi_{p=j}^{S} m_p \text{ divides } M \text{ for } \pi_{p=j}^{S} m_p \leq \omega,$$

and in which $$\left\lfloor \pi_{k=1}^{S} m_k/M \right\rfloor \geq \omega \times \left( \sum_{k=i+1}^{u-2} \left\lceil \frac{\pi_{p=1}^{k} n_p}{N} \right\rceil \left( \left\lceil \frac{\pi_{p=k+1}^{S} m_p}{M} \right\rceil - \left\lceil \frac{\pi_{p=k+2}^{S} m_p}{M} \right\rceil \right) - \left\lceil \frac{\pi_{p=i+2}^{S} m_p}{M} \right\rceil \right) + 1 + \sum_{i=1}^{S} \left( \left( \min\left\{\pi_{p=1}^{i} n_p - 1, \omega\right\} - \min\left\{\pi_{p=1}^{i-1} n_p - 1, \omega\right\} \right) \times \left\lceil \frac{\pi_{p=i+1}^{S} m_p}{M} \right\rceil + \right.$$

-continued $$\left(\min\left\{\prod_{p=1}^{S} m_p - 1, \omega\right\} - \min\left\{\prod_{p=i+1}^{S} m_p - 1, \omega\right\}\right) \times$$

$$\left\lceil \frac{\prod_{p=1}^{i-1} n_p}{N} \right\rceil \right).$$

where t is the largest value of i such that $$\prod_{p=1}^{i} n_p \leq N,$$

u is the smallest value of i such that $$\prod_{p=1}^{S} m_p \leq M, \text{ and } \omega =$$

$$\min_{1 \leq i \leq S-2}\left\{\prod_{p=1}^{i} n_p + \prod_{p=i+2}^{S} m_p - 2, N - 1, M - 1\right\}$$

is strictly nonblocking for point-to-point connections.

The previous development assumed full capacity nodes (capacity=min{$n_i$,$m_i$}). Similar developments can be made for capacity one nodes with selectivity, and for capacity one nodes without selectivity. Separate results are merged via the introduction of a variable $\alpha$, where $\alpha=1$ for full capacity nodes, $\alpha=0$ for capacity one nodes with selectivity, and $\alpha=-1$ for capacity one nodes without selectivity. The fundamental theorem for strictly nonblocking EGS networks is than stated as follows: any EGS network (where $\alpha=1$ for full capacity nodes, $\alpha=0$ for capacity one nodes with selectivity, and $\alpha=1$ for capacity one nodes without selectivity) which has $N=n_1 r_1$ inlets and $M=m_s r_s$ inlets and in which $$\prod_{p=1}^{i} n_p \text{ divides } N \text{ for } \prod_{p=1}^{i} n_p \leq \omega \text{ and}$$

$$\prod_{p=j}^{S} m_p \text{ divides } M \text{ for } \prod_{p=j}^{S} m_p \leq \omega, \text{ and in which}$$

$$\left\lfloor \prod_{k=1}^{S} m_k/M \right\rfloor \geq \omega \times$$

$$\left(\sum_{k=t+1}^{u-1-\alpha}\left\lceil\frac{\prod_{p=1}^{k} n_p}{N}\right\rceil\left(\left\lceil\frac{\prod_{p=k+\alpha}^{S} m_p}{M}\right\rceil - \left\lceil\frac{\prod_{p=k+1+\alpha}^{S} m_p}{M}\right\rceil\right) + 1 + \sum_{i=1}^{S}\left(\left(\min\left\{\prod_{p=1}^{i} n_p - 1, \omega\right\} - \min\left\{\prod_{p=1}^{i-1} n_p - 1, \omega\right\}\right) \times\right.\right.$$

$$\left\lceil \frac{\prod_{p=i+\alpha}^{S} m_p}{M} \right\rceil +$$

$$\left(\min\left\{\prod_{p=1}^{S} m_p - 1, \omega\right\} - \min\left\{\prod_{p=i+1}^{S} m_p - 1, \omega\right\}\right) \cdot$$

$$\left\lceil \frac{\prod_{p=1}^{i-\alpha} n_p}{N} \right\rceil\right).$$

where t is the largest value of i such that $$\prod_{p=1}^{i} n_p \leq N,$$

u is the smallest value of i such that $$\prod_{p=1}^{S} m_p \leq M, \text{ and } \omega =$$

$$\min_{1 \leq i \leq S-1-\alpha}\left\{\prod_{p=1}^{i} n_p + \prod_{p=i+1+\alpha}^{S} m_p - 2, N - 1, M - 1\right\}$$

is strictly nonblocking for point-to-point connections. The great design flexibility of EGS network stems primarily from the fact that the conditions for nonblocking operation are global and are based solely on N, M, $\alpha$, and various $n_i$ and $m_i$ products. Thus, in general, nonblocking conditions do not depend on the relationship between a particular $n_i$ and $m_i$.

An example nonblocking EGS network 1016 is shown in FIG. 24. If the output links in each stage of this network are assigned consecutively to the nodes in the next stage (perfect shuffle), then any idle input can be connected to any idle output, regardless of the current connection stage of the network, i.e., the network is strictly nonblocking.

A multistage interconnection network (MIN) g is said to be a perfect shuffle equivalent network if either of the following two conditions holds.

CONDITION 1

For every stage i of G these exists a one-to-one mapping $\phi hd i$ from the $r_i$ stage i nodes of G onto the integer set $\{0,1,\ldots,r_{il}-1\}$ such that node $\alpha$ in stage i of G is connected to node $\beta$ in stage i+1 of G if and only if $$\phi_{i+1}(\beta) \in \{(\phi_i(\alpha) \times m_i + o_i)_{\text{mod } r_{i+1}} : o_i \in \{0,1,\ldots,m_i-1\}\}.$$

CONDITION 2

For every stage i of G there exists a one-toone mapping $\psi_i$ from the $r_i$ stage i nodes of G onto the integer set $\{0,1,\ldots,r_i-1\}$ such that node $\beta$ in stage i+1 of G is connected to node $\alpha$ in stage i of G if and only if $$\psi_i(\alpha) \in \{(\psi_{i+1}(\beta) \times$$

-continued $$n_{i+1} + i_{i+1})_{mod\ r_i:i_{i+1}} \in \{0,1,\ldots,n_{i+1}-1\}\}.$$

Note that an EGS network is a perfect shuffle equivalent network in that Condition 1 holds when each $\phi_i$ is simply the identity mapping. Let $$C_1 = \{\phi_i: i \in \{1,2,\ldots,S\}\}$$

represent a set of S mappings $\phi_i$ satisfying Condition 1 and let $$C_2 = \{\psi_i: i \in \{1,2,\ldots,S\}\}$$

represent a set of S mappings satisfying Condition 2.

An expanding means is said to connected each of the N inlets of G to multiple inputs of the first stage nodes of G in a perfect shuffle sustaining pattern if either of the following two conditions holds.

CONDITION 1e $C_1$ exists, $$\frac{n_1 r_1}{N} = F.$$

an integer, and these exists a one-to-one mapping $\phi_I$ from the N inlets of G onto the integer set $\{0,1,\ldots,N-1\}$ such that inlet $\alpha$ is connected to node $\beta$ in stage 1 of G if and only if $$\phi_1(\beta) \in \{\{\phi_I(\alpha) \times F + o_I)_{mod\ r_1}: o_I\{0,1,\ldots,F-1\}\},$$

where $\phi_1 \in C_1$.

CONDITION 2e $C_2$ exists, $$\frac{n_1 r_1}{N} = F.$$

an integer, and there exists a one-to-one mapping $\psi_I$ from the N inlets of G onto the integer set $\{0,1,\ldots,N-1\}$ such that node $\beta$ in stage 1 of G is connected to inlet $\alpha$ of G if and only if $$\psi_I(\alpha) \in \{\{\psi_1(\beta) \times n_1 + i_1)_{mod\ N}: i_1 \in \{0,1,\ldots,n_1-1\}\},$$

where $\psi_1 \in C_2$.

A concentrating means is aid to connect multiple outputs of the last stage S of nodes of G to each of the M outlets of G in a perfect shuffle sustaining pattern if either of the following two conditions holds.

CONDITION 1c $C_1$ exists, $$\frac{n_S r_S}{M} = F,$$

an integer, and there exists a one-to-one mapping $\phi_o$ from the M outlets of G onto the integer set $\{0,1,\ldots,M-1\}$ such that node $\alpha$ in stage S of G is connected to outlet $\beta$ if and only if $$\phi_o(\beta) \in \{\{\phi_S(\alpha) \times m_S + o_S)_{mod\ M}: o_S \in \{0,1,\ldots,m_S-1\}\},$$

where $\phi_S \in C_1$.

CONDITION 2c $C_2$ exists, $$\frac{n_S r_S}{N} = F.$$

an integer, and there exists a one-to-one mapping $\psi_o$ from the M outlets of G onto the integer set $\{0,1,\ldots,M-1\}$ such that outlet $\beta$ is connected to node $\alpha$ in stage S of G if and only if $$\psi_S(\alpha) \in \{\{\psi_o(\beta) \times F + i_o)_{mod\ r_S}: i_o \in \{0,1,\ldots,F-1\}\},$$

where $\psi_S \in C_2$.

Network G with such expanding and concentrating means can be equivalently represented as an S+2 stage perfect shuffle equivalent network comprised of an expansion stage of N 1×F nodes, followed by the S stages of G, followed by a concentration stage of M F'×1 nodes. If Condition 1 (2) holds, $\phi_I(\psi_I)$ is applied to the N inlet nodes and inlet node $\alpha$ is connected to node $\beta$ in stage 1 of G according to Condition 1e (2e) and $\phi_o(\psi_o)$ is applied to the M outlet nodes and node $\alpha$ in stage S of G is connected to outlet node $\beta$ according to Condition 1c (2c).

Crossover network 1020 shown in FIG. 25 is a perfect shuffle equivalent network. This can easily be verified by examining the labeling of the nodes in each stage and the interconnection between stages. The existence of such regularized physical interconnection patterns of perfect shuffle equivalent networks is important for implementation consideration.

In a crossover network with $2^k$, 2×2 nodes per stage, each link stage i is comprised of a crossover interconnection pattern having $2^{r_i}$ partitions, where $r_i \in I(k) = \{0,1,\ldots,k-1\}$. The values selected for the various $r_i$ greatly affect the performance and connectivity of the network.

One very useful pattern of $r_i$ selection (that produces a perfect shuffle equivalent network) is to have $r_1 r_2, \ldots, r_k$ by given by any permutation of I(k) and for $i \geq k$, $r_i = r_j$ where $j = 1 + (i-1)_{mod\ k}$; i.e., $r_{k+1} = r_1, R_{k+2} = r_2, \ldots, r_{2k} = r_k$, etc. Many other useful patterns exist that corresponding to networks not in the perfect shuffle equivalent network family.

EGS network 1022 shown in FIG. 26 represents an important special case of perfect shuffle equivalent networks. In network 1022 $S \geq 3$, $n_1 = 1$, $m_1 = F$, $r_1 = N$, $n_2 = F$, $M_S = 1$, $r_S = N$, and for $2 \leq i \leq S-1$, $n_i = m_i = n$, and $$r_i = \frac{FN}{n}.$$

LET:
- P(B) = probability that a given idle inlet and outlet cannot be connected (blocked).
- P(F) = probability that a given nxn node in stages 2 through S-1 is unusable due to a failure.
- OCC = probability that a given inlet or outlet is busy.
- $\alpha = 0$ for capacity one nxn nodes (with selectivity).
- $\alpha = 1$ for full capacity nxn nodes.

THEN:
  N,F,n,S,P(B), OCC, and α are approximately related by $$P(B) \approx \left[1 - \left(1 - P(F) - \frac{(n-1)OCC}{n^\alpha F}\right)^{S-2-\alpha}\right]^{\frac{FnS-2}{N}}$$

For $3 \leq S \leq 2\log_n N + 1 - \alpha$
LET:
  $P_S(B) = P(B)$ for a network with S stages
THEN:
  $P_{S+1}(B)$ and $P_S(B)$ are approximately related by
  $P_{S+1}(B) \approx P_S(B)^{[n(1-P(F))-(n-1)n1-\alpha x\, OCC/F]}$
If $$F > \frac{(n-1)OCC}{n^\alpha(1 - P(F))},$$

then the exponent is greater than one and $P_S(B)$ decreases double exponentially in S; i.e., $$\log\left(\log \frac{1}{P_S(B)}\right)$$

plotted versus S is a straight line. To demonstrate this dramatic effect assume $P_S(B) = 10^{-1}$ and $P_{S+1}(B) = [P_S(B)]^2$. Then $P_{S+1}(B) = (10^{-1})^2 = 10^{-2}$, $P_{S+2}(B) = [10^{-2}]^2 = 10^{-4}$, $P_{S+3}(B) = [10^{-4}]^2 = 10^{-8}$, $P_{S+4}(B) = [10^{-8}]^2 = 10^{-16}$, etc. Thus, in such a network we have reduced the probability of blocking from $10^{-1}$ to $10^{-16}$ by simply adding four stages.

The previous approximate expression for probability of blocking many be generalized for any perfect shuffle equivalent network G with S stages of nodes, with stage i comprised of $n_i \times m_i$ nodes and with $N = n_1 r_1$ inlets and $M = r_S m_S$ outlets. Setting $P(F) = 0$, $OCC = 1$, and $\alpha = 1$ we get the probability of blocking in G, P(G), approximately given by $$P(G) \approx \left[\prod_{i=1}^{S-1}\left[1 - (n_i - 1) \prod_{j=1}^{i-1} \pi n_j / \prod_{j=1}^{i} \pi m_j\right]\right]^{\prod_{j=1}^{S} m_j/M}$$

$P(G) \leq 0.5$ is a conservative threshold for network G to be useful in applications where blocking probability is at all significant.

NETWORK CONTROL

Recall that network 1012, shown in FIG. 16, is an EGS network having an interconnection pattern that simply assigns links consecutively to switches in the next stage—a perfect shuffle interconnections. The number of paths P between any inlet x and any outlet y in network 1012 is given by $$P = 1 + \left\lfloor \frac{\prod_{j=1}^{S} m_j - 1 - \left(y - x \prod_{j=1}^{S} m_j\right)_{\bmod M}}{M} \right\rfloor.$$

Let I(K) denote the integer set $\{0,1,\ldots,k-1\}$. Denote a given path from inlet x to outlet y by the triple $(x,P^*,y)$, where $P^*$ is an element of I(P). Path $(x,P^*,y)$ will pass through stage i switch $$S_i(x,P^*,y) =$$

$$\left\lfloor \frac{\left\lfloor x \prod_{j=1}^{S} m_j = P^*M + \left(y - x \prod_{j=1}^{S} m_j\right)\right\rfloor_{\bmod M}}{\prod_{j=i+1}^{S} m_j} \right\rfloor_{\bmod r_i}$$

for $1 \leq i \leq S$. Denote a link between stages i and $i+1$ as a stage i link. Path $(x,P^*,y)$ utilizes stage i link $$L_i(x,P^*,y) =$$

$$\left\lfloor \frac{x \prod_{j=1}^{S} m_j + P^*M + \left(y - x \prod_{j=1}^{S} m_j\right)_{\bmod M}}{\prod_{j=i+1}^{S} m_j} \right\rfloor_{\bmod r_i m_i}$$

for $1 \leq i \leq S - 1$.

FIG. 27 is a path hunt processing flow chart used to effect the path hunt function in network 1012 where the switches are full capacity, i.e., $cap(S_i) = \min\{n_i, m_i\}$. Processing begins with block 1102 where a previously unchecked path $P^*$ is selected. In block 1104 the busy/idle status of $L_i(x,P^*,y)$ is checked for all i, $1 \leq i \leq S - 1$. In decision block 1106 a determination is made of whether all the $L_i(x,P^*,y)$ are idle. If all the $L_i(x,P^*,y)$ are idle, processing proceeds from block 1106 to block 1108 where it is concluded that path $P^*$ may be used to connect inlet x to outlet y. If it is determined in block 1106 that all the $L_i(x,P^*,y)$ are not idle, processing continues with decision block 1110. In block 1110 it is determined whether there are other unchecked paths. If there are, processing returns to block 1102 and the processing flow chart is repeated for a new unchecked path. However, if in decision block 1110 it is determined that there are not other unchecked paths, processing branches to block 1112 where it is concluded that all paths are blocked between inlet x and outlet y. The links $L_i$ are checked in the flow chart of FIG. C1 because the switches of network 1012 were assumed to be full capacity.

FIG. 28 is a path hunt processing flow chart used to effect the path hunt function in network 1012 where the switches are capacity one, i.e., $cap(S_i) = 1$. Processing begins with block 1122 where a previously unchecked path $P^*$ is selected. In block 1124 the busy/idle status of $S_i(x,P^*,y)$ is checked for all i, $1 \leq i \leq S$. In decision block 1126 a determination is made of whether all the $S_i(x,P^*,y)$ are idle. If all the $S_i(x,P^*,y)$ are idle processing proceeds from block 1126 to block 1128 where it is concluded that path $P^*$ may be used to connect inlet x to outlet y. If it is determined in block 1126 that all the $S_i(x,P^*,y)$ are not idle, processing continues with decision block 1130. In block 1130 it is determined whether there are other unchecked paths. If there are, processing returns to block 1122 and the processing flow chart is repeated for a new unchecked path. However, if in decision block 1130 it is determined that there are not other unchecked paths, processing branches to block 1132 where it is concluded that all paths are blocked between inlet x and outlet y. The switches $S_i$ are checked in the flow chart of FIG. 28 because the switches of network 1012 were assumed to be of capacity one.

It is significant to note that in performing the path hunt for network 1012, parallel operations are possible. All $S_i(x,P^*,y)$ or $L_i(X,P^*,y)$ busy/idle statuses for all i and $P^*$ may be read concurrently, and then all P paths can be determined busy or idle concurrently. A specific path is then chosen from those found idle, if any.

If the network under consideration is not an EGS network, but is an isomorphic version of an EGS network, inlet x and outlet y must be mapped into their EGS equivalents before applying the routing algorithm(s). A reverse mapping is required to operate switches.

Overlap operation can be performed on a multiplicity of connections to be made if all paths for each inlet/outlet pair are disjoint from all paths for every other inlet/outlet pair.

For convenience, denote $$\prod_{j=1}^{S} m_j = M_i.$$

If M divides $M_1$, the equations for P, $S_i(x,P^*,y)$, and $L_i(x,P^*,y)$ given previously become $$P = \frac{M_1}{M},$$

$$S_i(x,P^*,y) = \left\lfloor \frac{xM_1 + P^*M + y}{M_i} \right\rfloor_{\text{mod } r_i}, \text{ and}$$

$$L_i(x,P^*,y) = \left\lfloor \frac{xM_1 + P^*M + y}{M_{i+1}} \right\rfloor_{\text{mod } r_i m_i}.$$

Consider a network G in which $N = M = 2^n$, $n_1 = m_S = 1$, $m_1 = n_S = 2^k = F$, and, for $2 \leq i \leq s-1$, $n_i = m_i = 2$, where n and k are integers. Then $M_1 = 2^{S-2} \times F = 2^{S-2} \times 2^k = 2^{S+k-2}$ and $$P = \frac{M_1}{M} = \frac{2^{S+k-2}}{2^n} = 2^{S+k-n-2}.$$

We also have $r_1 = r_S = N = M = 2^n$ and $$r_i = \frac{2^n \times 2^k}{2} = 2^{n+k-1}$$

$2 \leq i \leq S - 1$. Additionally, $M_i = 2^{2-i}$ for $2 \leq i \leq S$.

The term $xM_1 + P^*M + y$ thus becomes $x2^{S+k-2} + P^*2^n + y$, x and y range through integer values $0, 1, \ldots, 2^n - 1$ and $P^*$ ranges through integer values $0, 1, \ldots, 2^{S+k-n-2} - 1$. Thus, $P^*2^n$ has values $0, 2^n, 2 \cdot 2^n, 3 \cdot 2^n, \ldots, 2^{S+k-2} - 2^n$ and $P^*2^n + y$ ranges through all integer values from 0 to $2^{S+K-2} - 1$. Also, $x \cdot 2^{S+k-2}$ has values $0, 2^{S+k-2}, \ldots, 2^{S+K+n-2} - 2^{S+k-2}$ and thus $x2^{S+k-2} + P^*2^n + y$ ranges through all integer values from 0 to $2^{S+K+n-2} - 1$.

We can thus represent $xM_1 + P^*M + y = x2^{S+k-2} + P^*2^n + y$ as an $S+k+n-2$ bit binary number as follows $$xM_1 + P^*M + y \equiv \overbrace{xx\ldots x}^{n} \overbrace{pp\ldots p}^{S+k-n-2} \overbrace{yy\ldots y}^{n}$$

Let us consider the expression $$S_i(x,P^*,y) = \left\lfloor \frac{xM_1 + P^*M + y}{M_i} \right\rfloor_{\text{mod } r_i} =$$

$$\left\lfloor \frac{xM_1 + P^*M + y}{2^{S-i}} \right\rfloor_{\text{mod } 2^{n+k-1}}$$

for $2 \leq i \leq s - 1$.

Dividing a binary number by $2^{S-i}$ and taking the floor function is equivalent to shifting the binary number $S - 1$ places to the right. Thus, $$\left\lfloor \frac{xM_1 + P^*M + y}{2^{S-i}} \right\rfloor$$

is equivalent to the binary number enclosed in the following rectangle:

$$\underbrace{\boxed{xx\ldots xpp\ldots}}_{k+n+i-2} \underbrace{.pyy\ldots y}_{S-i}$$

A binary number modulo $2^{n+k-1}$ is given by the rightmost $n + k - 1$ bits of the binary number. Thus, $$\left\lfloor \frac{xM_1 + P^*M + y}{2^{S-i}} \right\rfloor_{\text{mod } 2^{n+k-1}}$$

is equivalent to the binary number enclosed in the following rectangle:

$$\underbrace{xx\ldots}_{i-1} \underbrace{\boxed{.xpp\ldots}}_{n+k-1} \underbrace{.pyy\ldots y}_{S-i}$$

$S_i(x,P^*,y)$ is thus given by a window of $\log_2 r_i$ bits displaced $\log_2 M_i$ bits from the right of the binary representation of $xM_1 + P^*M + y$. Similarly, $L_i(x,P^*,y)$ is given by a window of $\log_2(r_i m_i)$ bits displaced by $\log_2 M_{i+1}$ bits from the right of the binary representation of $xM_1 + P^*M + y$.

The relationship of the switches and links of a shuffle network to the inlet/outlet and path numbers is described herein for the exemplary network 1140, shown in FIG. 29. FIG. 30 illustrates the concatenation of binary representations of inlet 137, path 417, and outlet 291 to form a single binary number. FIG. 31 illustrates that the determination of a particular switch in a given stage can be made simply by selecting a certain number of consecutive bits of the binary number. The particular eleven-bit sequences used to identify the stage 2 switch and the stage 16 switch are illustrated in FIG. 31. Similarly, the twelve-bit sequences used to identify the particular links in stage 2 and stage 16 are also illustrated. The eleven-bit strings identify one out of 2048 switches. The twelve-bit strings identify one out of 4096 links. Also illustrated in FIG. 31 is the method for identifying the particular inputs and outputs of the various stages, based on the bit(s) adjacent to the bit sequences used to identify the switches and links. For example, the stage 2 and stage 16 inputs are identified and the stage 1, stage 2 and stage 16 outputs are identified. Note that for network 1140, output routing is "self-routing"—independent of the input.

Recall that the crossover network and the shuffle network are isomorphic. The transformations between various stages of the two network types are illustrated schematically in FIG. 32. The particular transformations identified in FIG. 32 are listed herein in Tables 1–3. In FIG. 32 the switch and output of stage i of a crossover network identified in block 1150 and the switch and output of a shuffle network stage i identified in block 1154 are related by transformations 1, 2, 3, and 4 of block 1152. Similarly, the switch and input for stage i+1 of a crossover network represented in block 1160 and the switch and input for stage i+1 of a shuffle network represented in block 1164 are related as defined by transformations 9, 10, 11, and 12 of block 1162. The transformations between stage i switch and output number for a crossover network and stage i+1 switch and input number for a crossover network are specified by transformations 13, 14, 15, and 16 of block 1156. The corresponding relationship between successive stages of a shuffle network are given by transformations 5, 6, 7, and 8 of block 1158. The transformations 1 through 16 are listed in Tables 1–3. For each transformation, the number to be transformed is an n-bit binary number represented by $B_{n-1} \ldots B_1 B_0$.

TABLE 1

(1) $CS_i \longrightarrow SS_i$:

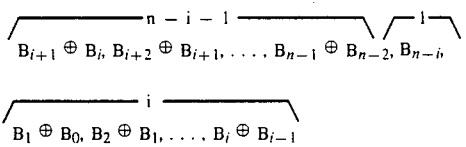

(2) $CO_i \longrightarrow SO_i$: $B_{i+1} \oplus B_i \oplus CO_i$ if $i \leq n-2$;
$B_{n-1} \oplus CO_i$ if $i = n-1$ (3) $SS_i \longrightarrow CS_i$:

$$\overbrace{B_i, B_{i+1} \oplus B_i, B_{i+2} \oplus B_{i+1} \oplus B_i, \ldots, \oplus B_{n-1,\ldots,i}}^{n-i}$$

$$\overbrace{\oplus B_{n-1,\ldots,i,0}, \ldots, \oplus B_{n-1,\ldots,i,1,\ldots,i-1}}^{i}$$

(4) $SO_i \longrightarrow CO_i$: $B_{n-i} \oplus SO_i$ (5) $SS_i, SO_i \longrightarrow SS_{i+1}$: $B_{n-2}, B_{n-3}, \ldots, B_0, SO_i$ (6) $SS_i, SO_i \longrightarrow SI_{i+1}$: $B_{n-1}$

TABLE 2

(7) $SS_{i+1}, SI_{i+1} \longrightarrow SS_i$: $SI_{i+1}, B_{n-1}, B_{n-2}, \ldots, B_1$ (8) $SS_{i+1}, SI_{i+1} \longrightarrow SO_i$: $B_0$ (9) $CS_{i+1} \longrightarrow SS_{i+1}$:

$$\overbrace{B_{i+2} \oplus B_{i+1}, B_{i+3} \oplus B_{i+2}, \ldots, B_{n-1} \oplus B_{n-2}, B_{n-1}}^{n-i-2} \overbrace{\phantom{xx}}^{1}$$

$$\overbrace{B_1 \oplus B_0, B_2 \oplus B_1, \ldots, B_{i+1} \oplus B_i}^{i+1}$$

(10) $CI_{i+1} \longrightarrow SI_{i+1}$: $B_{i+1} \oplus B_i \oplus CI_{i+1}$ if $i+1 \geq 1$;
$B_{n-1} \oplus CI_{i+1}$ if $i+1 = 0$ (10a) $CI_i \longrightarrow SI_i$: $B_i \oplus B_{i-1} \oplus CI_i$ if $i \geq 1$;
$B_{n-1} \oplus CI_i$ if $i = 0$

(11) $SS_{i+1} \longrightarrow CS_{i+1}$:

$$\overbrace{B_{i+1}, B_{i+2} \oplus B_{i+1}, B_{i+3} \oplus B_{i+2} \oplus B_{i+1}, \ldots, \oplus B_{n-1,\ldots,i+1}}^{n-i-1}$$

$$\overbrace{\oplus B_{n-1,\ldots,i+1,0}, \ldots, \oplus B_{n-1,\ldots,i+1,0,\ldots,i}}^{i+1}$$

TABLE 3

(12) $SI_{i+1} \longrightarrow CI_{i+1}$: $B_0 \oplus SI_{i+1}$ (12a) $SI_i \longrightarrow CI_i$: $B_0 \oplus SI_i$

(13) $CS_i, CO_i \longrightarrow CS_{i+1}$:

$$\overbrace{B_{n-1}, B_{n-2}, \ldots, B_{i+1}}^{n-i-1},$$

$$\overbrace{B_i \oplus CO_i, B_{i-1} \oplus CO_i, \ldots, B_0 \oplus CO_i}^{i+1}$$

(14) $CS_i, CO_i \longrightarrow CI_{i+1}$: $CO_i$

(15) $CS_{i+1}, CI_{i+1} \longrightarrow CS_i$:

$$\overbrace{B_{n-1}, B_{n-2}, \ldots, B_{i+1}}^{n-i-1},$$

$$\overbrace{B_i \oplus CI_{i+1}, B_{i-1} \oplus CI_{i+1}, \ldots, B_0 \oplus CI_{i+1}}^{i+1}$$

(16) $CS_{i+1}, CI_{i+1} \longrightarrow CO_i$: $CI_{i+1}$

Arrangements for controlling a 512×512 crossover network 1200 (FIG. 38) are now described. To get a better understanding of the size of such a network, first refer to the 16×16 crossover network 1170 (FIG. 34–36) and note the pattern of crossover connections from stage to stage. FIG. 37 is a representation of the relative sizes of the 16×16 network 1170 and the 512×512 network 1200. Also shown is an intermediate size 128×128 network. Crossover network 1200 (FIG. 38) includes 15 stages; however stages, 1, 2, 3, 13, 14, and 15 do not perform a switching function but are used only to implement the fanout/fain F=8. A crossover network controller 1300 is used to effect path hunt, connect, and disconnect functions for network 1200 via a plurality of stage controllers 1201 through 1209, individual to the stages 4 through 12. For the present example the nodes of the switching stages 4 through 12 are full capacity switching nodes such as the node of FIG. 5. The nodes of the fanout stages 1, 2 and 3 and the nodes of the fanin stages 13, 14, and 15 are simple fanout elements and fanin elements, respectively. Crossover network controller 1300, which may be implemented as a single processor operated under stored program control or as a hardware logic circuit arrangement, implements the control processing shown, for example, in FIGS. 39 and 40 to effect connections and disconnections respectively.

Connection processing (FIG. 39) begins when a network 1200 inlet/outlet pair for a given connection request is stored in a queue in block 1402. When the stored inlet/outlet pair is to be processed, a conversion of the inlet and outlet numbers is made in block 1404 to the corresponding inlet and outlet numbers of the shuffle network topologically equivalent to network 1200. Then in block 1406 a disjoint path check is made using procedures described further herein to determine whether any of the possible paths for this connection request intersect with any of the possible paths for other connection requests being processed concurrently. If there is no conflict with other connection requests in progress, execution proceeds to block 1408 where the switches or links associated with all paths from the inlet to the outlet of the equivalent shuffle network are determined. Since, in network 1200, the switches (or nodes) are full capacity switches, it is sufficient to determine the links of a given path through the network. If the network switches are capacity one switches, it is sufficient to determine the switches of a given path through the network. Once the path components of all paths have been determined, an idle path is identified in block 1410 is such idle path exists. When an idle path is found, a path memory is updated in block 1412 to define the idle path using the inlet, outlet, and path numbers for the equivalent shuffle network. Connection orders are sent in block 1414 to the network stage controllers 1201 through 1209. Further, the path components (switches or links) for the identified path are marked busy in block 1416 for all stages.

Returning to block 1406, if it is determined that the given connection request is in conflict with other connection requests being processed, information concerning the given connection request in stored in a queue in block 1420. Once an idle path is found in block 1410 for one of the other connection requests, a report is made to the queue of block 1420. The disjoint path check of block 1406 is then repeated. If no idle path is identified in block 1410 for a connection request, blocks 1422 and 1424 are executed. In block 1422, a report is made to the queue of block 1420 that connection processing is completed. In block 1424, a blocking failure report is made to the queue of block 1402 such that the unsuccessful connection request can be processed again later.

Disconnection processing (FIG. 40) begins when a network 1200 inlet for a given disconnection request is stored in a queue in block 1440. When the stored inlet is to be processed, a conversion of the inlet number is made in block 1442 to the corresponding inlet number of the shuffle network topologically equivalent to network 1200. In block 1444, the shuffle inlet number is used to index the path memory to determine the shuffle outlet number and the path number for the connection. Disconnect orders are sent in block 1448 to the network stage controllers 1201 through 1209. Further, the path components (switches or links) for the path being disconnected are again marked idle for all stages.

A hardware embodiment of network controller 1300 is shown in FIGS. 42–44. Connection requests, specifying a particular network 1200 inlet/outlet pair, are stored in a connect request queue 1302. The nine-bit binary crossover inlet number and the nine-bit binary crossover outlet number are transmitted to a crossover to shuffle mapping unit 1304 (FIG. 50) for conversion to the corresponding nine-bit shuffle inlet number and the corresponding nine-bit shuffle outlet number. The shuffle inlet and outlet numbers are stored in a connection/disconnection request queue 1305 and then transmitted to a disjoint path check unit 1306 (FIG. 46). Unit 1306 determines whether the present inlet/outlet number pair defines paths through network 1200 which are link disjoint from the paths associated with another inlet/outlet number pair. When two or more connection requests define disjoint paths through network 1200, multiple connection requests and path hunts can be processed at the same time in what is referred to herein as an overlap mode of operation. The shuffle inlet/outlet numbers are then stored in a connect/disconnect request queue 1308. When a path hunt is to be performed, connect request queue 1308 transmits a read request signal to a plurality of memories 1312 that stored the link busy/idle bits for a corresponding one of the link stages 4 through 11 of network 1200. (Link stage i is the stage of links between node stage i and node stage i+1.) The nine-bit shuffle inlet and the nine-bit shuffle outlet signals are also transmitted in parallel from connect request queue 1308 and predetermined ones of the inlet and outlet signals are used to address locations of the memories 1312.

Note that in network 1200 there are eight paths associated with any specified inlet/outlet pair. Each memory 1312 has 512 locations, each comprising eight bits. Each of the 512 locations of a given memory 1312 corresponding to a different value of the predetermined nine bits extracted from the binary number formed by concatenating the inlet number, path number, and outlet number in the manner of FIG. 30. However, none of the path number bits are extracted for any of the stages. As a result, a memory 1312 location defines the busy/idle status of a link stage for each of the eight paths associated with a given inlet/outlet number pair. All eight bits of the addressed memory 1312 locations are read and concurrently combined by a plurality of path busy/idle check units 1314, implemented, for example, as multi-input OR-gates. One of the path check units 1314 transmits an idle signal when all of its input signals indicate an idle status of links. An idle path select unit 1316 (FIG. 51) receives the busy/idle signals from each of the units 1314 and selects in a predetermined fashion one of the define idle paths. Idle path select unit 1316 then transmits the binary number corresponding to the one of the eight paths selected. Unit 1316 also transmits a blocked path indicator if, in fact, there is no path found. The blocked path indicator is fed back to the connect request queue 1302 such that the connection request can be repeated at a later time. The inverse of the blocked path indicator is used as a write request signal to write a busy bit into each of the memories 1312. The idle path number is transmitted to the memories 1312 to additionally identify the particular path and therefore the particular bit of the location addressed by the inlet and outlet numbers. In addition, a path memory 1318 is updated in response to the write request and stores, at an address defined by the shuffle inlet, both the shuffle outlet and the selected idle path number.

A disconnect request queue 1320 effects disconnections by transmitting the crossover inlet to be disconnected, to crossover to shuffle mapping unit 1304 for conversion to the corresponding shuffle inlet. The shuffle inlet is then used to address path memory 1318. Disconnect request queue 1320 transmits a read request signal to path memory 1318 and reads the shuffle outlet stored at the location of path memory 1318 defined by the shuffle inlet address. The read shuffle outlet is then transmitted along with the shuffle inlet via queue 1305, disjoint path check unit 1306 and queue 1308 to address memories 1312. The addressed path memory 1318 location also includes the path number of the path to be disconnected. The read path number is transmitted in parallel to each of the memories 1312 to additionally specify the particular bit to be returned to an idle status. Thereafter, disconnect request queue 1320 transmits a write request which effects the change to idle status in the memories 1312 and also deletes information concerning that connection from path memory 1318. Each of the node stage controllers 1201 through 1209 includes a translator which effects a predetermined combination of the shuffle inlet, outlet, and path signals to determine both the node and the node input to node output connection to be enabled as part of a new path or to be disabled for a disconnection. The design of these translators is based on the following logic. Following reasoning similar to that to determine $S_i(x,P^*,y)$ and $L_i(x,P^*,y)$ from a binary representation of $xM_1 + P^*M + y$, we may determine $I_i(x,P^*,y)$ (the input used on $S_i(x,P^*,y)$) and $O_i(x,P^*,y)$ (the output used on $S_i(x,P^*,Y)$.

$$I_i(x,P^*,y) = \left\lfloor \frac{xM_1 + P^*M + y}{r_i M_i} \right\rfloor_{m_i}$$

For $2 \leq i \leq S-1$, $r_i = 2^{n+k-1}$, $M_i = 2^{S-i}$ and $n_i = 2^1$, $I_i(x,P^*,y)$ is given by a window of one bit displaced $n+k-1+S-i$ bits from the right of the binary representation of $xM_1 + P^*M + y$.

$$O_i(x,P^*,y) = \left\lfloor \frac{xM_1 + P^*M + y}{M_{i+1}} \right\rfloor_{\mod m_i}$$

$O_i(x,P^*,y)$ is then given by a window of one bit displaced $S-i-1$ bits from the right of the binary representation of $xM_1 + P^*M + y$.

To map $S_i(x,P^*,y)$, $I_i(x,P^*,y)$, and $O_i(x,P^*,y)$ form the shuffle domain to the crossover domain we employ expressions (3) and (4) in Table 1 and expression (12a) in Table 3, respectively. The required exclusive-OR functions are easily implemented in hardware and the inputs to these functions are obtained directly from the binary representation of $xM_1 + P^*M + y$.

The crossover to shuffle mapping unit 1304 (FIG. 50) comprises a set of exclusive-OR gates combining the appropriate inlet and outlet signals. Since the network has fan-out and fan-in of eight, we may interpret the entire network as being comprised of a total of fifteen stages—three stages for one to eight fan-out, nine stages for switching, and three stages for one to eight fan-in. The fan-out/fan-in is accomplished by selectively equipping only one of each eight inlets/outlets (one inlet/outlet on one of four switches). The selected 512 inlet and outlet switches are the mapped to the shuffle domain using expression (1), of Table 1. The resulting logic is indicated in FIG. 50.

The memories 1312 are each $512 \times 8$ random access memories storing the link busy/idle bits. The path busy/idle check units 1314 are implemented as OR gates. The select unit 1316 (FIG. 51) is implemented using an arrangement of AND, NAND, OR, and NOR gates to define, using three path signals, the selected idle path, and to generate a single signal for use both as a blocked path indicator and as a write request signal.

The disjoint path check unit 1306 is based no the logic arrangement shown in FIG. 46. The two inlet/outlet pairs checked are designated as (X9, X8, X7, X6, X5, X4, X3, X2, X1)-(Y9, Y8, Y7, Y6, Y5, Y4, Y3, Y2, Y1) and (x9, x8, x7, x6, x5, x4, x3, x2, x1)-(y9, y8, y7, y6, y5, y4, y3, y2, y1). The logic arrangement of unit 1306 is applicable for checking disjoint paths in network 1330, shown in FIG .49, independent of the fanout as indicated by the first stage of elements being $1 \times 2^n$ elements and independent of the fanin as indicated by the last stage of elements being $2^n \times 1$ elements. The logic arrangement of unit 1306 generates a logic zero signal when all paths for the inlet/outlet pairs are not link disjoint and generates a logic one signal when all pairs of link disjoint. The explanation of this logic is as follows. Consider the binary representation of $xM_1 + P^*M + y$ for the two inlet/outlet pairs being checked.

$$x \qquad\qquad y$$
$$X_9X_8X_7X_6X_5X_4X_3X_2X_1ppp\,Y_9Y_8Y_7Y_6Y_5Y_4Y_3Y_2Y_1$$

$$x' \qquad\qquad y'$$
$$x_9x_8x_7x_6x_5x_4x_3x_2x_1ppp\,y_9y_8y_7y_6y_5y_4y_3y_2y_1$$

$L_i(x,P^*,y)$ is given by a window of $\log_2 (r_i m_i) = n+k = 9+3 = 12$ bits displaced by $\log_2 M_{i+1} = 12-i$ bits from the right of these binary values for $4 \leq i \leq 11$. Since any stage 1, 2, or 3 link is accessible by only one inlet (the three stages of fan-out) and any stage 12, 13, or 14 link is accessible by only one outlet (the three stages of an-in) we are concerned with $L_i$ only for $4 \leq i \leq 11$.

Consider $L_4(x,P^*,y)$ and $L_4(x',P^*,y')$.

$$L_4(x,P^*,y) = X_8X_7X_6X_5X_4X_3X_2X_1ppY_9$$

$$L_4(x',P^*,y) = x_8x_7x_6x_5x_4x_3x_2x_1pppy_9$$

Since the ppp filed can take on all possible eight values, these two sets of links will be disjoint only if the remaining bits differ in at least one position. Thus, these two link sets will be disjoint if $D_4 = (X_8 \oplus x_8) + (X_7 \oplus x_7) + \ldots + (X_1 \oplus x_1) + (Y_9 \oplus y_9) = 1$. Similarly, $L_5(x,P^*,y)$ will be disjoint from $L_5(x', P^*,y')$ if $D_5 = (X_7 \oplus x_7) + \ldots + (X_1 \oplus x_1) + (Y_9 \oplus y_9) + (Y_8 \oplus y_8) - 1$ and so on until we reach $D_{11} = (X_1 \oplus x_1) + (Y_9 \oplus y_9) + \ldots + (Y_2 \oplus y_2) = 1$. The entire set of links will disjoint only if each $D_i = 1$ or $D_T = D_4 x D_5 x \ldots x D_{11} - 1$. The logic shown in FIG. 46 is a boolean reduction of $D_T$.

When two inlet/outlet pairs are determined to be link disjoint, then the path hunt function to establish connections can be performed in an overlap mode of operation, as shown in the timing diagram of FIG. 47. As shown, the times needed to perform a read of the memories 1312, the subsequent operation of the logic circuit comprising OR gates 1314 and idle path select unit 1316, and then the subsequent time for writing of path memory 1318, as well as writing busy bits into the memories 1312, are indicated in FIG. 47 by the times $R_1, L_1, W_1$. The corresponding times for a second connection request are designated $R_2, L_2, W_2$. As shown, the second read occurs during the time that the results of the first reading are propagating through the several levels of logic gates. As shown in FIG. 48, when duplicate copies of the network controller memories, etc., are used, as in FIG. 45, four reads can be effected before the corresponding four writes occur.

Alternatively, instead of checking whether there are any conflicts among the paths between a first inlet and first outlet, and a second inlet and second outlet, one can simply proceed as if the selected paths did not conflict, and in case of a conflict, choose an alternate path between the second inlet and outlet. The presence of a conflict is detected if any of the busy-idle indicates for the second selected path are marked busy; in that case, the busy-idle indicators for that second path must be retained as idle, except for those detected to be already busy, and a hunt for an alternate path between the second inlet and outlet is made.

In many EGS networks, the probability that two connection requests are disjoint is high. Consider an EGS network with N inlets and M outlets, S stages, and with $n_i$ inlets on each switch in stage i and $m_i$ outlets on each switch in stage i and where $$N \equiv 0_{mod} \prod_{j=1}^{i} n_j \text{ for } \prod_{j=1}^{i} n_j \leq N \text{ and}$$

$$M \equiv 0_{mod} \prod_{j=i}^{S} m_j \text{ for } \prod_{j=i}^{S} m_j \leq M.$$

Define L(a,b) as the set of all links in all paths between inlet a and outlet b, S(a,b) as the set of all switches in all paths between inlet a and outlet b, and $\phi$ as the empty or null set. With these definitions, we state the following theorems. Link disjoint path theorem:

$$L(x,y) \cap L(x',y') = \phi \text{ if and only if } t \geq u,$$

Switch disjoint path theorem;

$$S(x,y) \cap S(x',y') = \phi \text{ if and only if } t > u,$$

wherein t is the smallest value of i for which $$x \equiv x'_{mod} \left\lceil \frac{N}{\prod_{j=1}^{i} n_j} \right\rceil$$

and u is the largest value of i for which $$\left\lfloor \frac{Y}{\prod_{j=i}^{S} m_j} \right\rfloor = \left\lfloor \frac{Y'}{\prod_{j=i}^{S} m_j} \right\rfloor$$

and where $\underline{W}$ denotes the largest integer $\leq W$ and $\overline{W}$ denotes the smallest integer $\geq W$. For x,y and x',y' chosen at random, we consider two cases:

CASE )

x and x' are chosen with replacement from the set of N inlets, i.e., x and x' are allowed to be the same inlet. Similarly, y and y' are chosen with replacement from the set of M outlets. For this case we set a variable $\beta = 0$.

CASE 1 x and x' and also y and y' are chosen without replacement from the sets of N inlets and M outlets, respectively. Thus, $x \neq x'$, and $x \neq y'$. For this case we set $\beta = 1$.
Link disjoint path probability:
The probability that $L(x,y) \cap L(x',y') = \phi$ is given by $$1 - \frac{(n_1 - \beta) \times \min\left\{ \prod_{j=2}^{S} m_j - \beta, N - \beta \right\}}{(N - \beta)^2} + \frac{\sum_{i=2}^{S-1} \left[ \min\left\{ \prod_{j=1}^{i} n_j, N \right\} - \min\left\{ \prod_{j=1}^{i-1} n_j, N \right\} \right] \left[ \min\left\{ \prod_{j=i+1}^{S} m_j - \beta, N - \beta \right\} \right]}{(N - \beta)^2}$$

Switch disjoint path probability:
The probability that $S(x,y) \cap S(x',y') = \phi$ is given by $$1 - \frac{(n_1 - \beta) \times \min\left\{ \prod_{j=1}^{S} m_j - \beta, N - \beta \right\}}{(N - \beta)^2} + \frac{\sum_{i=2}^{S} \left[ \min\left\{ \prod_{j=1}^{i} n_j, N \right\} - \min\left\{ \prod_{j=1}^{i-1} n_j, N \right\} \right] \left[ \min\left\{ \prod_{j=i}^{S} m_j - \beta, N - \beta \right\} \right]}{(N - \beta)^2}$$

For $\log_x N \leq S \leq 2 \log_2 N$: P (disjoint) = P (all paths between a given inlet/outlet pair are switch and link disjoint from all paths between another inlet/outlet pair $$= 1 - \frac{2^S(2\log_2 N - S + 1) - 2N + 1}{(N - 1)^2}.$$

There are $$\frac{N^2}{2} [2^S(2\log_2 N - S + 1) - 2N + 1]$$

ways to select two inlet/outlet pairs that have common switches for some paths. There are $$N^2 \frac{(N-1)^2}{2}$$

ways to select two inlet/outlet pairs. By way of example, for N=512, S=9, there are $$\frac{512^2}{2} [512(18 - 9 + 1) - 1024 + 1] = 537,001,984$$

ways to select two inlet/outlet pairs with intersecting paths and $$\frac{512^2 \times 511^2}{2} = 34,225,651,712$$

ways to select two inlet/outlet pairs $$P(\text{disjoint}) = 1 - \frac{537,001,984}{34,225,651,712} = .9843.$$

In addition, P (at least 2 to 3 pairs are disjoint)$\approx$0.99999613, P (each of 4 pairs are disjoints from the other three)$\approx$0.9094, and P (some 4 of 5 pairs are all disjoint)$\approx$0.996.

It is to be understood that the above-described embodiments are merely illustrative of the principles of the invention and that many variations may be devised by those skilled in the art without departing from the spirit and scope of the invention. It is therefore that such variations be included within the scope of the claims.

I claim:

1. A method for use in an arrangement comprising a perfect shuffle equivalent network having a plurality of inlets and a plurality of outlets and comprising a plurality of at least four stages of nodes, and a plurality of at least three stages of links, each link stage for connecting the outputs of one of said nodes stages to the inputs of the successive one of said node stages, said arrangement further comprising a plurality of at least three means each for storing stage busy/idle information for an associated one of said stages of links, said methods comprising combining stage busy/idle information concurrently from all of said storing means to hunt for an idle path from a specified one of said inlets through said network to a specified one of said outlets, where each of said storing means comprises a plurality of addressable locations, said arrangement further comprising means for generating a plurality of inlets signals coded to represent any one of said plurality of inlets and a plurality of outlet signals coded to present any one of said plurality of outlets, and wherein said combining comprises for each of said storing means, generating an address from predetermined ones of the inlet and outlet signals representing said specified inlet and said specified outlet, to address one of the storing means locations, and reading stage busy/idle information concurrently from all of the addressed storing means locations to hunt for a path from said specified inlet through idle links of all of said plurality of link stages to said specified outlet.

2. A method in accordance with claim 1 wherein said network has a plurality of paths from said specified inlet to said specified outlet and wherein each of the addressed storing means locations comprises a plurality of bit positions each storing stage busy/idle information for an associated one of said plurality of paths, and wherein said reading comprises reading stage busy/idle information concurrently from all of the bit positions of all of the addressed storing means locations.

3. A method in accordance with claim 2 further comprising determining one of said plurality of paths that is defined as idle by said read stage busy/idle information, and concurrently updating the stage busy/idle information in each of the bit positions associated with said determined path to indicate a busy status.

4. A method in accordance with claim 3 further comprising in response to a disconnection request concurrently updating the stage busy/idle information in each of the bit positions associated with said determined path to indicate an idle status.

5. A method in accordance with claim 2 wherein said arrangement further comprises path memory means for storing information defining each busy path through said network, said method further comprising determining one of said plurality of paths that is defined as idle by said read stage busy/idle information, and writing into said path memory means information defining said determined path.

6. A method in accordance with claim 5 further comprising in response to a disconnection request, deleting from said path memory means said information defining said determined path.

7. A method in accordance with claim 2 further comprising determining one of said plurality of paths that is defined is idle by said read stage busy/idle information, and controlling said network to enable said determined path for communication from said specified inlet to said specified outlet.

8. A method in accordance with claim 7 further comprising in response to a disconnection request, controlling said network to disable said determined path for communication from said specified inlet to said specified outlet.

9. A method in accordance with claim 2 where each of said plurality of outlets is represented by an outlet number, each of said plurality of paths is represented by a path number, wherein said arrangement further comprises path memory means for storing information defining each busy path through said network, said path memory means comprising a plurality of locations each corresponding to one of said plurality of inlets, said method further comprising determining one of said plurality of paths that is defined as idle by said read stage busy/idle information, and writing the outlet number representing said specified outlet and the path number representing said determined path into the location of said path memory means corresponding to said specified inlet.

10. A method in accordance with claim 2 where each of said plurality of inlets is represented by an inlet number, each of said plurality of paths is represented by a path number, wherein said arrangement further comprises path memory means for storing information defining each busy path through said network, said path memory means comprising a plurality of locations each corresponding to one of said plurality of outlets, said method further comprising determining one of said plurality of paths that is defined as idle by said read stage busy/idle information, and determining one of said plurality of paths that is defined as idle by said read stage busy/idle information, and writing the inlet number representing said specified inlet and the path number representing said determined path into the location of said path memory means corresponding to said specified outlet.

11. A method in accordance with claim 1 where each of said storing means addressable locations comprises a plurality of bit positions, each bit position for storing the stage busy/idle information for one of the links of the associated stage, and wherein said reading comprises reading stage busy/idle information concurrently from all the bit positions of all of the addressed storing means locations.

12. A method in accordance with claim 11 wherein said network has an equal number of paths through said network for each inlet/outlet pair comprising one of said inlets and one of said outlets, and where each of the bit positions of an addressable storing means location corresponds to one of said equal number of paths, said method further comprising determining one of the equal number of paths for the inlet/outlet pair comprising said specified inlet and said specified outlet, said determined path being one that is defined as idle by said read stage busy/idle information, and concurrently updating the stage busy/idle information in the bit position corresponding to said determined path of all of the addressed storing means locations to indicate a busy status.

13. A method in accordance with claim 11 wherein said network has an equal number of paths through said network for each inlet/outlet pair comprising one of said inlets and one of said outlets, said arrangement further comprising means for generating a plurality of path signals coded to represent any one of said equal number of paths, said method further comprising determining one of the equal number of paths for the inlet/outlet pair comprising said specified inlet and said specified outlet, said determined path being one that is defined as idle by said read stage busy/idle information, and for each of said storing means, using predetermined ones of the inlet, outlet, and path signals representing said specified inlet, said specified outlet, and said determined path to enable communication via one of the links of the stage associated with that storing means.

14. An arrangement comprising a perfect shuffle equivalent network having a plurality of inlets and a plurality of outlets and comprising a plurality of at least four stages of nodes, and a plurality of at least three stages of links, each link stage for connecting the outputs of one of said node stages to the inputs of the successive one of said node stages, a plurality of at least three means each for storing stage busy/idle information for an associated one of said stages of links, each of said storing means comprising a plurality of addressable locations, means responsive to a request for a connection from a specified one of said inlets through said network to a specified one of said outlets combining stage busy/idle information concurrently from all of said storing means to hunt for an idle path for said connection, and means for generating a plurality of inlet signals coded to represent any one of said plurality of inlets and a plurality of outlet signals coded to represent any one of said plurality of outlets, wherein said combining means comprises means for generating an address for each of said storing means from predetermined ones of the inlet and outlet signals representing said specified inlet and said specified outlet, to address one of the storing means locations, and means for reading stage busy/idle information concurrently from all the addressed storing means locations to hunt for a path from said specified inlet through idle links of all of said plurality of link stages to said specified outlet.

15. An arrangement in accordance with claim 14 wherein said network has a plurality of paths from said specified inlet to said specified outlet, wherein each of the addressed storing means comprises a plurality of bit positions each storing stage busy/idle information for an associated one of said plurality of paths, and wherein said reading means comprises means responsive to said connection request for effecting a reading of stage busy/idle information concurrently from all of the bit positions of all of the addressed storing means locations.

16. An arrangement in accordance with claim 15 further comprising means responsive to said read stage busy/idle information for determining one of said plurality of paths that is defined as idle, and means responsive to said determining means for concurrently updating the stage busy/idle information in each of the bit position associated with said determined path to indicate a busy status.

17. An arrangement in accordance with claim 16 further comprising means responsive to a disconnection request for concurrently updating the stage busy idle information in each of the bit position associated with said determined path to indicate an idle status.

18. An arrangement in accordance with claim 15 further comprising path memory means for storing information defining each busy path through said network, means responsive to said read stage busy/idle information for determining one of said plurality of paths that is defined as idle, and means responsive to said determining means for effecting a writing into said path memory means of information defining said determined path.

19. An arrangement in accordance with claim 18 further comprising means responsive to a disconnection request for deleting from said path memory means said information defining said determined path.

20. An arrangement in accordance with claim 15 further comprising means responsive to said read stage busy/idle information for determining one of said plurality of paths that is defined as idle, and means responsive to said determining means for controlling said network to enable said determined path for communication from said specified inlet to said specified outlet.

21. An arrangement in accordance with claim 20 further comprising means responsive to a disconnection request for controlling said network to disable said determined path for communication from said specified inlet to said specified outlet.

22. A method for use in an arrangement comprising a perfect shuffle equivalent network having a plurality of inlets and a plurality of outlets and comprising a plurality of at least four stages of nodes, and a plurality of at least three stages of links, each link stage for connecting the outputs of one of said node stages to the inputs of the successive one of said node stages, said arrangement further comprising a plurality of at least four means each for storing stage busy/idle information for an associated one of said stages of nodes, said method comprising combining stage busy/idle information concurrently from all of said storing means to hunt for an idle path from a specified one of said inlets through said network to a specified one of said outlets, where each of said storing means comprises a plurality of addressable locations, said arrangement further comprising means for generating a plurality of inlets signals coded to represent any one of said plurality of inlets and a plurality of outlet signals coded to represent any one of said plurality of outlets, and wherein said combining comprises for each of said storing means, generating an address from predetermined ones of the inlet and outlet signals representing said specified inlet and said specified outlet, to address one of the storing means locations, and reading stage busy/idle information concurrently from all of the addressed storing means locations to hunt for a path from said specified inlet through idle nodes of all of said plurality of node stages to said specified outlet.

23. A method in accordance with claim 22 where each of said storing means addressable locations comprises a plurality of bit positions, each bit position for storing the stage busy/idle information for one of the nodes of the associated stage, and wherein said reading comprises reading stage busy/idle information concurrently from all the bit positions of all of the addressed storing means locations.

24. A method in accordance with claim 23 wherein said network has an equal number of paths through said network for each inlet/outlet pair comprising one of said inlets and one of said outlets, and where each of the bit positions of an addressable storing means location corresponds to one of said equal number of paths, said method further comprising determining one of the equal number of paths for the inlet/outlet pair comprising said specified inlet and said specified outlet, said determined path being one that is defined as idle by said read stage busy/idle information, and concurrently updating the stage busy/idle information in the bit position corresponding to said determined path of all of the addressed storing means locations to indicate a busy status.

25. A method in accordance with claim 23 wherein said network has an equal number of paths through said network for each inlet/outlet pair comprising one of said inlets and one of said outlets, said arrangement further comprising means for generating a plurality of path signals coded to represent any one of said equal number of paths, said method further comprising determining one of the equal number of paths of the inlet/outlet pair comprising said specified inlet and said specified outlet, said determined path being one that is defined as idle by said read stage busy/idle information, and for each of said storing means, using predetermined ones of the inlet, outlet, and path signals representing said specified inlet, said specified outlet, and said determined path to enable communication via one of the nodes of the stage associated with that storing means.

26. A method in accordance with claim 22 wherein said network has a plurality of paths from said specified inlet to said specified outlet and wherein each of the addressed storing means locations comprises a plurality of bit positions each storing stage busy/idle information for an associated one of said plurality of paths, and wherein said reading comprises reading stage busy/idle information concurrently from all of the bit positions of all of the addressed storing means locations.

27. A method in accordance with claim 27 further comprising determining one of said plurality of paths that is defined as idle by said read stage busy/idle information, and concurrently updating the stage busy/idle information in each of the bit positions associated with said determined path to indicate a busy status.

28. A method in accordance with claim 27 further comprising in response to a disconnection request, concurrently updating the stage busy/idle information in each of the bit positions associated with said determined path to indicate an idle status.

29. A method in accordance with claim 22 wherein said arrangement further comprises path memory means for storing information defining each busy path through said network, said method further comprising determining one of said plurality of paths that is defined as idle by said read stage busy/idle information, and writing into said path memory means information defining said determined path.

30. A method in accordance with claim 29 further comprising in response to a disconnection request, deleting from said path memory means said information defining said determined path.

31. A method in accordance with claim 26 further comprising determining one of said plurality of paths that is defined as idle by said read stage busy/idle information, and controlling said network to enable said determined path for communication from said specified inlet to said specified outlet.

32. A method in accordance with claim 31 further comprising in response to a disconnection request, controlling said network to disable said determined path for communication from said specified inlet to said specified outlet.

33. A method in accordance with claim 26 where each of said plurality of outlets is represented by an outlet number, each of said plurality of paths is represented by a path number, wherein said arrangement further comprises path memory means for storing information defining each busy path through said network, said path memory means comprising a plurality of locations each corresponding to one of said plurality of inlets, said method further comprising determining one of said plurality of paths that is defined as idle by said read stage busy/idle information, and writing the outlet number representing said specified outlet and the path number representing said determined path into the location of said path memory means corresponding to said specified inlet.

34. A method in accordance with claim 26 where each of said plurality of inlets is represented by an inlet number, each of said plurality of paths is represented by a path number, wherein said arrangement further comprises path memory means for storing information defining each busy path through said network, said path memory means comprising a plurality of locations each corresponding to one of said plurality of outlets, said method further comprising determining one of said plurality of paths that is defined as idle by said read stage busy/idle information, and writing the inlet number representing said specified inlet and the path number representing said determined path into the location of said path memory means corresponding to said specified outlet.

35. An arrangement comprising a perfect shuffle equivalent network having a plurality of inlets and a plurality of outlets and comprising a plurality of at least four stages of nodes, and a plurality of at least three stages of links, each link stage for connecting the outputs of one of said node stages to the inputs of the successive one of said node stages, a plurality of at least four means each for storing stage busy/idle information for an associated one of said stages of nodes, each of said storing means comprising a plurality of addressable locations.

means responsive to a request for a connection from a specified one of said inlets through said network to a specified one of said outlets from combining stage busy/idle information concurrently from all of said storing means to hunt for an idle path for said connection, and means for generating a plurality of inlet signals coded to represent any one of said plurality of inlets and a plurality of outlet signals coded to represent any one of said plurality of outlets, wherein said combining means comprises means for generating an address for each of said storing means from predetermined ones of the inlet and outlet signals representing said specified inlet and said specified outlet, to address one of the storing means locations, and means for reading stage busy/idle information concurrently from all the addressed storing means locations to hunt for a path from said specified inlet through idle nodes of all of said plurality of node stages to said specified outlet.

36. An arrangement in accordance with claim 35 wherein said network has a plurality of paths from said specified inlet to said specified outlet, wherein each of the addressed storing means comprises a plurality of bit positions each storing stage busy/idle information for an associated one of said plurality of paths, and wherein said reading means comprises means responsive to said connection request for effecting a reading of stage busy/idle information concurrently from all of the bit positions of all of the addressed storing means locations.

37. An arrangement in accordance with claim 36 further comprising means responsive to said read stage busy/idle information for determining one of said plurality of paths that is defined as idle, and means responsive to said determining means for concurrently updating the stage busy/idle information in each of the bit positions associated with said determined path to indicate a busy status.

38. An arrangement in accordance with claim 37 further comprising means responsive to a disconnection request for concurrently updating the stage busy idle information in each of the bit positions associated with said determined path to indicate an idle status.

39. An arrangement in accordance with claim 36 further comprising path memory means for storing information defining each busy path through said network, means responsive to said read stage busy/idle information for determining one of said plurality of paths that is defined as idle, and means responsive to said determining means for effecting a writing into said path memory means of information defining said determined path.

40. An arrangement in accordance with claim 39 further comprising means responsive to a disconnection request for deleting from said path memory means said information defining said determined path.

41. An arrangement in accordance with claim 36 further comprising means responsive to said read stage busy/idle information for determining one of said plurality of paths that is defined as idle, and means responsive to said determining means for controlling said network to enable said determined path for communication from said specified inlet to said specified outlet.

42. An arrangement in accordance with claim 41 further comprising means responsive to a disconnection request for controlling said network to disable said determined path for communication from said specified inlet to said specified outlet.

* * * * *

UNITED STATES PATENT AND TRADEMARK OFFICE
CERTIFICATE OF CORRECTION

PATENT NO. : 4,991,168
DATED : February 5, 1991
INVENTOR(S) : Gaylord W. Richards It is certified that error appears in the above-indentified patent and that said Letters Patent is hereby corrected as shown below:

Column 7, line 41, " PATHS ≧ BLOCKED PATHS - 1 should be " PATHS ≥ BLOCKED PATHS + 1.

Column 8, line 3, "3 x 5 x 5 + 5 x 3 x 8 =560 should be " 3x5x8 +8x8x5 + 5x3x8 = 560.

Column 8, line 37, " (5) $r_i m_i = r_{i-1} n_{i-1}$ for $1 \leq i \leq S-1$.

should be " (5) $r_i m_i = r_{i+1} n_{i+1}$ for $1 \leq i \leq S-1$.

Column 8, lines 66 and 67, "where $\lceil x \rceil$ denotes the smallest integer ≥ x and $\lfloor x \rfloor$ denotes the"

should be " $\lceil x \rceil$ denotes the smallest integer ≥ x and $\lfloor x \rfloor$ denotes the

UNITED STATES PATENT AND TRADEMARK OFFICE
CERTIFICATE OF CORRECTION

PATENT NO. : 4,991,168
DATED : February 5, 1991
INVENTOR(S) : Gaylord W. Richards It is certified that error appears in the above-indentified patent and that said Letters Patent is hereby corrected as shown below:

Column 10, line 5, " $\left[\prod_{k=1}^{i} n_k \setminus \right] \cdot \left[\prod_{k=i-1}^{S} m_k \: M \right]$ "

should be " $\left[\prod_{k=1}^{i} n_k/N \right] \times \left[\prod_{k=i+1}^{S} m_k/M \right]$ .

Column 10, line 11, " $\left[\prod_{k=1}^{i-1} n_k \setminus \right] \cdot \left[\prod_{k=i-2}^{S} m_k \: M \right]$ " - should be " $\left[\prod_{k=1}^{i+1} n_k/N \right] \times \left[\prod_{k=i+2}^{S} m_k/M \right]$ -

Column 10, line 17, " $\left[\prod_{k=1}^{i} n_k/N \right] \cdot \left[\prod_{k=i-2}^{S} m_k \: M \right]$ "

should be " $\left[\prod_{k=1}^{i} n_k/N \right] \times \left[\prod_{k=i+2}^{S} m_k/M \right]$ .

Column 10, line 30, " BLOCKED PATHS (i,j) $\leq \sum_{k=1}^{i-1} \left[\frac{\prod_{p=1}^{k} n_p}{N}\right] \left[\frac{\prod_{p=k-1}^{s} m_p}{M}\right] - \sum_{k=i}^{j-2} \left[\frac{\prod_{p=1}^{k} n_p}{N}\right] \left[\frac{\prod_{p=k-2}^{s} m_p}{M}\right]$ "

should be "
$$\text{BLOCKED PATHS (i,j)} \leq \sum_{k=1}^{i-1} \left[\frac{\prod_{p=1}^{k} n_p}{N}\right] \left[\frac{\prod_{p=k+1}^{s} m_p}{M}\right] - \sum_{k=i}^{j-2} \left[\frac{\prod_{p=1}^{k} n_p}{N}\right] \left[\frac{\prod_{p=k+2}^{s} m_p}{M}\right].$$

UNITED STATES PATENT AND TRADEMARK OFFICE
CERTIFICATE OF CORRECTION

PATENT NO. : 4,991,168
DATED : February 5, 1991
INVENTOR(S) : Gaylord W. Richards It is certified that error appears in the above-indentified patent and that said Letters Patent is hereby corrected as shown below:

Column 12, line 59, " $\prod_{p=1}^{i}$ "

should be " $\prod_{p=1}^{i} n_p$ "

Column 18, lines 55, 56, " $\phi hd\ i$ from the $r_i$ stage i nodes of G onto the integer set $\{0,1,\ldots,r_{ii}-1\}$ "

should be " $\phi_i$ from the $r_i$ stage i nodes of G onto the integer set $\{0,1,\cdots,r_i-1\}$ "

Column 20, line 48, " $R_{k+1}$ "

should be " $r_{k+1}$ "

Column 20, line 55, " $n_2$ "

should be " $n_S$ "

UNITED STATES PATENT AND TRADEMARK OFFICE
CERTIFICATE OF CORRECTION

PATENT NO. : 4,991,168
DATED : February 5, 1991
INVENTOR(S) : Gaylord W. Richards It is certified that error appears in the above-indentified patent and that said Letters Patent is hereby corrected as shown below:

Column 21, line 6, " $\frac{Fn^{S-2}}{N}$ should be " $\dfrac{Fn^{S-2}}{N}$

Column 21, line 14, " $n^{1-\alpha}x$ should be " $n^{1-\alpha}x$

Column 23, line 55, " $r_i = \frac{2^n \times 2^k}{2} = 2^{n+k-1}$ should be " $r_i = \dfrac{2^n \times 2^k}{2} = 2^{n+k-1}$ for Column 23, line 58, " $M_i = 2^{s-i}$ should be " $M_i = 2^{S-i}$

UNITED STATES PATENT AND TRADEMARK OFFICE
CERTIFICATE OF CORRECTION

PATENT NO. : 4,991,168
DATED : February 5, 1991
INVENTOR(S) : Gaylord W. Richards It is certified that error appears in the above-indentified patent and that said Letters Patent is hereby corrected as shown below:

Column 23, line 64, " $0$ to $2^{S-K-2}-1$.

should be " $0$ to $2^{S+k-2}-1$.

Column 23, line 66, " $,2^{S-K+n-2}-2^{S+k-2}$ should be " $,2^{S+k+n-2}-2^{S+k-2}$ Column 23, line 68, " $2^{S-K+n-2}-1$.

should be " $2^{S+k+n-2}-1$.

Column 24, line 6, " $xM_1 - P*M - y \equiv \underbrace{xx\cdots x}_{n} \underbrace{pp\cdots p}_{S-k-n-2} \underbrace{yy\cdots y}_{n}$ should be " $xM_1 + P*M + y \equiv \underbrace{xx\cdots x}_{n} \underbrace{pp\cdots p}_{S+k-n-2} \underbrace{yy\cdots y}_{n}$.

UNITED STATES PATENT AND TRADEMARK OFFICE
CERTIFICATE OF CORRECTION

PATENT NO. : 4,991,168

DATED : February 5, 1991

INVENTOR(S) : Gaylord W. Richards

It is certified that error appears in the above-indentified patent and that said Letters Patent is hereby corrected as shown below:

Column 24, line 35, " 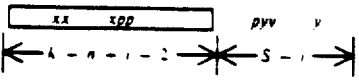

should be " 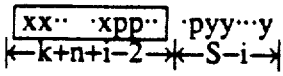

Column 24, line 50, " 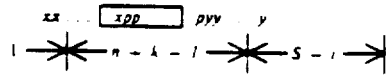

should be " 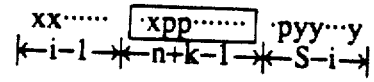

Column 30, line 39, " $X_0X_8X_7X_6X_5X_4X_3X_2X_1 ppp\ Y_0Y_8Y_7Y_6Y_5Y_4Y_3Y_2Y_1$ should be " $\overline{X_9X_8X_7X_6X_5X_4X_3X_2X_1}^{x}\ ppp\ \overline{Y_9Y_8Y_7Y_6Y_5Y_4Y_3Y_2Y_1}^{y}$
$\overline{X_9X_8X_7X_6X_5X_4X_3X_2X_1}^{x'}\ ppp\ \overline{Y_9Y_8Y_7Y_6Y_5Y_4Y_3Y_2Y_1}^{y'}$ Column 30, line 54, " $_1ppY_9$ should be " $_1pppY_9$

UNITED STATES PATENT AND TRADEMARK OFFICE
CERTIFICATE OF CORRECTION

PATENT NO. : 4,991,168

DATED : February 5, 1991

INVENTOR(S) : Gaylord W. Richards

It is certified that error appears in the above-indentified patent and that said Letters Patent is hereby corrected as shown below:

Column 30, line 64, " $\oplus y_8) - 1$ should be " $\oplus y_8) = 1$

Column 30, line 67, " $xD_{11} - 1$.

should be " $xD_{11} = 1$.

Column 32, lins 18, 19, " $W$ denotes the largest integer $\leq W$
$W$ denotes the smallest intefer $\geq W$.

should be " $\lfloor W \rfloor$ denotes the largest integer $\leq W$
$\lceil W \rceil$ denotes the smallest integer $\geq W$.

Column 33, line 38, "nodes" should be --node--,
Column 33, line 53, "present" should be --represent--.
Column 34, line 17, "request" should be --request,--,
Column 34, line 39 "is" should be --as--.

UNITED STATES PATENT AND TRADEMARK OFFICE
CERTIFICATE OF CORRECTION

PATENT NO. : 4,991,168
DATED : February 5, 1991
INVENTOR(S) : Gaylord W. Richards It is certified that error appears in the above-indentified patent and that said Letters Patent is hereby corrected as shown below:

Column 35, lines 10, 11, 12 are a duplicated paragraph,
Column 39, line 53, "from" should be --for--.

Signed and Sealed this

Twenty-third Day of November, 1993

Attest:

BRUCE LEHMAN

Attesting Officer

Commissioner of Patents and Trademarks